United States Patent
Hnatio

(10) Patent No.: US 8,103,601 B2
(45) Date of Patent: Jan. 24, 2012

(54) COMPLEXITY SYSTEMS MANAGEMENT METHOD

(75) Inventor: John Harris Hnatio, Union Bridge, MD (US)

(73) Assignee: Projectioneering, LLC, Frederick, MD (US)

(*) Notice: Subject to any disclaimer, the term of this patent is extended or adjusted under 35 U.S.C. 154(b) by 1178 days.

(21) Appl. No.: 11/808,580

(22) Filed: Jun. 12, 2007

(65) Prior Publication Data
US 2011/0173146 A1    Jul. 14, 2011

Related U.S. Application Data

(60) Provisional application No. 60/812,591, filed on Jun. 12, 2006.

(51) Int. Cl.
*G06N 5/00* (2006.01)
(52) U.S. Cl. .......................... 706/14; 706/45
(58) Field of Classification Search ................ 706/14, 706/45
See application file for complete search history.

(56) References Cited

PUBLICATIONS

Kohn, et al., Advanced Nonlinear and Hybrid Systems Control Technology, Technical Progress Report, U.S. Army, Armaments Research Development and Engineering Center, Picatinny Arsenal, Aug. 1996, pp. 1-75.*

Hvass, et al., Condition Based Maintenance for Intelligent Electromechanical Actuators, Mechanical Engineering Department, University of Texas at Austin, 2004, pp. 1-249.*

* cited by examiner

Primary Examiner — Wilbert L Starks
(74) Attorney, Agent, or Firm — Miles & Stockbridge P.C.; David R. Schaffer, Esq.

(57) ABSTRACT

The Complexity Systems Management (CSM) Method is a scientifically derived business process method for managing complex events and situations. The CSM Method™ is based on new scientific evidence that explains the behaviors of complex adaptive systems. This same scientific evidence gives rise to a new method of science, known as a priori optionality. A priori optionality is based on six scientifically derived tenets that are systematically applied using the CSM Method™ to more accurately characterize the behaviors of complex adaptive systems and manage complex events and situations. Applications of the CSM Method are integrally tied to specialized knowledgebases and a plurality of automated software applications.

20 Claims, 25 Drawing Sheets

**Moving in the direction of effective *risk management* requires the reallocation of intellectual capital and resources...**

Moving from this:

**Moving in the direction of effective *risk management* requires the reallocation of intellectual capital and resources...**

To this:

Deter → Detect → Prevent → Respond → Mitigate → Recover

It's all bout preventing catastrophes before they happen

**Moving in the direction of effective *benefit management* requires the reallocation of intellectual capital and resources...**

From this:

**Moving in the direction of effective *benefit management* requires the reallocation of intellectual capital and resources...**

To this:

It's all about recognizing, acting upon, and sustaining opportunities in order to beat the competition

PHASE 3: SUBSEQUENT CSM METHOD INTERVENTIONS

Step 1: Reassess, on a continuing basis, the fundamental rules sets used to bound the range of behaviors as determined in PHASE 1 of the process. Determine how a complex system may have evolved and adapted based on changes in the environment in which it exists, i.e., systems of systems interactions.

Step 2: Subsequent immersions are conducted using the same or different combination of simulations to revalidate PHASE 1 quantitative results and PHASE 2 best decision options.

Step 3: The decision support systems resulting from PHASES 1 and 2 are applied to the management of real world risk and/or benefit situations.

FIGURE 8

| PHASE 1: Quantitative Analysis | PHASE 2: Integrating Quantitative Reality with Qualitative Human Social Process | PHASE 3: Subsequent Interventions |
|---|---|---|
| Scientific Ground Truth<br>12 Process Steps | Consensus on Best Decisions<br>10 Process Steps | Re-validate Assumptions<br>3 Process Steps |

FIGURE 9

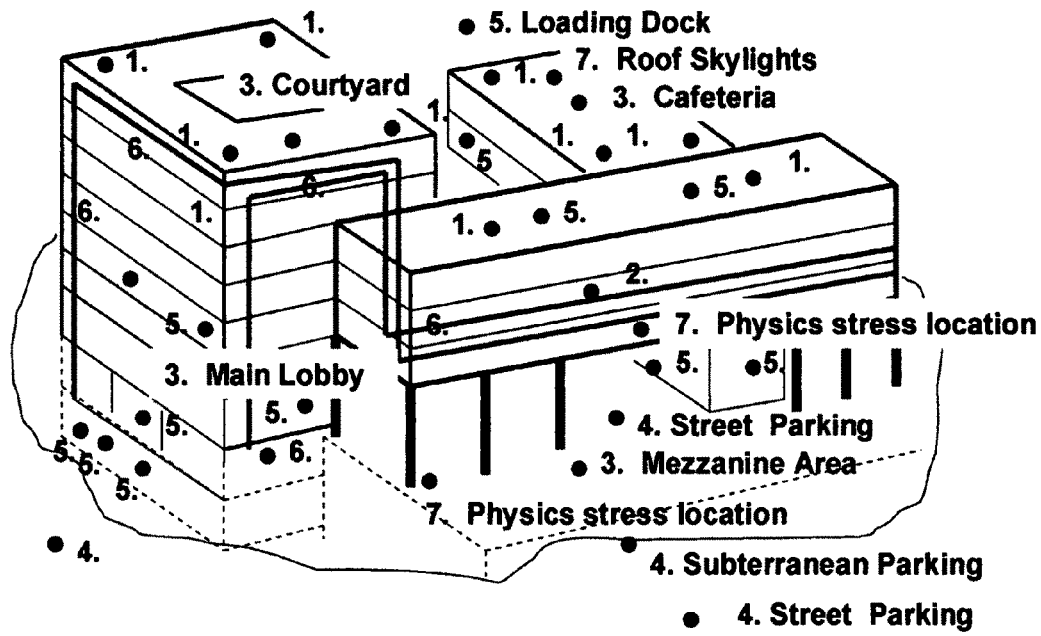

1. Heating & Ventilation Systems
   a. Roof based
   b. At-ground intake
2. SCADA Rooms & Controls
3. Mass Gathering Areas
   a. Cafeterias
   b. "Open design areas"
   c. Courtyards
4. Parking
   a. Perimeter parking
   b. Subterranean parking
5. Ingress & Egress Points
   a. Roof access
   b. Utility tunnels
   c. Main entrances & exits
   d. All other doorways
   e. Loading Dock & Storage
6. Cabling & Communications
   a. Electrical
   b. Communications
   c. Computer cabling
7. Physics Stress Locations

FIGURE 11 A

8. Water
   a. Water intake
   b. Water distribution systems

9. Sanitation & Sewer

10. Power
    a. Back-up power
    b. Immediate power for critical systems

11. Perimeter Buffer Zones

12. Elevators & Stairways

13. Security Systems

14. Safety Systems
    a. Fire suppression systems
    b. Fire and other emergency alarms 15. Other Average guard force response to an alarm for this area = 4.2 minutes $$I\ f\ (dn_t)\ (dy_t)\ (r_t)\ (r_q)$$

How likely is it the adversary will be detected early enough to interdict them before the attack occurs? At what time will they be first detected?

How long will it take the adversary to reach and successfully attack the target? How long will they be delayed?

How long will it take for security forces to respond? Will their response be fast enough to prevent the adversary from carrying out the attack?

Will the quality of the response be good enough to prevent the adversary from successfully attacking the target?

If the adversary successfully attacks the target, will response plans be designed to mitigate the consequences of the attack?

I = Interdiction of the adversary

How vulnerable is each CNO to each type of natural disaster?

What are the historical weather trends and anticipated changes for the weather and geologic region in which the building resides?

What are the "worst case" consequences to each critical node should it be subjected to the worst case historical trend or anticipated natural event?

FIGURE 14

- ⊘ POLICE
- ⊖ FIRE
- ⊖ CBRF
- ⊕ HOSPITALS

POLICE: 8 Minutes earliest response    Fire: 11 minutes earliest response
CBRF: 30 minutes earliest response    HOSPITAL: 23 minutes distant ——— Sanitation    — — — Main Potable Water Line
—·—·— Power    —··—··— Primary Communications Trunk Line Computer Data Facility

COMPLEXITY SYSTEMS MANAGEMENT METHOD

Priority is claimed to provisional U.S. Patent Application No. 60/812,591 filed on Jun. 12, 2006.

BACKGROUND OF INVENTION

Today's principle methods of scientific inquiry continue to rely heavily on the linearity of systems, reductionism, certainty of measurement, the reversibility of systems and induction as the best way to understand and manage complex systems. This reliance on deterministic methods of scientific inquiry continues in spite of overwhelming scientific evidence that when systems reach certain thresholds of complexity deterministic methods of inquiry are no longer effective.

Effective methods to integrate quantitative scientific reality with qualitative human social process in the management of complex events and situations are illusory. Frequently, scientific reality is misunderstood, ignored or denied as the result of qualitative social pressures. For example, overwhelming scientific evidence that human generated emissions of green house gasses into the atmosphere were contributing in a significant way to global warming has existed for many decades. But only with the rapid and highly visible melting of the polar ice caps and rapidly rising sea levels, has the world community begun to take the potentially catastrophic consequences of global warming seriously.

While computer technology has greatly influenced our ability to store, gather and share data, it is utilized in ways that continue to rely heavily on deterministic methods of scientific inquiry. The use of computer technology to support deterministic methods of scientific inquiry continues in spite of overwhelming scientific evidence that when systems reach certain thresholds of complexity deterministic methods of inquiry are no longer effective.

SUMMARY OF THE INVENTION

It is an object of the present invention to provide a scientifically derived alternative to the continued reliance on the linearity of systems, reductionism, certainty of measurement, the reversibility of systems and induction as the best way to understand and manage complex systems.

It is an object of the present invention to provide an effective science-based method for analogously integrating quantitative scientific reality with qualitative human social process in ways that allow for the more effective management of complex events and situations.

It is an object of the present invention to provide a systematic process for deriving, structuring and manipulating data using computer technology that accounts for the non-deterministic behaviors of complex adaptive systems, supports the integration of quantitative reality with human social process, and assists human beings in the more effective management of complex events and situations.

BRIEF DESCRIPTION OF DRAWINGS

FIG. 3. B. shows that under the complexity systems management method the new center of gravity for risk management shifts from reaction and response to anticipation and prevention and illustrates the risk event continuum.

FIG. 4. B. shows that under the complexity systems management method the new center of gravity for benefit management shifts from reaction and short term sustainment to anticipation and long-term sustainment of benefit.

FIG. 8. presents a detailed process flow diagram of Phase 3. of the CSM Method.

FIG. 9. presents the CSM Method as using a common approach by depicting that all applications of the CSM Method systematically implement the six tenets of a priori optionality.

FIG. 11. B. presents a notional example of a BuildingTQ computer visualization of critical nodes 8. through 14. of building operations.

FIG. 13. presents the Estimate of Event Sequence Interruption (EESI) algorithm.

FIG. 14. presents the Weather and Geological Events (WGE) algorithm.

DETAILED DESCRIPTION OF INVENTION

Figure 1:
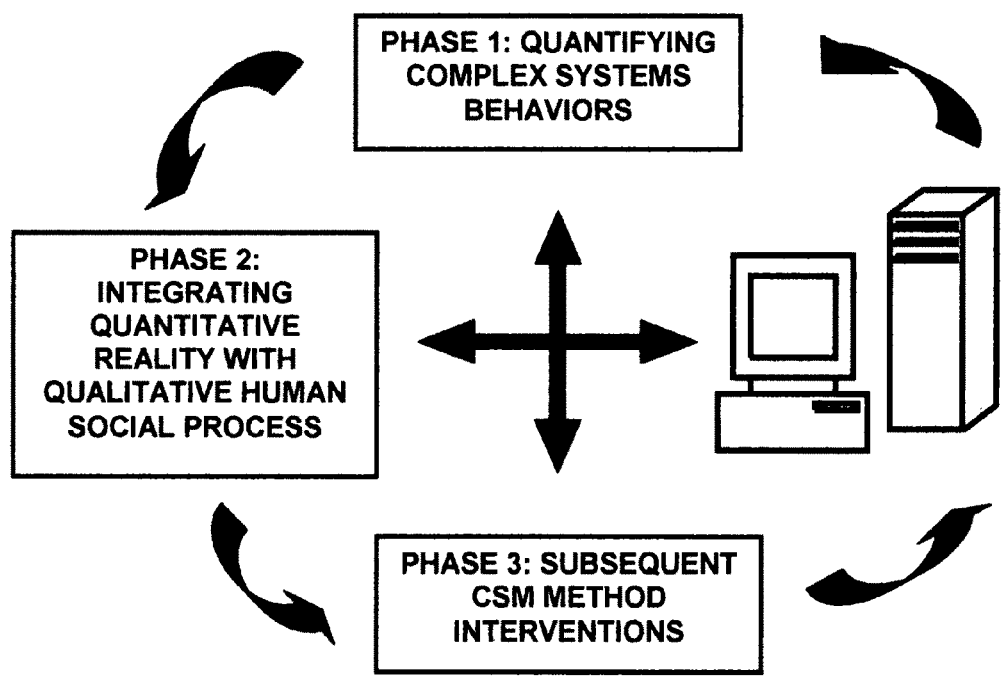
FIG. 1. depicts the CSM Method as a three phase, multi-step, computer supported business process method.

The Complexity Systems Management (CSM) Method is a scientifically derived business process that enhances the human understanding of complex adaptive systems and the improved management of complex events and situations.

The CSM Method is based on scientific evidence that systems are continuously evolving based on systems of systems interactions, i.e., systems are complex and adaptive. The CSM Method is based on scientific evidence that the exact predictability of outcomes when systems reach certain thresholds of complexity is not possible. The CSM Method uses a new scientifically derived business process method to project, versus predict, a range of potential outcomes including non-linear excursions and counter intuitive events that may occur in complex adaptive systems. The projection of a range of potential outcomes, versus exact predictability of outcomes is an object of the present invention.

The CSM Method is based on new scientific evidence that renders obsolete the principle methods of scientific inquiry hitherto used to manage complex systems. The scientific process of triangulation has identified the specific frames of reference used to conceive the predominant methods of scientific inquiry into the behaviors of complex systems and four proven scientific breakthroughs of science. Triangulation is the application and combination of several research methodologies in the study of the same phenomenon. As opposed to relying on one single form of evidence or perspective as the basis for findings, multiple forms of diverse and redundant types of evidence are used to check the validity and reliability of the findings. This is of great importance in said invention because hitherto abstract concepts, notions and subjective views are now, for the first time, rendered in concrete and tangible form suitable for scientific analysis. The identification of specific frames of reference for conceiving the predominant methods of scientific inquiry into the behaviors of complex systems and four proven scientific breakthroughs of science is an object of the present invention.

When the existing frames of reference for today's principal methods of scientific inquiry are compared and contrasted, the scientific evidence shows that they are not sufficient to explain the behaviors of complex adaptive systems. With the emergence of complexity science, a new set of frames of reference emerges rendering obsolete previous methods of scientific inquiry into the behaviors of complex adaptive systems. This is highly significant because the frames of reference for complexity science render obsolete today's predominant methods of scientific inquiry used to explain the behaviors of complex adaptive systems. The discovery of scientific evidence revealing that today's principal methods of scientific inquiry are not sufficient to explain the behaviors of complex adaptive systems is an object of the present invention.

Using the scientific process of triangulation, the specific frames of reference for the two principal methods of scientific inquiry and each of the four breakthroughs of science are identified through the process of triangulation. With the emergence of complexity science five frames of reference predominate, namely, non-linearity, holism, uncertainty (of measurement), irreversibility (of systems) and deduction. The scientific derivation of the specific frames of reference for the two principal methods of scientific inquiry and four breakthroughs of science in concrete and tangible form suitable for scientific analysis is an object of the present invention.

A Priori Optionality is Based on Six Tenets

The five frames of reference of non-linearity, holism, uncertainty (of measurement), irreversibility (of systems) and deduction form a new principle of science called a priori optionality. A priori optionality systematically applies these five frames of reference to enhance the understanding of complex adaptive systems and the management of complex events and situations. Based on these five frames of reference, six tenets were scientifically derived to create a new method of scientific inquiry to guide the systematic implementation of the CSM Method business process, namely:

1. The application of linear deterministic methods, when coupled with the imprecise mathematical constructs we use to measure large complex systems, contribute to the inability to predict with precision the future behavior of any complex system.
2. Because of the irreversibility of systems, systems of systems interactions, i.e., interdependencies, and randomness, there can be no single exact prediction of the future behavior of a complex system or system of systems.
3. There exist no absolute bounds of certainty in a complex system within which different behaviors may occur. This is because the bounds within which different behaviors, i.e., events, occur change based on the evolving adaptations of the system itself resulting from continuous systems of systems interactions with the environment in which it exists. In such environments, nothing is ever exactly predictable because nothing ever stays exactly the same.
4. The irreversibility of systems, systems of systems interactions and randomness show that nothing that has happened in the past will ever occur again exactly as it occurred initially. Only by thinking about a range of potential events that may occur within the bounds of the patterns of behavior we observe in complex systems can we predict, albeit in inexact terms, a possible range of future behavior of any complex system.
5. Because of the compounding effects of systems of systems interactions and randomness, as systems become larger and larger the validity of the assumptions upon which we explain the behavior of complex systems must be continuously assessed to revalidate the fundamental rule sets that define the patterns of behavior we observe in large complex systems.
6. While the exact prediction of the future behavior of complex systems is not possible, the potential future behaviors of a complex system can be imprecisely projected. In complex systems, fundamental rule sets bound how initial conditions propagate to produce different systems behaviors. Because of systems of systems interactions, i.e., system interdependencies, we must continuously revalidate the fundamental rule sets we use to define the bounds of a system's behavior.

The scientific derivation of the six tenets of a priori optionality to form a new method of scientific inquiry into the behaviors of complex adaptive systems is an object of the present invention.

The CSM Method is a Computer Supported Three Phase, Multi-Step Process that Systematically Implements the Six Tenets of a Priori Optionality As depicted in FIG. 1., the CSM Method is a computer assisted, three-phase, multi-step process that systematically implements the six tenets of a priori optionality to produce a new business process method for managing complex adaptive systems and complex events and situations. Specified data produced by the process is structured for repeatability, digitized and archived in a CSM Method knowledgebase that is updated as an integral part of the CSM Method business process. The unique means of structuring data for repeatability under the CSM Method business process is an object of the present invention.

Phase 1: Quantifying Complex Systems Behaviors

Figure 2A:
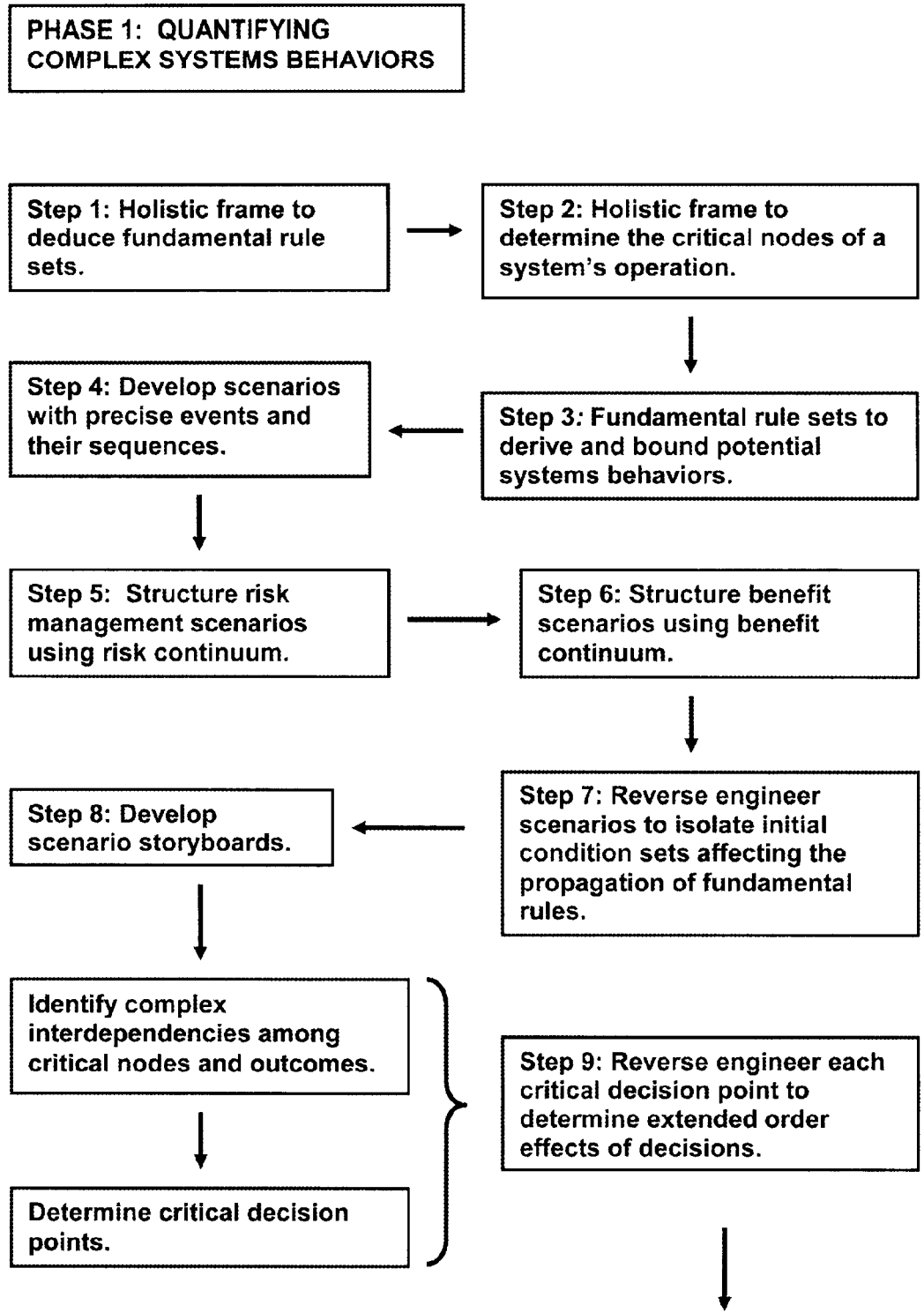
FIGS. 2.A. and 2.B. present a detailed process flow diagram of Phase 1. of the CSM Method.
Figure 2B:
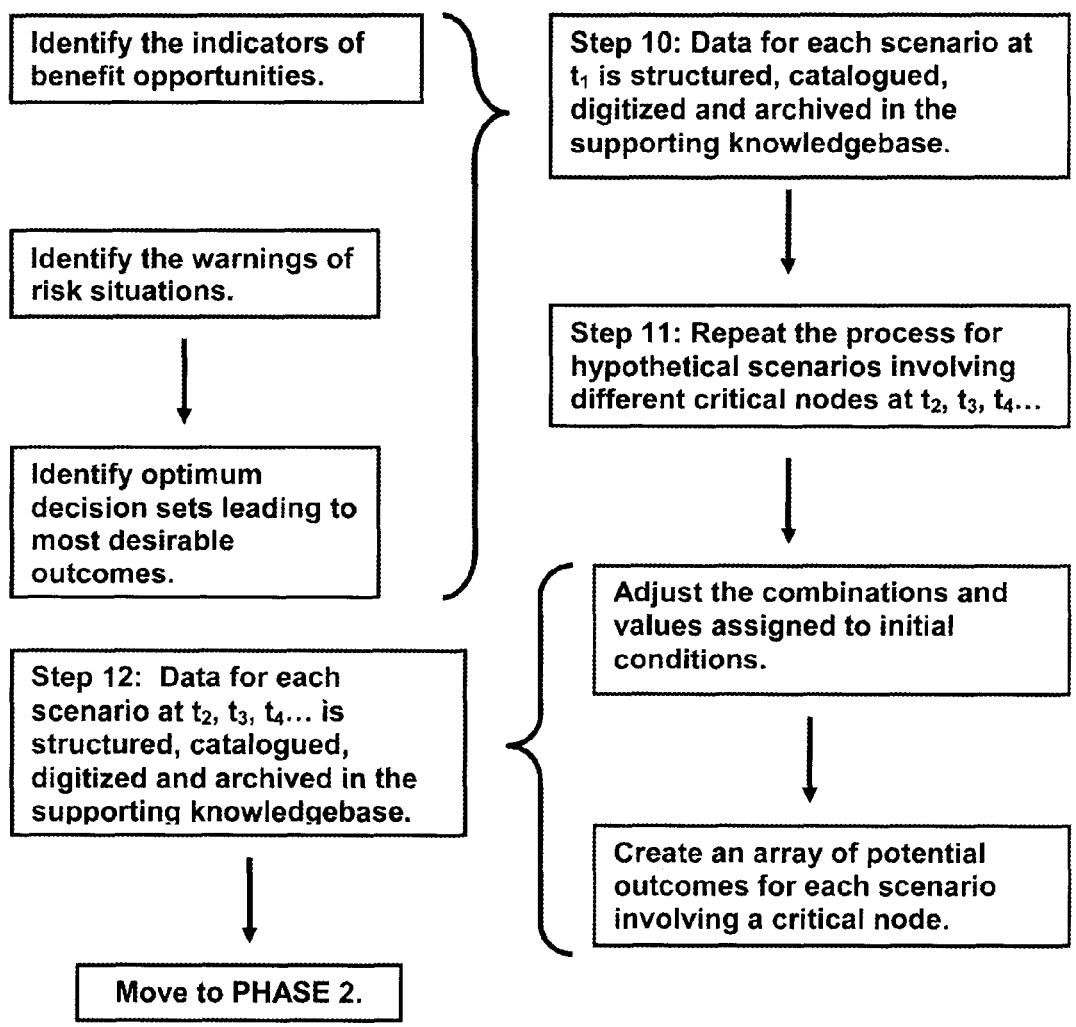

FIGS. 2.A. and 2.B. present a process flow diagram of the Phase 1: Quantifying Complex Systems Behaviors multi-step process used to systematically implement the CSM Method based on the six tenets of a priori optionality. Phase 1. of the CSM Method consists of twelve distinct process steps. Each step of Phase 1. of the CSM Method is described in detail below. The purpose of Phase 1. of the CSM Method business process is to quantitatively examine the behavior of a complex system. During Phase 1., complex systems are examined from the holistic frame of reference to identify patterns of interest, i.e., behaviors, exhibited by a complex system or systems of systems.

During phase 1., selected patterns of complex systems behavior are quantified and "reverse engineered." For example, a traffic system is one example of a complex adaptive system that may exhibit many different patterns of behavior. A traffic jam at a particular location is just one example of a traffic system exhibiting a pattern of behavior that can be quantified and reverse engineered.

Complexity scientists hold that a holistic perception of a system (or interacting systems of systems) beginning with deduction can lead to the observation of simplicities or patterns that can provide insights about the behavior of complex systems or systems of systems.

Scientific evidence shows that the behavior of complex interdependent systems can be understood by identifying the underlying rule sets, i.e., fundamental rule sets that define their patterns of behavior. For example, all traffic jams can be explained, at their most fundamental level, in terms of three simple rules. First, the driver of an automobile by applying foot pressure on the accelerator can choose to speed up a vehicle. Second, the driver of an automobile by relieving foot pressure on the accelerator can choose to slow down a vehicle. Third, the driver by applying foot pressure on the brake can slow down or completely stop a vehicle.

Scientific evidence shows that variations in initial conditions, e.g., volume of traffic, number of lanes, weather conditions, the aggressiveness of individual drivers, enforcement of speed limits and many other factors can influence in what combinations individual drivers exercise these three basic rules and how the effects of their individual behaviors multiply. Thus, the right combination of driving conditions and how this influences the exercise of these basic rules by drivers can either cause or prevent traffic jams. But, of course, the wild card in all of this is the assumption that drivers will act rationally and respond in a consistent fashion to initial and subsequent changes in driving conditions. All of us know too well that human beings do not always act rationally—some drink while driving, pass in violation of double yellow solid lane markings, engage in acts of road rage, enter into high speed chases with the police and otherwise behave in ways that defy rational explanation—at least in quantitative analytical terms.

In complex systems we are also confronted with the notion of randomness as a fundamental characteristic of nature. In complex systems this means that even minor deviations in initial conditions due to random deviation can produce unimaginably different end states. The notion of randomness renders obsolete the positivist reliance on linear cause and effect, certainty of measurement, the reversibility of systems, reductionism and induction as the best way to understand the behaviors of complex systems. Scientific evidence that the notion of randomness renders obsolete the positivist reliance on deterministic methods to best understand complex systems is an object of the present invention.

Fundamental rule sets that bound patterns of behavior in complex systems are deduced using analogous scientific methods. Science tells us that metaphor is a figure of speech that we transfer to something that is not directly applicable in order to illuminate by highlighting or providing a unique interpretation. For example, we often hear politicians and economists say things such as "we need to put the brakes on inflation" or "we need to step on the accelerator to speed up the economy." But while metaphors help to illuminate, politicians and economists do not really mean that we should design a macroeconomic policy or system based on the parts of a car. Scientists go on to say that analogy is different because it asserts some level of direct similarity or difference between the elements of two or more different domains and the causal relationships driving them. Analogies are usually used to connect one well-understood domain to one less well understood by extrapolating similarities. Science tells us that using analogy to extrapolate between domains one can then devise empirical tests to prove or disprove similarities or differences as one moves from one well-understood domain to another less understood domain. For example, one leading scientist on the behavior of complex systems reminds us that Huygens extrapolated the wave theory of light based on the better-understood and empirically tested notions of sound waves. Similarly, he tells us that Fourier's theory of heat conduction was based on better-known laws associated with the flows of liquids (Rosenhead, 1998). The use of analogous methods for scientific extrapolation using the CSM Method is an object of the present invention.

Care is taken to discriminate between initial conditions and fundamental rule sets. In complex systems, fundamental rules sets bound the manner in which initial conditions propagate to produce different behaviors of systems. Multidisciplinary expertise is used to assure that a variety of perspectives and knowledge are brought to bear in deducing fundamental rule sets that define the behavior of a complex system versus the initial condition sets that can affect how the observed behavior may propagate in the complex system. This includes recognition of significant qualitative social process factors that can affect the manner in which human beings exercise the fundamental rule sets defining and bounding the propagation of patterns of complex systems behavior that are addressed as part of Phase 2. of the CSM Method business process. The systematic integration of quantitative reality with human social process is an object of the present invention.

Based on the fundamental rule sets defining the behavior being observed, the critical nodes of system operation are determined. The critical nodes of a complex system are those core interrelationships within the system itself that are particularly sensitive to changes in initial conditions. The critical nodes of a complex system, if significantly affected, upset the equilibrium of a system and result in its evolution or devolution. This is akin to the scientific findings that the stability of a turbulent gaseous system is a function of energy gain or loss as described in dissipative structure theory (Prigogine, 1998). It is also akin to the deduction of rule sets that discriminate between initial conditions and fundamental rule sets as exemplified by traffic systems and the occurrence of traffic jams (Resnick, 1999). The characterization of critical nodes as those core interrelationships within the system itself that are particularly sensitive to changes in initial conditions, is an object of the present invention.

Since the application of linear deterministic methods, when coupled with the imprecise mathematical constructs we use to measure complex systems contribute to our inability to precisely predict the future behavior of any complex system, a range of potential scenarios of potential future systems behaviors are developed. Using fundamental rule sets to define and bound potential systems behaviors, a range of possible scenarios using different combinations of initial conditions that affect the critical nodes of the system are derived. These scenarios reflect the different ways in which human beings can exercise fundamental rule sets to propagate an array of potential outcomes. Abandoning the notion of exact predictability in complex systems due to randomness and the imprecision of the mathematical constructs we use to measure complex systems is an object of the present invention.

Each potential scenario that could affect a critical node of system operation is reverse engineered. During the process of reverse engineering each critical node of system operation, the initial conditions that affect the critical node of system operation are identified. The specific series or sequence of events for each scenario that would have to occur to significantly affect each critical node of operation is identified. This is known as an "Estimate of Event Sequence Interruption (EESI)". This is accomplished using real or imaginary combinations of initial conditions and assessing their relative impact on the manner in which fundamental rules sets are exercised to propagate a pattern of behavior in a complex system. The development and application of the EESI algorithm is an object of the present invention.

As scenarios are reverse engineered, great care is taken to identify and structure the precise events and the sequence in which they must occur for a given event to take place in the real world. For risk applications, scenarios are structured along a time continuum that begins with earliest possible detection of an adverse event moving sequentially through deterrence, prevention, response and the mitigation of consequences should the event occur. The structuring of exact event sequences along a time continuum using the CSM Method is an object of the present invention.

Structured responses to the following two questions are developed for each hypothetical risk scenario: 1) what information had it been known before the adverse situation happened could have been used to prevent it from happening in the first place? and; 2) what information had it been known before the adverse situation occurred could have used to mitigate its consequences? These become the warnings of impending adverse events and the subject of structured intelligence data collection strategies designed to identify warning signals as early as possible to interrupt event sequences in order to prevent adverse outcomes before they occur. Specific warnings of impending adverse events and structured intelligence data collection protocols to proactively identify these warning signals is an object of the present invention.

For benefit applications, scenarios are structured along a time continuum that begins with earliest possible recognition of an opportunity moving sequentially through strategy development to take advantage of the opportunity, specific actions to capture the opportunity and short and long-term sustainment of beneficial outcomes. Structured responses to the following two questions for each real or hypothetical benefit scenario are developed: 1) what information had it been known before the opportunity was first recognized could have been used to recognize and act on it sooner? and; 2) what information had it been known beforehand could have been used to sustain the benefits of the opportunity longer? These become the indicators of impending opportunities and the subject of structured intelligence data collection strategies designed to identify opportunities as early as possible and sustain optimum event sequences, i.e., those of greatest benefit, in both the short and long term. The derivation of specific indicators of impending opportunity and structured intelligence data collection to identify these indicators as early as possible is an object of the present invention. Quantitative, i.e., science-based, models are used to analogously extrapolate the extended order effects of the outcomes of possible decisions that could be made to manage each scenario. This is significant because the CSM business process discriminates between the uses of metaphor in favor of science-based analogical rigor. The application of analogical rigor (versus metaphorical fancy) as a scientific tool to extrapolate from one well known knowledge domain to another is an object of the present invention. Computer supported collaborative tools such as Group Systems and Meeting Works® are used to guide and consistently structure knowledge generation and capture.

Consistent with the tenets of a priori optionality, the relative impacts of initial conditions expressed as mathematical values are imprecise because of the irreversibility of systems, continuous systems of systems interactions and the imprecision of the mathematical constructs we use to measure complex systems. In other words, the CSM business process is based on the fundamental premise that there exist no single correct answers to explain complex system behaviors. For this reason, specific sequences of events and different combinations of initial conditions (in a real or imagined system) are considered in terms of a range of potential outcomes as bounded by fundamental rule sets. The fundamental premise that there exist no single correct answers to explain complex system behaviors and the requirement to analyze a plurality of potential event outcomes within the bounds of fundamental rules is an object of the present invention.

Consistent with the tenets of a priori optionality we recognize that the bounds within which patterns of systems behavior arise are inexact and ever-changing because of systems of systems interactions that affect fundamental rule sets. The fundamental rule sets, initial conditions, sequence of events and the potential outcomes for each scenario involving a critical node of operation, the warnings of adverse situations and the indicators of opportunity situations are structured, catalogued and archived in a supporting CSM Method computer knowledgebase. Utilizing the same rule sets initially deduced, an array of future system behaviors can then be simulated by adjusting the relative values of initial conditions affecting the manner and degree to which fundamental rule sets are exercised to propagate system behaviors that can, in turn, affect critical nodes of systems operation. The scientific finding that initial conditions affect the propagation of fundamental rules to produce different systems behaviors is an object of the present invention.

The assumptions, upon which fundamental rule sets are initially deduced, however, must be continually reassessed based on systems of systems interactions. For example, significant step advances in technology development can change the fundamental rule sets upon which complex systems behave. In the case of a traffic system and the application of analogy, imagine a future time; say 150 years from today, when personal vehicles operate on the principle of magnetic levitation via centrally controlled computer secure automated data acquisition (SCADA) networks in order to optimize safe, efficient and very large volume traffic flows in highly complex traffic systems. While the observed behavior of speeding up, slowing down and stopping a vehicle remains the same, the fundamental rule sets defining and bounding the behavior of the traffic system would have significantly changed. In such a different traffic system, the notion of a driver putting their foot on the brakes to stop the vehicle would no longer represent a fundamental rule of the behavior of the traffic system. The fundamental rule set guiding the behavior of the complex traffic system has changed and with it, the relative importance of initial conditions that propagate how system behaviors will multiply. The scientific finding that the assumptions upon which fundamental rule sets are deduced must be continually reassessed based on systems of systems interactions is an object of the present invention.

Figure 3:
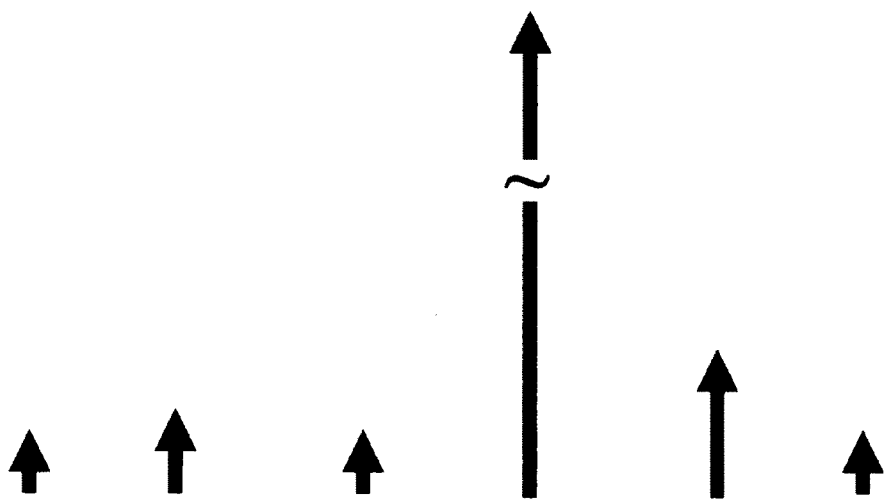
FIG. 3. A. presents the current center of gravity for risk management as a function of reaction and response and illustrates the risk event continuum.
Figure 3:
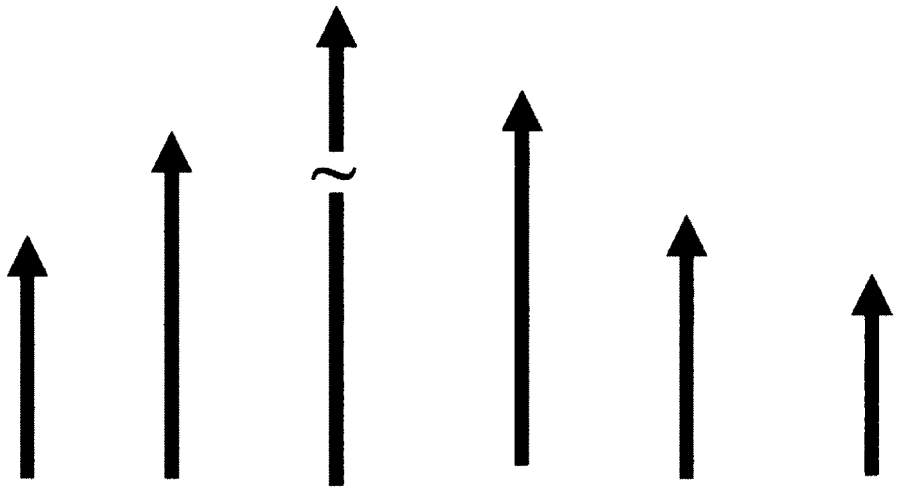

Phase 1. of the CSM Method business process is concluded by developing simulations that portray a projected range of systems behavior based on interactions among critical nodes using the data previously developed and archived in the supporting CSM Method knowledgebase. These simulations are designed to reflect complex interdependencies among different critical nodes and their effects on outcomes. As depicted in FIGS. 3. A. and 3.B., for risk applications, storyboards follow an event continuum from earliest possible detection of an adverse event through deterrence, prevention, response and mitigation of consequences. Special attention is paid to the relationships between and among deterrence, detection, prevention, response, mitigation and recovery. For example, actions taken to respond to a given event can have a major effect on mitigating the consequences of an event. Mitigating the consequences of an adverse event can positively affect long term recovery. The creation of risk event continuum from earliest possible detection of an adverse event through deterrence, prevention, response and mitigation of consequences is an object of the present invention.

FIG. 3. A. illustrates that the current center of gravity for risk management rests on reaction with principal attention focused on ex post facto response to events. Scientists remind us that if organizations fail to prevent adverse events that can quickly escalate from contingencies to disasters to catastrophes, they lose competitive advantage.

FIG. 3. B. illustrates the shift in the center of gravity from react and respond to the anticipation and prevention of adverse events under the CSM Method business process. If organizations can prevent adverse events before they happen or more effectively mitigate their consequences they gain competitive advantage. The systematic method used under the CSM Method to prevent adverse events before they happen or, when necessary, more effectively mitigate their consequences is an object of the present invention.

Figure 4:
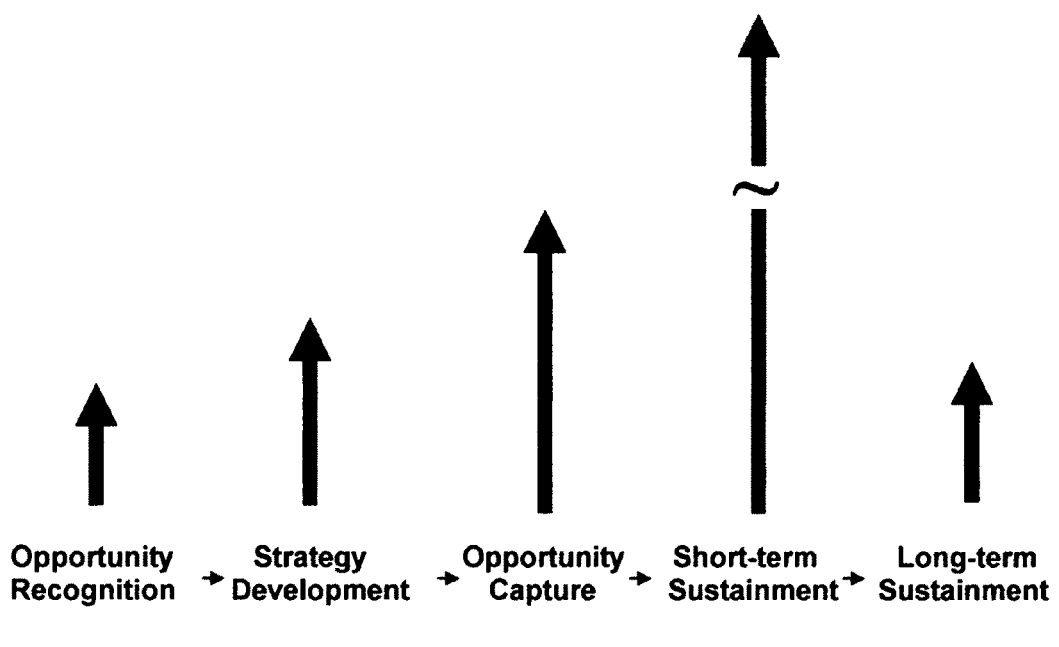
FIG. 4. A. shows the current center of gravity for benefit management as a function of reaction and short-term sustainment and illustrates the benefit event continuum.
Figure 4:
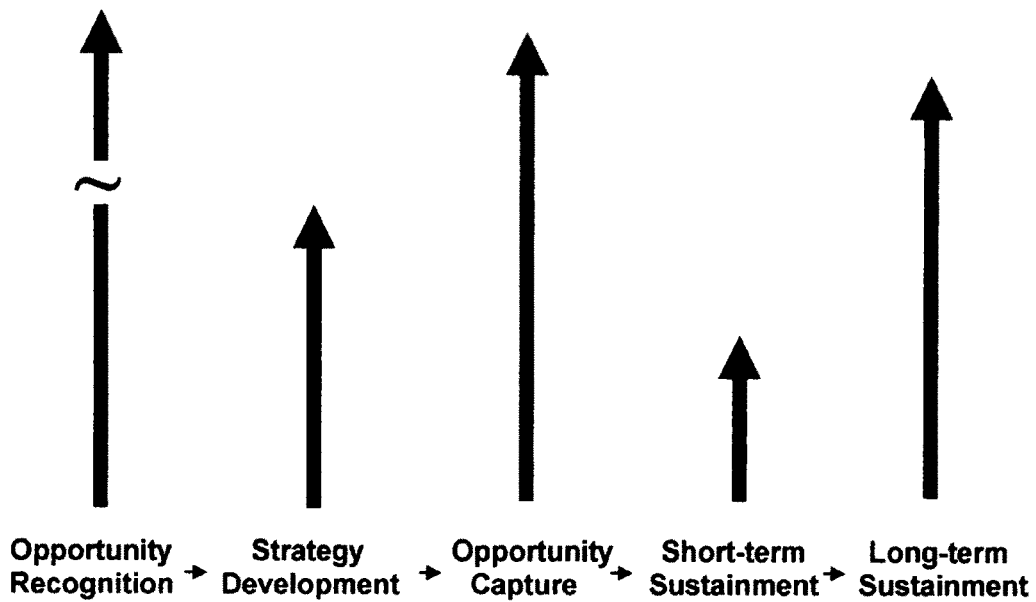

As depicted in FIGS. 4. A. and 4. B., for benefit applications, storyboards follow an event continuum from the earliest possible recognition of opportunity, through the development of a strategy to exploit the opportunity, the implementation of a strategy to capture the opportunity, the short-term sustainment of the opportunity to the long-term sustainment of the opportunity. Special attention is paid to the relationships between and among opportunity recognition, strategy development, opportunity capture and short and long-term sustainment. For example, strategies used to capture an opportunity may affect both short and long-term sustainment.

FIG. 4. A. illustrates that the current center of gravity for benefit management rests on reaction with principal attention focused on short-term sustainment of opportunity. Scientists remind us if organizations do not recognize opportunity and act to capture and sustain it for the long-term, they can lose their competitive advantage.

FIG. 4. B. illustrates the shift in the center of gravity from react and short term sustainment to the earliest possible anticipation of opportunity, capture, and long-term sustainment of the benefits of the opportunity under the CSM Method business process. In this way, the organizations of the future will achieve and maintain competitive advantage. The early identification of opportunity events before they happen and their sustainment is an object of the present invention.

Those critical points within a simulation where decisions must be made to exploit the evolution or avoid the uncontrolled devolution of a system are identified. These are called critical decision points. Multidisciplinary teams reverse engineer each critical decision point in a simulation carefully considering the risk and/or benefit continuum and the outcomes and extended order effects of different decision options. The method of identifying critical decision points and the systematic method of reverse engineering them is an object of the present invention.

Out of the range of possible decisions, the optimum decision sets in a simulation that lead to the most desirable outcome(s) are identified. The supporting rationale for selected decisions, in both quantitative and qualitative terms is structured, digitized and indexed using consistent methods to assure repeatability, i.e., understanding the meaning of the data for re-use at $t_2$, $t_3$, $t_4$ and so on, and archived in the supporting knowledgebase. The systematic, science-based process for determining best optimum decision sets is an object of the present invention.

The consequences of decisions and the warnings and indicators of risk or benefit applications, respectively, are identified and structured. Computer supported collaborative tools such as Group Systems and Meeting Works® are used to guide and consistently structure knowledge generation and capture during this process. These computer supported collaboration tools also help to assure the repeatability by organizing both structured and unstructured information as data to a supporting CSM Method knowledgebase in ways that the data can be readily understood by subsequent users, i.e., repeatable information. The methods used to structure data for repeatability is an object of the present invention.

Computer graphic representations of critical nodes of operation, models visualizing systems and systems behaviors, decision outcomes and the extended order effects of decisions to include decision maps, decision fault trees, and other computer visualization techniques are developed in preparation for Phase 2. of the complexity systems method. The use of tailored computer visualization platforms to guide the implementation of the CSM Method and structure data for repeatability is an object of the present invention.

Summary of the Twelve CSM Method Phase 1. Business Process Steps

1. Complex systems are examined from the holistic frame of reference to deduce the fundamental rule sets that define and bound the propagation of a real (or imaginary) system's behavior being observed at $t_1$. For example, in the case of scientific research on traffic systems, the fundamental rule sets that result in a traffic jam would be deduced using analogous scientific methods. The initial conditions and the fundamental rules sets that bound how initial conditions propagate to produce different systems behaviors are isolated. For example in our traffic system analogy the rule sets bounding the system's behavior to produce a traffic jam, i.e., press your foot down on the accelerator, take your foot off the accelerator and put your foot on the brakes, are discriminated from the initial conditions that affect how the rules are exercised by human beings driving cars, e.g., weather conditions, drunken drivers, road rage, road construction, broken down cars, etc.

2. The complex system is viewed holistically to determine the critical nodes of a system's operation, i.e., those core interrelationships or activities unique to a given system that are particularly sensitive to changes in initial conditions. For example, in the case of a traffic system we could view a geospatial image of a specified geographic area and look for major population centers, the convergence of major roadways where large amounts of traffic must flow and other factors. In a traffic system, such areas would be especially sensitive to the types of initial conditions described in Step 2. because people would be more likely to exercise the three fundamental rule sets in a different combination to produce traffic jams. In this case, an adverse event would lead to more people taking their foot off the accelerator, applying the brakes and accelerating less frequently and to a lesser degree thus producing a traffic jam.

3. Using fundamental rule sets to define and bound potential systems behaviors, a range of possible scenarios using different combinations of initial conditions that affect the critical nodes of the system at $t_1$ are derived. For example, in a large traffic system we might consider a severe rainstorm that floods major roadways, a dramatic increase within a specified time period of incidents of road rage, a major accident involving a gasoline fuel truck or other initial conditions that may occur either singly or in combination involving a critical node(s) of a traffic system.

4. Scenarios are developed which identify and structure the precise events and their sequence that must occur for a given event to occur in the real world. See Table 11. and FIG. 15. For example, in our traffic system example, what initial conditions would have to occur and in what sequence to result in the long term closure of a major interstate highway in relation to the fundamental rules bounding the system?

5. For risk applications scenarios are structured along a time continuum that begins with earliest possible detection of an adverse event moving sequentially through deterrence, prevention, response and the mitigation of the consequences of an event. Structured responses to the following two questions are developed for each hypothetical risk scenario: a) what information had it been known before the adverse situation happened could have been used to prevent it from happening in the first place? and; b) what information had it been known before the adverse situation occurred could have used to mitigate its consequences? These become the warnings of impending adverse events and the attention of structured intelligence data collection strategies designed to interrupt event sequences as early as possible to prevent adverse situations. See Table 11.

6. For benefit applications, scenarios are structured along a time continuum that begins with earliest possible recognition of an opportunity moving sequentially through strategy development to take advantage of the opportunity, specific actions to capture the opportunity and short and long-term sustainment of benefit. Structured responses to the following two questions for each hypothetical benefit scenario are developed: a) what information had it been known before the opportunity was first recognized could have been used to recognize and act on it sooner? and; b) what information had it been known beforehand could have been used to increase and sustain the benefits of the opportunity longer? These become the indicators of impending opportunities and sustainment and the subject of focused intelligence data collection strategies designed to identify opportunities as early as possible and sustain optimum event sequences, i.e., those of greatest benefit in the short and long term. See FIGS. 4. A. and 4. B.

7. Each scenario is reverse engineered to isolate how potential i would affect the manner in which people exercise the fundamental rule sets that in combination serve to propagate systems behaviors that, in turn, affect the critical nodes of a system's operation. For example, using the traffic system analogy how might a snowstorm leading to the jack-knifing of gasoline tanker on a major interstate at mile marker 7 during rush hour affect the manner in which people would exercise the three fundamental rule sets that result in traffic jams? Values representing the relative effect of one or a combination of initial conditions on the manner in which fundamental rule sets are exercised to propagate a systems behavior observed at $t_1$ are derived and considered in terms of their potential outcomes. For example, suppose the snowstorm alluded to above was only minor relative to normal snowfalls during a storm and average seasonal weather conditions for the area. But the jack-knifing of the gasoline fuel tanker resulted in a rupture of the tank requiring road closure and the dispatch of special environmental response teams for clean up. And, suppose that an intersection with another feeder interstate roadway known for its very heavy traffic volumes during rush hour was located at mile marker 7 and the tanker jack-knifed at the height of rush hour. What would be the relative importance and sequence of these initial conditions in affecting how people would exercise the three fundamental rules bounding the occurrence of a traffic jam? Clearly, conditions such as these would affect the manner in which people exercise fundamental rule sets leading to traffic jams. More time spent with your foot on the brake instead of on the accelerator. The immediate effect would be a traffic jam. Extended order effects could include delays in clean up because of weather conditions, blockage of emergency shoulder response routes because of the confluence of multiple first responders such as police, fire, and hazardous materials team (HAZMAT) responders, ambulances and other first responders trying to access the scene using the limited capacity of the shoulders of the roadway, etc. The systematic derivation of the extended order effects for a range of potential scenarios and decision outcomes is an object of the present invention.

8. Based on the results of reverse engineering scenarios involving critical nodes of systems operation, storyboards are developed to produce simulations of risk or benefit situations that can affect the system. These simulations are designed to reflect complex interdependencies among different critical nodes and their effects on outcomes. The critical decision points within each simulation, i.e., those points where decisions must be made to avoid the uncontrolled evolution or devolution of a system, are identified. For example, using our traffic system analogy suppose our fuel tanker spill at mile marker 7 has resulted in a complete closure of all four lanes of traffic and a traffic backup along the highway is building at a rate of approximately one mile every two minutes (stopping approximately 1450 cars and trucks per mile). The previous exit off of the interstate is at mile marker three. The next previous exit is 22 miles farther back up the interstate. Based on a quantitative analysis of the situation, a critical decision point in an accompanying simulation would occur four minutes from the time the interstate was closed at mile marker 7. If a decision is not made to detour traffic at the mile marker 3 exit within four minutes, traffic will continue to back up for at least another 22 miles potentially placing up to 32,000 cars in gridlock.

9. Each critical decision point in a simulation is reverse engineered carefully considering the risk and/or benefit continuum, the outcomes and extended order effects of different decision options, and the identification of warnings and/or indicators of risk and benefit situations. Out of the range of possible decisions, the optimum decision sets in a simulation that lead to the most desirable outcome(s) are identified. In our example above, the optimum decision could be to immediately close the roadway at mile maker 3 and detour traffic off the interstate to secondary roadways in order for traffic to bypass the accident at mile marker 7.

10. The fundamental rule sets, associated initial conditions, the sequence of events associated with different scenarios, arrays of potential outcomes for each scenario involving a critical node of operation and the warnings and/or indicators or risk or benefit situations for $t_1$ are structured, catalogued and archived in a supporting CSM Method business process knowledgebase.

11. The process is repeated for hypothetical scenarios involving the same and other critical nodes at $t_2$, $t_3$, $t_4$ and so on by adjusting the combinations and values assigned to initial conditions to create an array of event paths with different potential outcomes for each of the critical nodes of system operation that are bounded by the fundamental rule sets deduced during Step 1. of the CSM Method business process. Outcomes are derived for each scenario based on the relative affect of one or a combination of initial conditions and the manner in which associated fundamental rule sets are exercised to propagate a systems behavior observed at $t_2$, $t_3$, $t_4$, and so on.

12. The fundamental rule sets, associated initial conditions, the sequence of events associated with different scenarios, arrays of potential outcomes for each scenario involving a critical node of operation and the warnings and/or indicators of risk or benefit situations for additional scenarios are structured for repeatability, catalogued and archived in a supporting knowledgebase.

Phase 2: Integrating Quantitative Reality with Qualitative Human Social Process

Figure 5A:
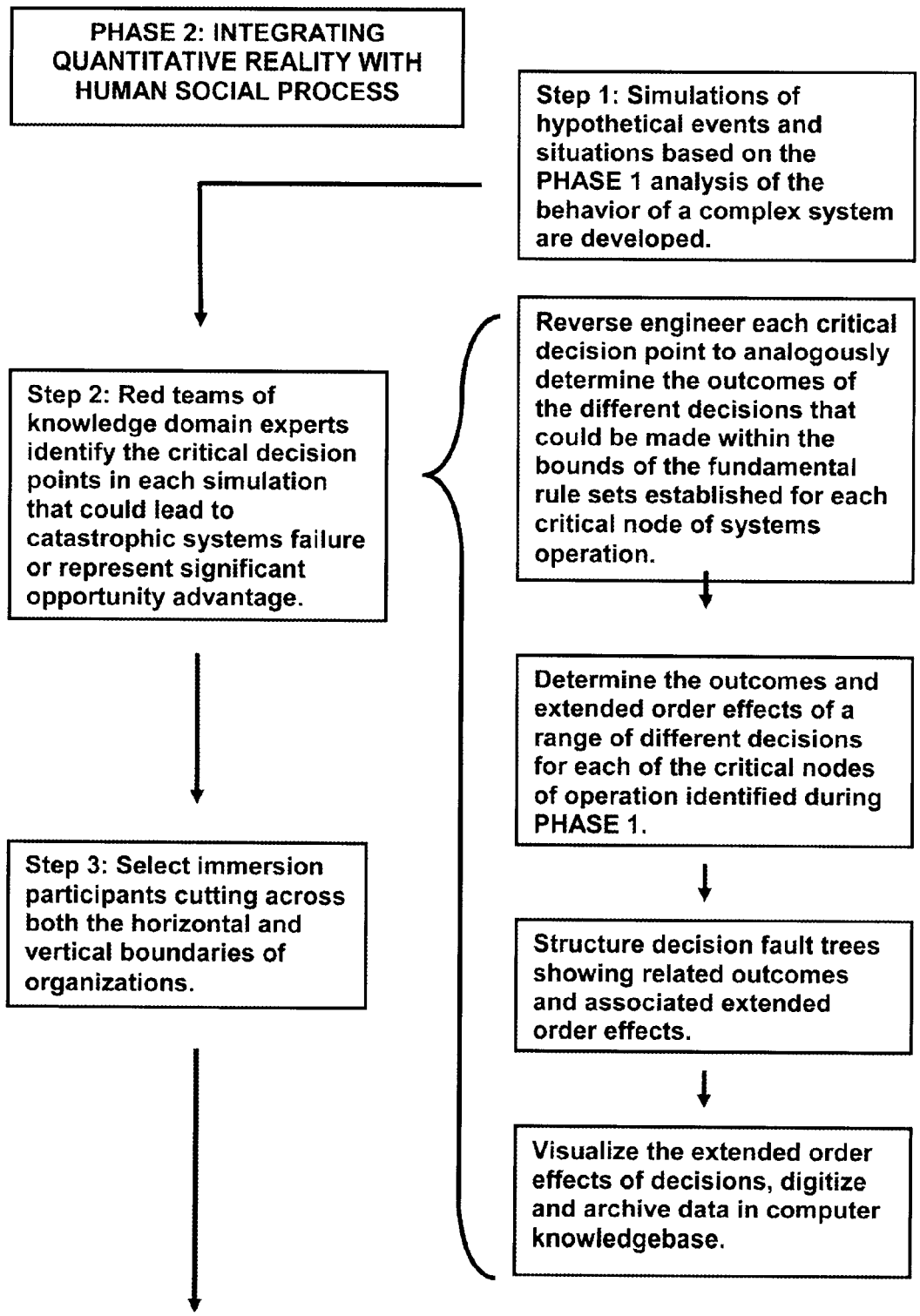
FIGS. 5.A., 5.B. and 5.C. present a detailed process flow diagram of Phase 2. of the CSM Method.
Figure 5B:
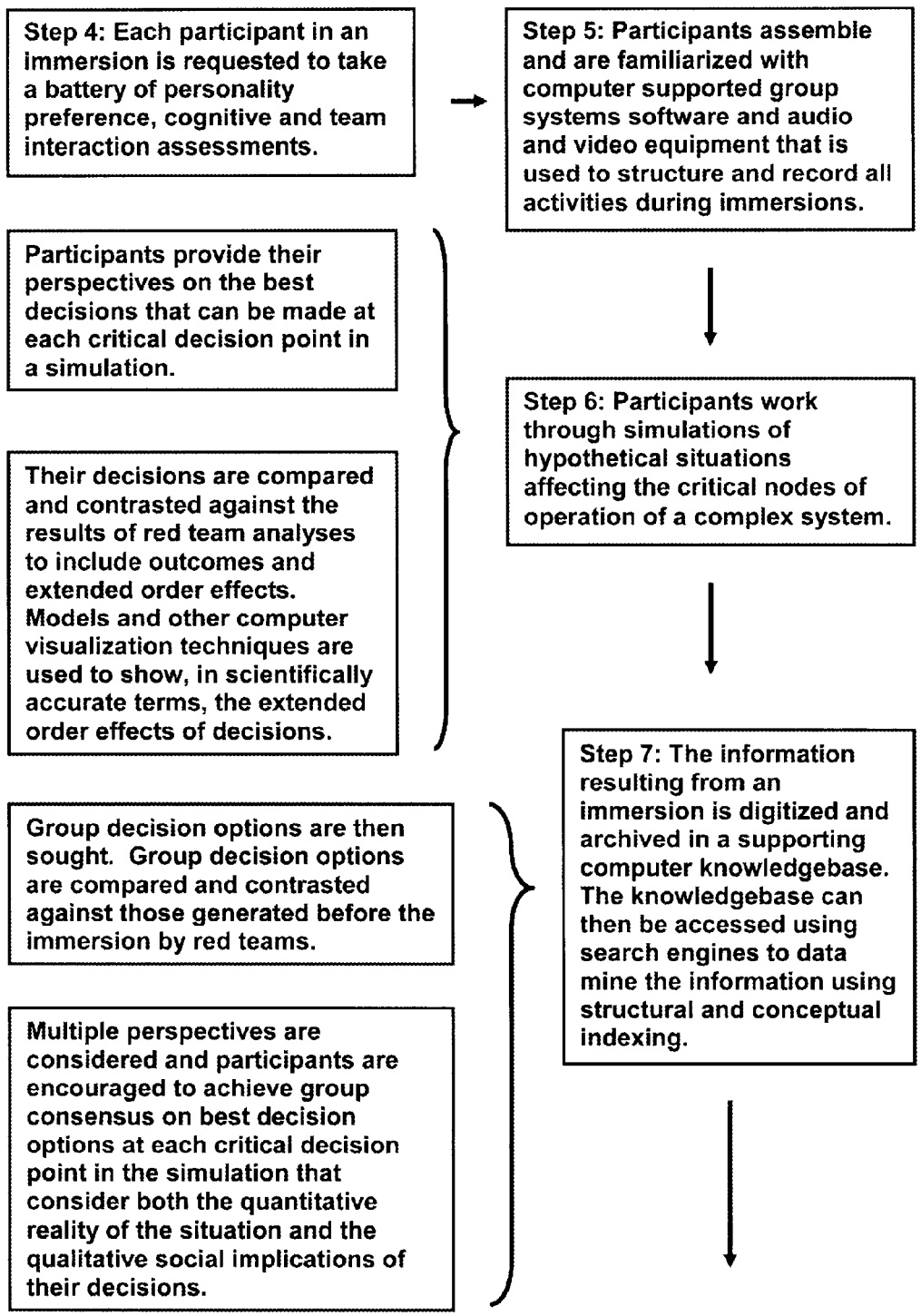
Figure 5C:
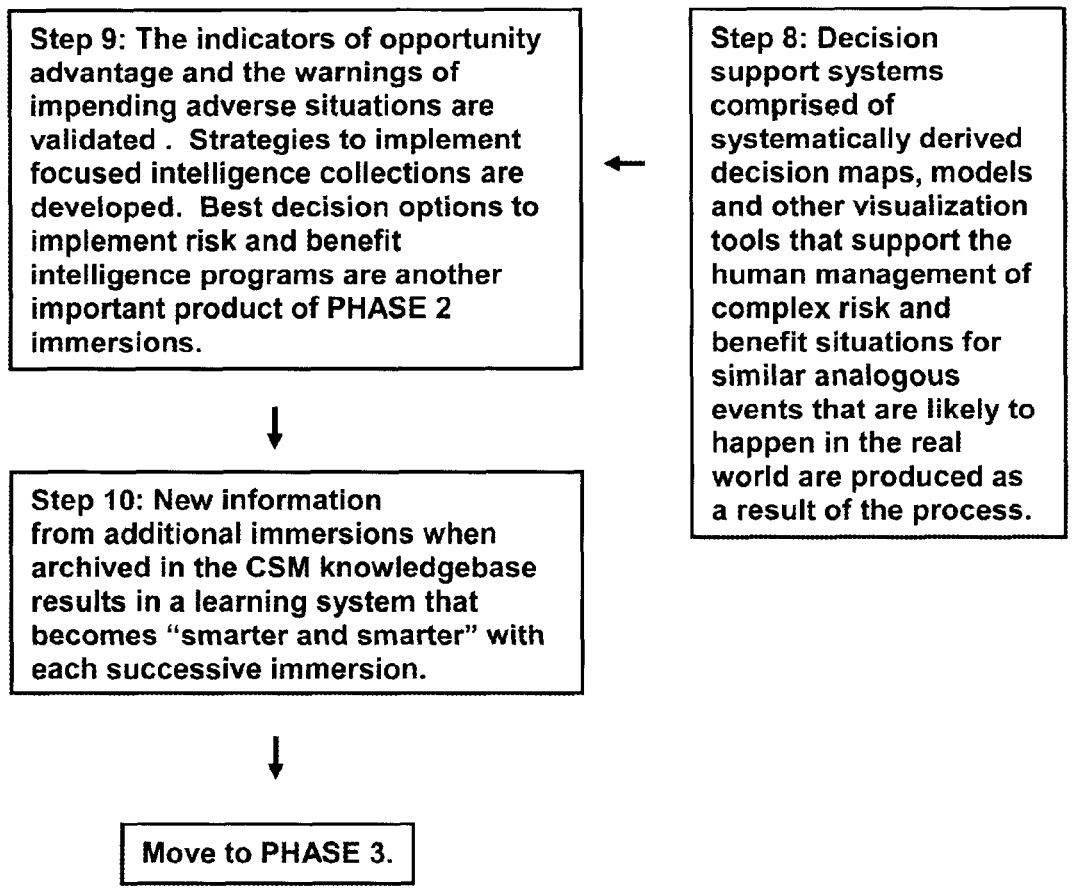

FIGS. 5.A., 5.B. and 5.C. present a process flow diagram of the Phase 2: Integrating Quantitative Reality with Qualitative Human Social Process multi-step process used to systematically implement the CSM Method based on the six tenets of a priori optionality. Phase 2. of the CSM Method consists of ten distinct process steps designed to analogously bridge the gap between quantitative reality, i.e., ground truth, as determined during Phase 1. and qualitative human social process. Each step of Phase 2. of the CSM Method is described in detail below.

The purpose of Phase 2. of the CSM Method business process is to address the current lack of a science-based methodology that analogously integrates quantitative technology factors with qualitative social process factors in the context of complex interdependent systems and the human management of complex events and situations. Phase 2. of the complexity systems method focuses on the systematic integration of the quantitative reality of complex interdependent systems as developed during Phase 1. with the qualitative social processes that affect the human management of complex events and situations. The systematic integration of quantitative reality with human social process is an object of the present invention.

Phase 2. of the process uses what are called immersions to bring select groups of decision makers and subject matter experts who would be involved in managing an event in the real world together to manage hypothetical simulations of complex events and situations based on the scenarios developed and reverse engineered during Phase 1. of the CSM Method and the six tenets of a priori optionality. The scientific method of a priori optionality and its integration throughout all phases of the CSM Method business process is an object of the present invention.

Phase 2. immersions allow policy makers and subject matter experts to consider complex situations before they happen in the real world. They are provided with the opportunity to systematically consider and plan in advance for complex contingencies and create risk and benefit decision support templates that can be used to guide decision making when similar analogous events happen in the real world. The creation of pre-agreed risk and benefit decision support templates that can be archived in the CSM Method knowledgebase and readily retrieved for use by human beings to manage real world events is an object of the present invention.

During phase 2. of the complexity systems management method, subject matter experts and decision makers, cut across both the horizontal and vertical boundaries of organizations, are brought together in an immersion. This is done to encourage shared situational awareness from the policy to the operational level. Cutting across organizations both vertically and horizontally to identify immersion participants to increase situational awareness and diversity of inputs is an object of the present invention.

Analogously derived science-based simulations of hypothetical events and situations involving systems relationships among critical nodes of operation of a complex system are used during immersions. As noted previously, these simulations reflect the earlier thinking of the multidisciplinary experts who developed and reverse engineered scenarios for the critical nodes of systems operations during Phase 1. of the CSM Method business process. Analogously derived science-based simulations of hypothetical events involving systems interrelationships among critical nodes of operation of a complex system is an object of the present invention.

During Phase 2. immersions, decision makers and subject matter experts who would be involved in managing an event in the real world are brought together to manage a range of hypothetical simulations of complex events and situations based on the scenarios developed and reverse engineered during Phase 1. They are asked to identify the decisions they would make, consider the outcomes and the extended-order effects of their decisions as they work through simulations involving the behavior of complex systems and their associated critical nodes of systems operation. Including decision makers and technical subject matter experts as participants in immersions to support multidisciplinary problem solving is an object of the present invention.

The decisions made by participants and the outcomes and extended order effects of their decisions are compared and contrasted against the results of the Phase 1. structured data already archived in the supporting CSM Method computer knowledgebase. This data includes the critical decision points, i.e., those points in a simulated event where decisions must be made in order to avoid system failure or to take advantage of opportunity. The notions of opportunity advantage and system failure are akin to dissipative structures, i.e., systems that evolve or devolve based on energy gain or loss, respectively. The comparison and contrast of the results of the Phase 1. structured data already archived in the CSM Method knowledgebase against the decisions of immersion participants is an object of the present invention.

Figure 6:
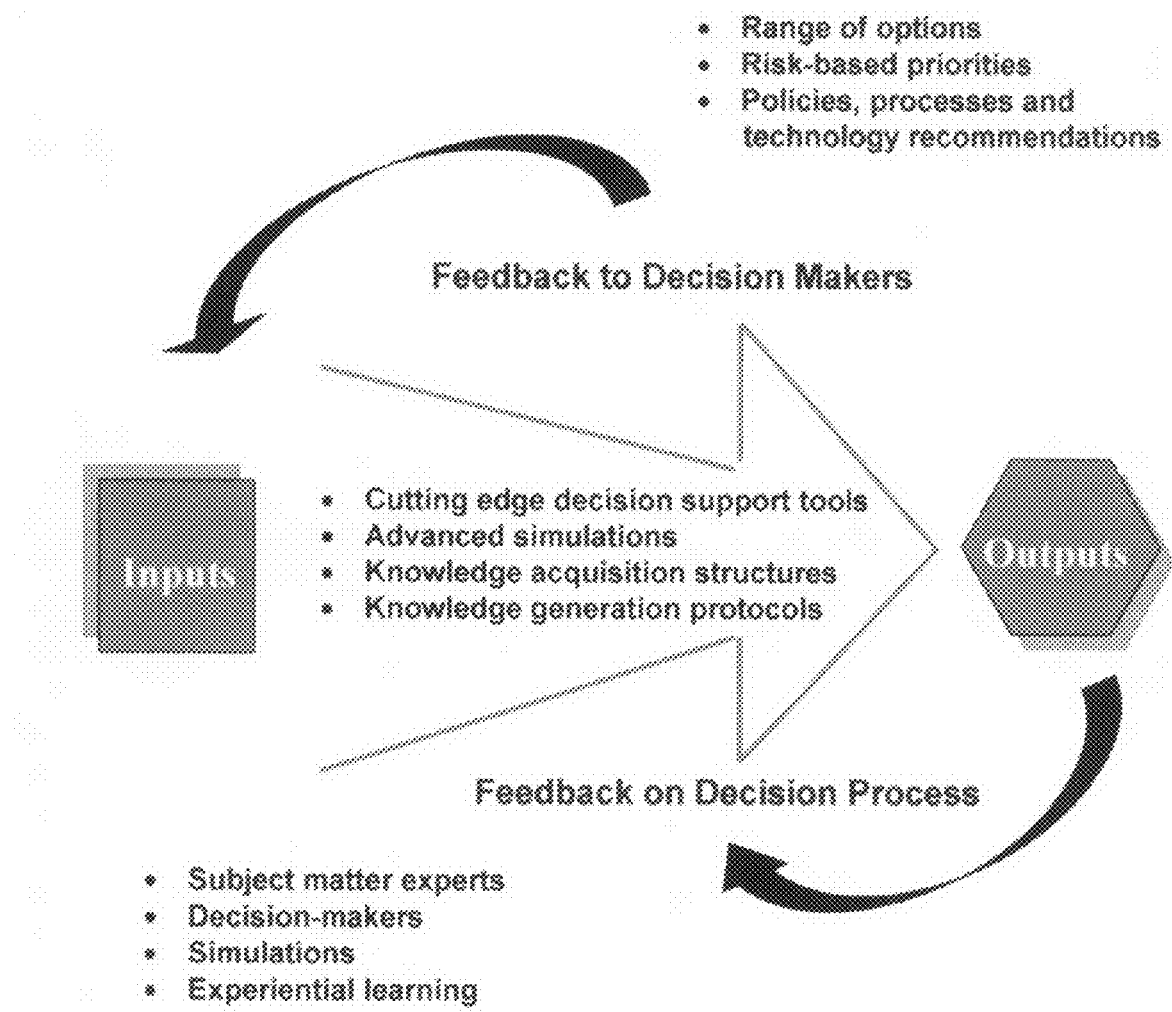
FIG. 6. presents a diagram of the CSM Method Consensus Team Decision Model.

A special consensus team decision tool is used during Phase 2. immersions to help achieve consensus among the participants on the "best" decision options to pursue as they manage their way, as a team, through hypothetical simulations of situations involving the critical nodes of a systems operation based on the scenarios developed in Phase 1. Michelson, McGee and Hawley describe consensus as a term that connotes something more than simple agreement (1994). As part of the CSM Method business process, the term consensus connotes that participants in a group develop "best" decision options based on a structured process of "give and take" that takes into account the different knowledge and perspectives of other multidisciplinary members of the team. The process is structured to assure repeatability of data. FIG. 6. depicts the consensus team decision process i.e., the Consensus Team Decision Model. The use of a structured and repeatable consensus model tailored for application as part of the CSM Method to achieve consensus on best decision options is an object of the present invention.

Using the process of compare and contrast with Phase 1. data, participants in an immersion are provided an opportunity to see and experience the outcomes and extended order effects of both good and bad decisions. During immersions, decisions are structured using group collaborative tools such as Group Systems or Meeting Works® to combine the thinking of all immersion participants to produce an analogously derived optimum solution. The opportunity for immersion participants to see and experience the outcomes and extended order effects of both good and bad decisions is an object of the present invention. The result is called a best decision option. Best decision options reflect the "best" combined elements of the ideas of the immersion team to produce solutions with the most desirable outcomes and extended order effects. The derivation, digitization and computer archiving of a plurality of scenarios and pre-generated and agreed-upon best decision options and associated decision templates is an object of the present invention.

Figure 7:
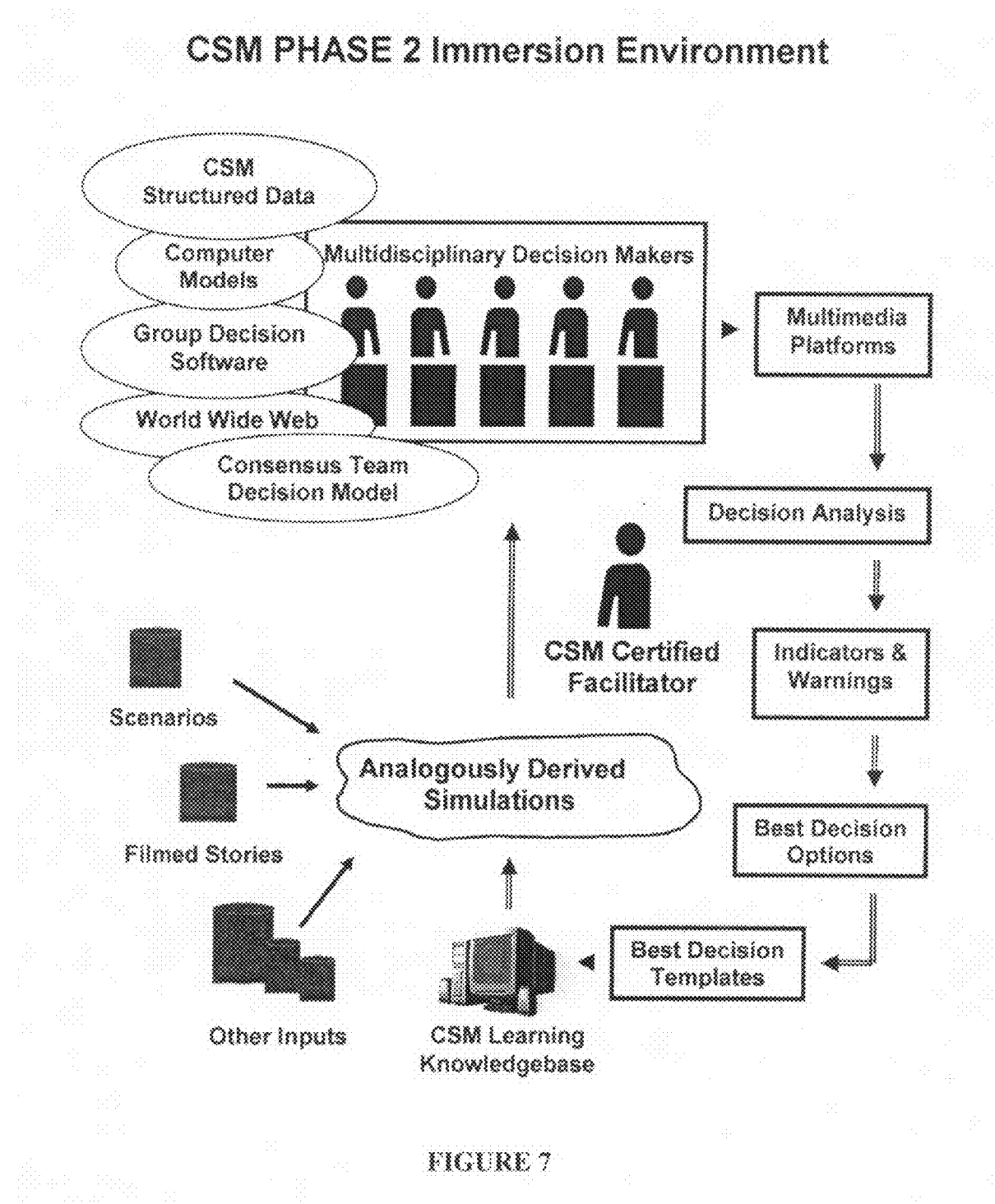
FIG. 7. presents a diagram of a CSM Method immersion.
Figure 10:
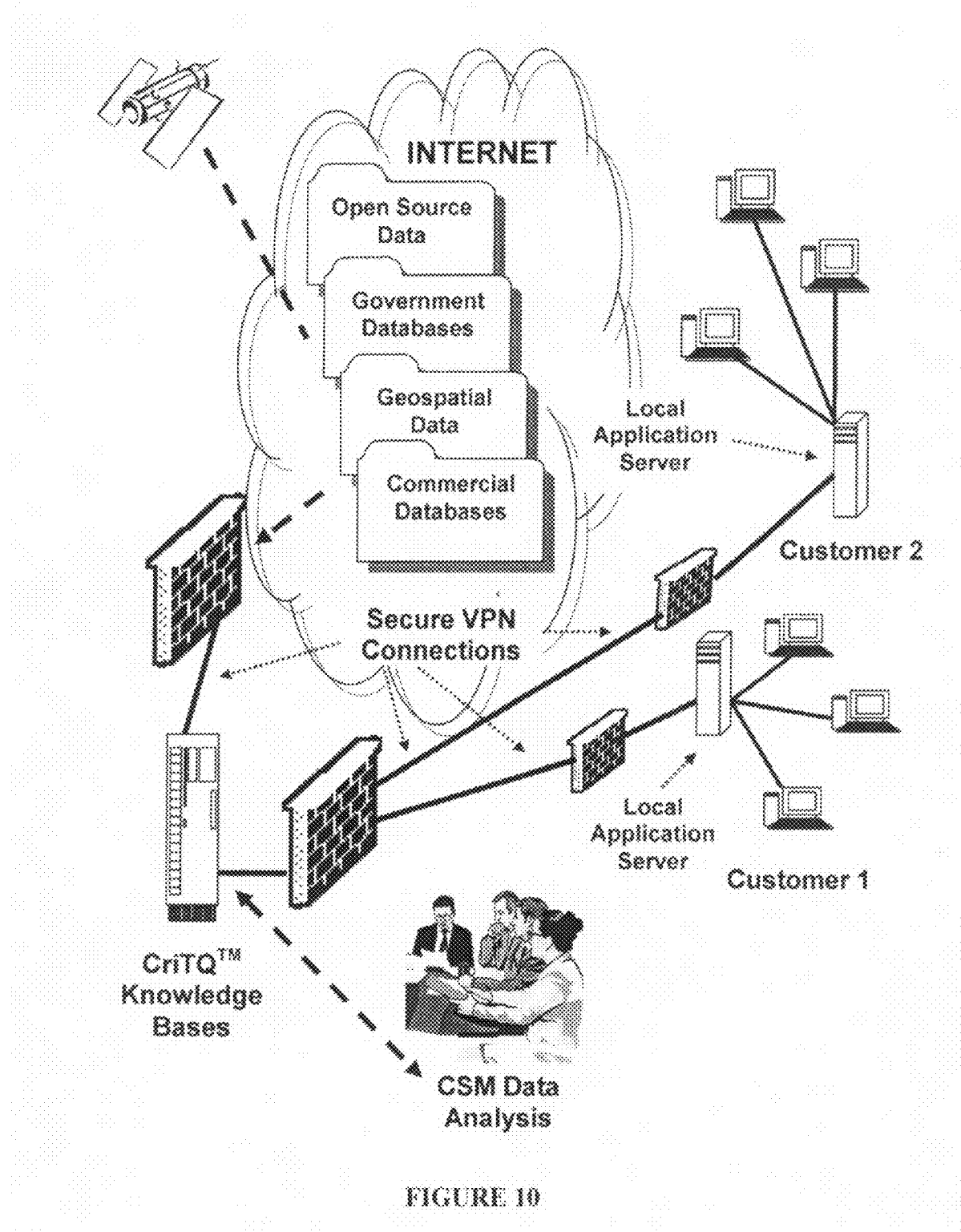
FIG. 10. presents a diagram of the common CSM Method IT enterprise architecture.

Best decision options, outcomes and extended order effects are visually mapped for use during immersions, digitized and archived in the supporting CSM Method knowledgebase. The process allows participants to achieve consensus on best decision options in a way that the lessons learned from the experience can be captured in a computer knowledgebase to build a body of repeatable knowledge that establishes reference points for further simulations. This data form the basis of risk and benefit decision support systems that can be used to assist in the management of analogous events as they occur in the real world. FIG. 7. depicts the structure of a Phase 2. complexity systems management immersion environment. Building a body of repeatable knowledge that establishes reference points for further simulations that serve as the basis for risk and benefit decision support systems is an object of the present invention. A CSM Method knowledgebase capable of "learning" based on structured CSM Method data inputs is an object of the present invention.

Phase 2. of the CSM Method business process begins with the development of analogously derived, i.e., science-based, simulations. Before an immersion takes place, inputs are sought from the entire system both vertically and horizontally to gather subject matter knowledge at every level. The critical nodes of systems operation for the complex systems behavior under examination as identified during Phase 1. are reverse engineered by immersion participants. Results of Phase 1. reverse engineering of scenarios is used as a tool to compare and contrast the decisions of immersion participants with those developed during Phase 1. Analogous science-based simulations based on CSM Method futures driven event scenarios is an object of the present invention.

For risk applications, the precursor warning signals that can lead to adverse events or cause disasters to escalate to become catastrophes are identified. For benefit applications, the precursor indicators of opportunity that can be exploited to increase the competitive advantage of the organization are identified. Depending on the nature of the application, the critical decision points to prevent and/or respond to simulated adverse events or to exploit impending opportunities are identified. The immersion process examines the range of possible decisions that could be made and their extended order effects.

Science-based models are used to show participants the extended order effects of their decisions. Based on this extensive preliminary work, a select combination of decision makers, operational responders and multidisciplinary subject matter experts who would be responsible for managing similar events in the real world are brought together to manage risk and/or benefit simulations. Using analogous science-based methods to extrapolate the extended order effects and consequences of events and decisions is an object of the present invention.

The tools and techniques described below are used to help immersion participants reverse engineer critical decisions and reach consensus on best decision options under differing sets of circumstances, i.e., changing initial conditions.

As described previously, a team decision process is used for participants to achieve consensus on the best decisions to make. This team decision process is designed to address the concerns raised by Janis in *Groupthink* (1982). The Consensus Team Decision Model, as modified for use as part of the CSM Method, is an object of the present invention. "Best" decision templates based on these inputs are structured for repeatability, digitized and archived in a supporting computer knowledgebase that gets "smarter and smarter" as successive groups run through the same or similar simulations. The creation of CSM learning knowledgebases that use structured data derived from the methodical application of a priori optionality is an object of the present invention. The creation of optimum decision templates structured for repeatability and immediately accessible from digitized computer data stored on a CSM knowledgebase is an object of the present invention. The resulting knowledgebase can be used for educational, strategic and tactical operational uses as a planning and operational response tool to manage analogous events that confront decision makers in the real world. The creation of pre-agreed upon decision templates that are structured for repeatability and immediately available to decision makers by querying the CSM Method knowledgebase is an object of the present invention.

Summary of the Ten CSM Method Phase 2. Process Steps

1. Simulations of hypothetical events and situations based on the Phase 1. analysis of the behavior of a complex system are developed. These simulations of different situations reflect the interrelationships among the critical nodes of a complex system and the fundamental rule sets, associated initial conditions, the sequence of events and means and methods associated with different scenarios and arrays of potential outcomes for each scenario involving a critical node of systems operation as developed during Phase 1. These simulations are digitized and archived in a supporting knowledgebase. CSM Method simulations of the critical interdependencies among critical nodes is an object of the present invention.

2. Teams of knowledge domain experts identify the critical decision points in each simulation that could lead to systems failure or represent significant opportunity advantage. Multidisciplinary teams reverse engineer each critical decision point to analogously determine the outcomes of the different decisions that could be made within the bounds of the fundamental rule sets established for each critical node of systems operation. The same multidisciplinary teams determine the outcomes and extended order effects of a range of different decisions for each of the critical nodes of operation identified during Phase 1. Care is taken to assure that the range of possible decisions reflect the fundamental rule sets bounding the behavior of the system. The analogous determination of decision outcomes and the extended order effects of different decisions for a range of potential outcomes within the bounds of fundamental rule sets is an object of the present invention. This data is visually structured as decision fault trees showing related outcomes and associated extended order effects. Scientific models are developed to assist immersion participants visualize the extended order effects of their decisions. This information is digitized and archived in a supporting CSM Method computer knowledgebase.

3. Immersion participants are selected from across both the horizontal and vertical boundaries of organizations. They are intentionally selected to horizontally cut across "stovepipes" of organizations and to vertically cut from the operational to the senior decision making levels. Included within the group of immersion participants are multidisciplinary experts familiar with the type of system and systems behavior under study. The selection of immersion participants to include senior decision makers, operational personnel and subject matter experts is an object of the present invention.

4. Phase 2. of the CSM Method business process pays special attention to the human social process aspects of individual preferences and group behavior. Each participant in an immersion is requested to take a battery of personality preference, cognitive and team interaction assessments. The results of these tests can provide significant insights on how individuals think, learn, and behave differently in a group or as a member of a team. Behavioral testing of immersion participants for the reasons outlined herein is an object of the present invention. The results of human assessments are provided in confidence to each participant. Human assessment feedback results are used to:
   a. Determine how different immersion participants think, learn and behave, especially in group settings. This allows the information and data presented during immersions to be tailored based on how participants think and learn. This type of human social process knowledge allows for the systematic examination of ways to bring the right information, in the right form, at the right time to decision makers based on different thinking, learning and behavior styles.
   b. Examine a broad range of human characteristics and different behaviors that can affect the quality of both individual and group decision making including individual decision styles and a person's likely reaction under stress, individual and group openness and willingness to accept new ideas, a group's conceptual capacity to see the "big picture", group patterns of motivation, an individual's social assertiveness and other factors.
   c. Facilitate effective team interactions among immersion participants by providing information that can be used to manage potential conflicts that can arise among individuals with different personality traits. Effective team interactions are essential to achieve group consensus around best decision options and to avoid the dangers of "groupthink" (Janis, 1982).

5. Participants in immersions are familiarized with computer supported group systems software, e.g., Meetings Works®, Group Systems, etc., and audio and video equipment that is used to structure and record all activities during immersions. This information is structured, digitized and input to the CSM Method knowledgebase. The digitization of all CSM Method immersion data, i.e., audio, visual and presentation materials for repeatability is an object of the present invention.

6. Participants take part in simulations of hypothetical situations affecting the critical nodes of operation of a complex system. A start and stop process is used to examine and reverse engineer each critical decision point in a simulation (as previously reverse engineered by multidisciplinary teams during Phase 1. before the immersion). Participants are asked to provide their individual perspectives on the best decisions that can be made at each critical decision point in a simulation. Their decisions are compared and contrasted against the results of multidisciplinary team analyses and the results of Phase 1. to include outcomes and extended order effects. Models and other computer visualization techniques are used to show, in scientifically accurate terms, the extended order effects of decisions. Group decision options are then sought. Group decision options are compared and contrasted against those generated during Phase 1. of the CSM Method business process. Multiple perspectives are considered and participants are encouraged to achieve group consensus on best decision options at each critical decision point in the simulation that consider both the quantitative reality of the situation and the qualitative social implications of their decisions. The integration of individual and group perspectives, the comparison and contrast of these perspectives against Phase 1. data archived in the CSM knowledgebase, and group consensus on best decisions is an object of the present invention. Great care is taken to structure and record participant feedback in ways that the reasons and supporting rationale for combining elements of different ideas to achieve consensus around best decision options can be captured in a repeatable way.

Digitizing and structuring data to create repeatability for the rationale upon which immersion participants reach consensus on best decision options is an object of the present invention. Repeatability is made possible by structuring the information and data acquisition process, using group systems software and by audio and visual recording of all individual inputs and group interactions during the immersion. All information is digitized and archived in a supporting CSM Method computer knowledgebase that can be data mined by structural and conceptual indexing techniques. The integration of quantitative scientific reality with qualitative human social process is an object of the present invention.

7. The information resulting from an immersion is digitized and archived in a supporting computer knowledgebase. The knowledgebase can then be accessed using search engines to mine data using structural and conceptual indexing. In this way, a group's reasons and rationale for combining elements of different ideas to achieve consensus around best decision options at a critical decision point in a simulation can be structured and captured in a repeatable fashion so that the results can be understood by others after the immersion takes place, i.e., repeatability.

8. Decision support systems comprised of systematically derived decision maps, models and other visualization tools that support the human management of complex risk and benefit situations for similar analogous events that happen in the real world are produced as a result of the process. The creation of CSM Method libraries of a plurality of analogously derived events and situations based on the tenets of a priori optionality is an object of the present invention.

9. The indicators of opportunity advantage and the warnings of impending adverse situations are validated by immersion participants and strategies for intelligence data collection are developed. Best decision options to implement risk and benefit data collection strategies is another important product of Phase 2. immersions. The scientific derivation of the specific indicators of opportunity and specific warnings of risk events is an object of the present invention. The mining of open source data to find as early as possible the indicators of opportunity and warnings of adverse events as derived using the CSM Method is an object of the present invention.

10. Additional immersions can be conducted using the same or different combination of simulations with different participants. Different participants in the process bring new perspectives and ideas as critical decision points are reverse engineered. Using the same immersion processes to structure and acquire information and data in combination with group systems software and audio and visual recording of individual inputs and group interactions during the immersion repeatability is assured. Thus, the addition of new data from additional immersions when archived in the supporting CSM Method computer knowledgebase results in a learning system that becomes "smarter and smarter" with each successive immersion. The addition of new data from additional immersions when archived in the supporting CSM Method computer knowledgebase to establish a learning system that becomes "smarter and smarter" with each successive immersion is an object of the present invention.

Phase 3: Subsequent CSM Method Interventions

The purpose of Phase 3. of the CSM Method business process is to reassess, on a continuing basis, the fundamental rule sets upon which complex systems are characterized and the optimum risk and benefit decision options and accompanying decision support systems are based. One of the scientifically derived tenets of a priori optionality is that there exist no absolute bounds of certainty in any complex system within which different behaviors may occur. Scientific evidence that there exists no absolute bounds of certainty in any complex system within which different behaviors may occur is an object of the present invention. A priori optionality posits that the bounds within which different behaviors occur in a complex system change based on the evolving adaptation of the system itself resulting from continuous systems of systems interactions with the environment in which it exists. Scientific evidence that all systems evolve based on systems of systems interactions is an object of the present invention. Thus, no system ever stands alone or remains unaffected by the space, i.e., environment, in which it exists. Scientific evidence that no system ever stands alone or remains unaffected by the space is an object of the present invention.

The reassessment of the fundamental rule sets bounding the behavior of a complex system is accomplished through the use of continuing multidisciplinary team analysis, the conduct of subsequent immersions, the use of computer modeling and the real world operational use and testing of the risk and benefit applications of the decision support systems resulting from the Phase 1. and 2. CSM Method business process. Scientific evidence that the fundamental rule sets of complex systems must be continually reassessed based on systems of systems interactions is an object of the present invention.

Summary of the Three CSM Method Phase 3 Process Steps

1. Teams of multidisciplinary experts reassess, on a continuing basis, the fundamental rules sets used to bound the range of behaviors as determined in Phase 1. of the CSM Method business process. They consider how a complex system may have evolved and adapted based on changes in the environment in which it exists, i.e., systems of systems interactions. The continual reassessment of the fundamental rules sets which bound the behaviors of complex systems is an object of the present invention.

2. Subsequent immersions are conducted using the same or different combinations of simulations to revalidate Phase 1. quantitative results and Phase 2. best decision options. Subsequent immersions can be conducted with different groups or combinations of participants. Establishing CSM learning knowledgebases by conducting subsequent CSM immersions and structuring data using the CSM Method business process is an object of the present invention.

3. The decision support systems resulting from Phases 1. and 2. are applied to the management of real world risk and/or benefit situations. The use of CSM knowledgebases to guide analogous real world events is an object of the present invention. The performance of management teams using these decision support systems is benchmarked against previous performance. Declines in performance over time using decision support systems resulting from Phases 1. and 2. lead procedurally to multidisciplinary team Phase 1. quantitative reassessments and the conduct of subsequent immersions to re-achieve desired levels of performance. The benchmarking of performance and the conduct of subsequent Phase 1. quantitative reassessment of fundamental rules sets is an object of the present invention.

Deliverables Resulting from Phases 1., 2., and 3. of the CSM Business Process Method Table 1., below, summarizes the key deliverables resulting from the CSM Method business process achieved through the systematic implementation of the six tenets of a priori optionality.

TABLE 1

Significant deliverables resulting from the CSM Method business process

| CSM METHOD PHASE 1. | CSM METHOD PHASE 2. | CSM METHOD PHASE 3. |
|---|---|---|
| 1. Fundamental rule sets at $t_1$ driving a complex system's behavior<br>2. Initial conditions affecting the fundamental rule sets at $t_1$ | 1. Simulation of real and hypothetical events<br>2. The outcomes of different decision at critical decision points<br>3. Decision fault trees showing outcomes and extended order effects | 1. Continuing reassessment of fundamental rules<br>2. Subsequent immersions to revalidate and update best decision options<br>3. Decision templates and results of Phase 1. and 2. to manage analogous real |

TABLE 1-continued

Significant deliverables resulting from the CSM Method business process

| CSM METHOD PHASE 1. | CSM METHOD PHASE 2. | CSM METHOD PHASE 3. |
|---|---|---|
| 3. Identification of the critical nodes of systems operation | 4. Multidisciplinary analysis during immersions | world events. |
| 4. Range of scenarios at $t_2$, $t_3$, $t_4$ and so on using different combinations of initial conditions to disturb system equilibrium and observe outcomes and determine event sequences | 5. Participant cognitive assessments of learning styles, team interaction styles, conflict handling | |
| | 6. Multidisciplinary consensus on best decision options | |
| | 7. Consensus on best decision options and supporting rationale | |
| 5. For risk applications, an Estimate of Event Sequence Interruption (EESI) | 8. Computer archive of repeatable data | |
| 6. For benefit applications, the early indicators of impending opportunity | 9. Decision maps, models, computer visualization tools to support the Mangment of analogous real world events | |
| 7. The early warnings of impending adverse events | 10. Validation of indicators of benefit and warnings of adverse impending events | |
| 8. Data collection strategies including data mining to look for the early indicators of opportunity and the early warnings of adverse events. | 11. Consensus decisions on data collection strategies to look for the early indicators of opportunity and the early warnings of adverse events. | |
| 9. Critical Decision points for scenarios | 12. A CSM Method business process knowledgebase of repeatable information and data that becomes "smarter" with successive immersions. | |
| 10. Optimum Decision sets | | |
| 11. Best decision templates | | |
| 12. All data structured for repeatability in a CSM Method business process knowledgebase | | |

Automation of the CSM Method Business Process Model

Phase 1. of the CSM Method business process is the focus of significant computer automation. Phase 1. structured and digitized data contained in the CSM knowledgebase is used for Phases 2. and 3. of the CSM Method business process. To demonstrate the present invention, a prototype capability was designed to show in concrete and tangible form how the CSM Method business process model can be applied to structure data and create a CSM knowledgebase that supports Phases 2. and 3. of the CSM Method business process. The example presented here demonstrates only one of many potential automated applications of the CSM Method. As depicted in Table 11., below, all applications of the CSM Method business process are designed to systematically structure data using an analogous methods consistent with the six tenets of a priori optionality. The example presented herein is our BuildingTQ (with TQ standing for threat quotient) risk management application of the CSM business process method.

The network architecture used is common to all CSM Method automated applications. Tailored risk management software applications dealing with a range of critical infrastructures ranging from energy, transportation, communications, public health and safety, etc. use CSM Method "productized" software packages that are installed on each client's own internal network subject to their network security requirements. These "productized" software packages are designed to systematically implement the six tenets of a priori optionality. These software packages provide functionality for the client to: 1) geospatially and otherwise to visualize the external and internal critical nodes of their operations; 2) gather and structure data concerning these critical nodes; 3) as appropriate, determine compliance with safety, security, regulatory and best business practices for each critical node; 4) simulate modifications to existing system design to reduce the risks associated with man-made and natural events affecting their critical nodes; 5) use visualization platforms to monitor in real time changes to the risks associated with their critical nodes. Using "productized" software to structure data consistent with the tenets of a priori optionality and for repeatability to support Phases 2. and 3. of the CSM Method business process is an object of the present invention.

The core of the system is the CriTQ™ CSM Method business process knowledgebase which resides in a secure environment at a Data Fusion Center (DFC). It is here that the critical nodes of different critical infrastructure systems are identified and subjected to deep systems analysis and reverse engineered using the CSM Method risk management business process. Consistent with Phase 1., a range of scenarios of potential adversary attacks and natural events are developed for each critical node of a selected infrastructure. The data is structured and archived in the CriTQ knowledgebase. For example, the means and methods associated with different attack scenarios and the consequences associated with a successful attack or natural event involving a critical infrastructure system and a system behavior are structured and archived in the knowledgebase. The indicators of benefit opportunities and warnings of an impending attack or natural event are analogously determined using the CSM Method. The use of analogous methods to derive the indicators of benefit opportunities and warnings of an impending adverse or natural event is an object of the present invention. The data is structured and archived in the CriTQ knowledgebase.

For benefit applications, the CriTQ knowledgebase constantly scans the open source environment for the indicators of impending opportunity and provides real time "data bursts" to clients to advise them of opportunity. The use of data mining techniques to continuously scan open sources for the indicators of opportunity as derived using the CSM Method is an object of the present invention. These indicators of business opportunity are actively displayed on computer visualization platforms. The "active" versus "passive" method of searching out and relaying the indicators of impending opportunities is an object of the present invention.

For risk management applications the CriTQ knowledgebase constantly scans the open source environment for the warnings of adverse events as scientifically derived using CSM Method business process. Clients are provided with real time "data bursts" to warn them of impending adverse events. These threat warnings are actively displayed on computer visualization platforms. See FIGS. 11. A. and 11. B. The use of data mining techniques to continuously scan open sources for the warnings of adverse events as derived using the CSM Method is an object of the present invention. These warnings of adverse events are actively displayed on computer visualization platforms. The "active" versus "passive" method of searching out and relaying the warnings of adverse events is an object of the present invention.

BuildingTQ™ as One Example of a Risk Management Application of the CSM Business Process Method The following example demonstrates the use of the CSM Method business process in a Phase 1. risk management application involving large modern buildings. The application is known as BuildingTQ with "TQ" as an acronym for threat quotient. In this case, the risk management concern involves the potential for malevolent attacks by adversaries against modern commercial buildings and the range of natural phenomenon that can affect building operations and safety.

Today's modern commercial buildings are examples of complex adaptive systems of systems. From heating, ventilation and air conditioning systems that must respond to changes in temperature and weather conditions, to wind dampening systems to prevent the excessive swaying of tall buildings, to power loading for the most efficient use of electricity, to fire suppression systems and so on, modern buildings represent a complex interweaving web of systems of systems that must continuously respond to changing conditions.

examine a selected building from the holistic frame of reference to deduce the fundamental rule sets that define and bound the propagation of a real (or imaginary) system's behavior being observed at $t_1$. First, the fundamental rules that bound the range of potential malevolent attacks against the building are derived.

Ask yourself the following question: What causes a traffic jam? Most of us would quickly respond with answers like, poor weather conditions, too many cars, those "idiot Maryland drivers," rubber-necking, accidents or some other similar response. But scientists think about things like traffic jams quite differently. To a complexity scientist there are three and only three things that cause a traffic jam. You put your foot on the accelerator to speed up your car. You take your foot off the accelerator to slow down the car. And, you put your foot on the brake to stop the car. To complexity scientists, how people exercise these three rules determines whether or not a traffic jam will occur. For example, if it snows heavily most people will spend more time with their foot off the accelerator and on the brake causing traffic to slow down and back up.

In the application of the CSM Method these are called fundamental rules. In the case of a large building ask yourself the question: How can an adversary attack it? Many people would quickly respond by saying things like break through the glass, shut off the alarm system or shoot the guards. All reasonable things to say, of course, but they are not what a scientist would characterize as fundamental rules.

As Table 2. shows, when the tenets of a priori optionality are applied under the CSM Method business process, three, and only three, ways an adversary can attack a building emerge. First, an adversary force can use forced entry. Second, they can use stealth. Third, they can use a range of improvised destructive devices (IDD). When you think in these terms, breaking through doors, sneaking past the guards, shutting off alarm systems, blowing up the lobby with a bomb and much more all become initial conditions affecting theses three, and only these three, fundamental rules: forced entry, stealth and use of IDD.

TABLE 2

The Three fundamental rules for attacking a building

| Forced Entry | Surreptitious Entry | Improvised Destructive Devices (including radiological dispersal devices) |
|---|---|---|
| Unauthorized access to a site or building using force. During business and non-business hours     armed assault and takeover of a     building or critical node of     operation by a coordinated group     armed loner | Unauthorized access to a site or building using stealth During business hours     use of false credentials     insider or insider assistance     impostor     unnoticed access During non-business hours     break-in using stealth     avoid detection     infrared     e-field     Israeli-type fence     CCTV     electromagnetic sensors     other | During business and non-business hours     vehicle bomb     suicide bomber     pre-placement of IDD         w/remote         detonation     shielding of radiological     sources |

Phase 1. Step 1. Deducing Fundamental Rule Sets and Systematically Extrapolating Adversary Means and Method for Buildings In Phase 1. Step 1. of the BuildingTQ application, multi-disciplinary experts use the tenets of a priori optionality to Tables 3. and 4., below, illustrate how CSM Method fundamental rules are used to analogously extrapolate and systematically structure initial conditions such as the type of pre-planning and the actions that must be taken by an adversary to successfully conduct "forced entry" attack against a building. Care is taken to discriminate between the fundamental rules and the initial conditions. Because the data is systematically structured it can be embedded as part of the BuildingTQ software logic system and archived in the CSM Method CriTQ knowledgebase in a manner that allows for repeatability, i.e., easily understood by subsequent users. The use of the CSM Method to derive fundamental rules, analogously extrapolate and systematically structure initial conditions is an object of the present invention.

TABLE 3

Adversary pre-planning for forced entry into a building

| Fundamental Rule: Forced Entry | Adversary Means and Methods |
| --- | --- |
| Unauthorized access to a site or building using force. During business and non-business hours     armed assault and takeover of a building or critical node of operation by a coordinated group     armed loner | Armed assault and takeover of a building or critical node of operation Pre-planning Adversary cell structure for coordination Safe house for adversary planning activities Adversary "casing" of existing buildings (or buildings under construction)     physical or remote observation to determine:     building security routines     communications intercepts     guard locations and duties     guard training and armament     perimeter and access ways (including loading dock,     vehicle and personnel) routines     perimeter detection capability     critical nodes of building operations (especially security)     local response capability     law enforcement     fire     special event response teams (NEST, HAZMAT, CBRF, RRT's, etc.)     hospitals         triage capacity         ambulances         EMT squads     access to public or controlled records         building security plans         building blueprints     intrusion detection capability     geospatial and photographic images     building and site supporting critical infrastructures     power feeds and internal systems     water feeds and internal systems     sewage system (internal, external)     communication feeds and internal systems     local emergency response capability     recruitment or "assistance by force" of a knowledgeable insider to obtain critical information         monetary remuneration         blackmail         coercion |

TABLE 4

Adversary forced entry into a building

| Fundamental Rule: Forced Entry | Adversary Means and Methods |
| --- | --- |
| Unauthorized access to a site or building using force. During business and non-business hours     armed assault and takeover of a building or critical node of operation by a coordinated group     armed loner | Armed assault and takeover of a building or critical node of operation Conduct of attack Armed assault and takeover of a building or critical node of operation Number of attackers as a function of surveillance of security routines and planning information Adversary coordination     cells     safe houses     communications equipment |

TABLE 4-continued

Adversary forced entry into a building

| Fundamental Rule: Forced Entry | Adversary Means and Methods |
| --- | --- |
| | Adversary equipment |
| |     hand guns |
| |     automatic weapons |
| |     gas to disable or kill opposing force |
| |     gas masks |
| |     burst bombs |
| |     vehicle penetration |
| |     stand-off weapons (sniper/mortar/other) |
| | Tactics and techniques |
| |     "de-sensitization" of security routines |
| |     "de-sensitization of alarm systems |
| |     impostor tactics |
| |     knowledgeable insider assistance |
| |     hacking/MP attack of SCADA |
| |     use of gas to kill disable opposing force |
| |     burst bombs |
| |     initiate negotiations |

Tables 4. and 5., below, illustrate how CSM Method fundamental rules are used to analogously extrapolate and systematically structure initial conditions such as the type of pre-planning and the actions that must be taken by an adversary to surreptitiously gain access to a building. Care is taken to discriminate between the fundamental rules and the initial conditions. Because the data is systematically structured it can be embedded as part of the BuildingTQ software logic system and archived in the CSM Method CriTQ knowledge-base in a manner that assures repeatability, i.e., easily understood by subsequent users.

TABLE 5

Adversary pre-planning for surreptitious entry into a building

| Fundamental Rule: Surreptitious Entry | Adversary Means and Methods |
| --- | --- |
| Unauthorized access to a site or building using stealth | Unauthorized access to a site or building using stealth. |
| During business hours | Pre-planning |
|     use of false credentials | Adversary cell structure for coordination |
|     insider or insider assistance | Safe house for adversary planning activities |
|     impostor | Adversary "casing" of building physical or remote |
|     unnoticed access | observation to determine: |
| During non-business hours |     building security routines |
|     break-in using stealth |     communications intercepts |
|     avoid detection |     guard locations and duties |
|     infrared |     guard training and armament |
|     e-field |     perimeter and access ways and perimeter |
|     Israeli-type fence |     detection capability |
| CCTV |     ingress and egress routes |
|     electromagnetic sensors |     critical nodes of building operations |
|     other |     (especially security) |
| |     hacking of SCADA or communications |
| |     local response capability |
| |         law enforcement |
| |         fire |
| |         special event response teams (NEST, HAZMAT, CBRF, RRT's, etc.) |
| |         hospitals |
| |             triage capacity |
| |         ambulances |
| |         EMT squads |
| | access to public or controlled records |
| |     building security plans |
| |     building blueprints |
| |     intrusion detection capability |
| |     geospatial and photographic images |
| |     building and site supporting critical infrastructures |
| |     power feeds and internal systems |
| |     water feeds and internal systems |
| |     sewage system (internal, external) |
| |     communication feeds and internal systems |
| | local emergency response capability |
| | recruitment or "assistance by force" of a knowledgeable insider to obtain critical |

TABLE 5-continued

Adversary pre-planning for surreptitious entry into a building

| Fundamental Rule: Surreptitious Entry | Adversary Means and Methods |
|---|---|
| | information |
| |     monetary remuneration |
| |     blackmail |
| |     coercion |

TABLE 6

Adversary surreptitious entry into a building

| Fundamental Rule: Surreptitious Entry | Adversary Means and Methods |
|---|---|
| Unauthorized access to a site or building using stealth | Unauthorized access to a site or building using stealth |
| During business hours | Conduct of break-in by stealth |
|   use of false credentials | Timing is likely to be a function of reducing the possibility of adversary detection (non-business hours; night time) |
|   insider or insider assistance | Avoid perimeter detection |
|   impostor |   e-field |
|   unnoticed access |   Israeli-type fence |
| During non-business hours |   perimeter/exterior doorway CCTV |
|   break-in using stealth | Bypass or circumvent secondary detection |
|   avoid detection |   internal infrared |
|   infrared |   internal CCTV |
|   e-field |   electromagnetic door sensors |
|   Israeli-type fence |   window vibration/e-continuity detectors |
| CCTV | Adversary equipment |
|   electromagnetic sensors |   handguns or automatic rifles |
|   other |   standoff weapons (sniper/mortar/other) |
| |   radio equipment to intercept security communications |
| |   specialized equipment to penetrate doorways |
| |   non-hardened doorways |
| |   card slide at jamb |
| |   standard lock picking techniques |
| |   micro-charge at lockset |
| |   "pop the pins" |
| |   counter doorway e-magnetic detection |
| |   physically break through door |
| |   hardened doorways |
| |   standard lock picking techniques |
| |   pressure jaws at jamb to defeat lock or remove exposed |
| |   "spot weld" hinges |
| |   torch to penetrate metal clad door |
| |   counter doorway e-magnetic detection |
| |   remove door casing from surrounding non-hardened materials, e.g., cement block, non-protected concrete framing, etc. |
| |   glass exposures |
| |   low vibration glass cutting equipment |
| |   traditional sash lock defeat |
| |   counter window sash e-magnetic detection |
| | Tactics and techniques |
| |   "de-sensitization" of security routines |
| |   "de-sensitization" of alarm systems |
| |   impostor tactics |
| |   knowledgeable insider assistance |
| |   hack SCADA or communications |

Tables 7. and 8., below, illustrate how CSM Method fundamental rules are used to analogously extrapolate and systematically structure initial conditions such as the type of pre-planning and the actions that must be taken by an adversary to successfully conduct an "improvised explosives attack" on a building. Care is taken to discriminate between the fundamental rules and the initial conditions. Because the data is systematically structured it can be embedded as part of the BuildingTQ software logic system and archived in the CSM Method CriTQ knowledgebase in a manner that allows for repeatability, i.e., easily understood by subsequent users.

TABLE 7

Adversary pre-planning for an IDD attack against a building

| Fundamental Rule: Improvised Destructive Devices (including radiological dispersal devices) | Adversary Means and Methods Improvised Destructive Device (including radiological dispersal and improvised nuclear devices) |
|---|---|
| Unauthorized access to a site or building using stealth.<br>During business hours<br>    use of false credentials<br>    insider or insider assistance<br>    impostor<br>    unnoticed access<br>During non-business hours<br>    break-in using stealth<br>    avoid detection<br>    infrared<br>    e-field<br>    Israeli-type fence<br>    CCTV<br>    electromagnetic sensors | Pre-planning<br>Adversary cell structure for coordination<br>Safe house for adversary planning and preparation activities<br>Adversary "casing" of building<br>    physical or remote observation to determine:<br>        building security routines<br>        communications intercepts<br>        guard locations and duties<br>        guard training and armament<br>        perimeter and access ways and perimeter detection capability<br>        nitrogen "sniffers"<br>        searches<br>        ingress and egress routes<br>        critical nodes of building operations (especially security)<br>        defensive vehicle barriers<br>        Jersey barrier<br>        hydraulic barrier<br>        swerve and slow roadway controls<br>        vehicle traps (at loading docks and other truck entry locations)<br>        local response capability<br>        law enforcement (response time & capability)<br>        fire (response & capability)<br>        emergency event response teams (NEST, HAZMAT, CBRF, RRT's, etc.)<br>        hospitals<br>            triage capacity<br>            ambulances<br>            EMT squads<br>            Other medical transportation<br>    Access to public or controlled records<br>        building security plans<br>        building blueprints<br>        intrusion detection capability<br>        geospatial and photographic images<br>        building and site supporting critical infrastructures<br>        water feeds and internal systems<br>        power feeds and internal systems<br>        sewage system (internal, external)<br>        communication feeds and internal systems<br>        local emergency response capability<br>Recruitment or "assistance by force" of a knowledgeable insider to obtain critical information<br>        monetary remuneration<br>        blackmail<br>        coercion |

TABLE 8

Conduct of an IDD attack against a building

| Fundamental Rule: Improvised Destructive Devices (including radiological dispersal devices) | Adversary Means and Methods |
|---|---|
| Unauthorized access to a site or building using stealth.<br>During business hours<br>    use of false credentials<br>    insider or insider assistance<br>    impostor<br>    unnoticed access<br>During non-business hours<br>    break-in using stealth<br>    avoid detection<br>    infrared<br>    e-field | Conduct of IDD (s) attack<br>Timing is likely to be a function of reducing the possibility of adversary detection and the specific characteristics of the IDD or IDD's to be used<br>Avoid early detection<br>    physical search<br>    identification of IDD (if remotely placed)<br>Adversary equipment<br>    vehicle<br>    explosive material(s)<br>    C-4<br>    fertilizer-fuel oil |

TABLE 8-continued

Conduct of an IDD attack against a building

| Fundamental Rule: Improvised Destructive Devices (including radiological dispersal devices) | Adversary Means and Methods |
|---|---|
| Israeli-type fence<br>CCTV<br>electromagnetic sensors | radiological laced IDD<br>improvised nuclear device (IND)<br>Adversary coordination<br>    cells<br>    safe houses<br>    communications equipment<br>Tactics and techniques<br>    "de-sensitization" of security routines<br>    "de-sensitization of alarm systems<br>    false credentials<br>    impostor tactics<br>Stand-off delivery of IDD<br>MP bombs<br>Knowledgeable insider assistance recruitment or "assistance by force" of a knowledgeable insider to obtain critical information or credentials<br>monetary remuneration<br>    blackmail<br>    coercion<br>    initiate negotiations (if motive of attack) |

Phase 1. Step 2. Identifying the Critical Nodes of Building Operations

In accordance with the tenets of a priori optimality, the building is viewed holistically to determine the critical nodes of systems operation, i.e., those core interrelationships or activities unique to a commercial office building that are particularly sensitive to changes in initial conditions. As Table 9. illustrates, there are fourteen critical nodes of systems operation most frequently associated with modern buildings each of which is supported by other subsystems. Many of these subsystems are interdependent. For example, water fire suppression systems depend on the availability of sufficient water supplies provided under adequate pressure. The following list of critical nodes was developed based on analysis by building subject matter experts and a "word cluster analysis" of General Services Administration, the National Building Code and a broad cross section of state building codes and standards.

TABLE 9

The fourteen critical nodes of a commercial office building

1. Heating and Ventilation Systems
    a. Roof based
    b. At-ground
    c. Other
2. SCADA Rooms & Controls
3. Mass Gathering Areas
    a. Cafeterias
    b. "Open design areas"
    c. Courtyards
    d. Auditoriums
    e. Others
4. Cabling and Communications Systems
    a. Electrical
    b. Communications
    c. Computer cabling
    d. Other
5. Physics Stress Locations
    a. Load bearing pillars
    b. Structural steel and support cabling
    c. "Undampened" locations
    d. Other
6. Water Systems
    a. Water intake
    b. Water distribution systems TABLE 9-continued The fourteen critical nodes of a commercial office building c. Valves
    d. Water pressure systems including pumps
    e. Other
7. Sanitation and Sewer Systems
    a. Supporting water systems
    b. Sewer lines
    c. Free flow
    d. Pumps
    e. Other
8. Parking Areas
    a. Perimeter parking
    b. Subterranean parking
    c. Others
9. Building Ingress & Egress Points
    a. Roof access
    b. Utility tunnels
    c. Main entrances & exits
    d. All other doorways
    e. Loading Dock & Storage
10. Power
    a. Back-up power
    b. Immediate power for critical systems
    c. Power cabling runs
    d. Substations
    e. Transformers
    f. Breakers
    f. Other
11. Perimeter Buffer Zones
    a. Open zones
    b. Fenced perimeters
    c. Other
12. Elevators, Escalators, "People Movers", Stairways
13. Security Systems
    a. Alarms
    b. Remote surveillance systems
    c. Security personnel
    d. Credentialing
    e. Other
14. Safety Systems
    a. Fire suppressant systems
    b. Fire and other emergency alarms
    c. Other Automated applications of the CSM Method make extensive use of computer visualization tools. For example, each of the fourteen critical nodes of a modern commercial office building as identified above are rendered by location on a computer generated dedux diagram, i.e., wire frame representation of the building as shown in Table 27. These platforms when integrated with the building's secure control automated data acquisition (SCADA) system of sensors for applicable critical nodes and incoming data on threats become "active." This means that a critical node or combinations of critical nodes begins to "blink" based on real time data inputs to the BuildingTQ software logic system. See FIGS. 11. A. and 11. B. This "active" versus "passive" method of relaying on data concerning CSM Method derived indicators and warnings is an object of the present invention.

Automated applications of the CSM Method use a host of other computer visualization tools such as geospatial imagery. In the case of the BuildingTQ application, a geospatial "pan, zoom and scan" capability allows users to view the unique characteristics of their own buildings and the regional area in which the building is located. This provides users with visual data on their building's exterior critical nodes and other visual data on the locations of power, sewer, water, communications and other infrastructures unique to the geographic area that are critical to the functioning of the building. This data provides important information on the locations of critical infrastructures that might be the target of attacks, the locations, times of response and capabilities of law enforcement, fire and medical responders and other data. See Tables 23. and 31. This analogously derived data is structured for use by the BuildingTQ software logic system and archived in the CriTQ knowledgebase.

Phase 1. Step 3. Fundamental rule sets are used to define and bound potential systems behaviors to derive a range of possible scenarios that display different combinations of the initial conditions that can affect the critical nodes of the system.

In this example, a team of multidisciplinary experts consider the fundamental rule of surreptitious entry and a potential set of initial conditions that will upset the equilibrium of a critical node in the building. A potential scenario is developed. In this case, an adversary team of four individuals, armed with handguns that have communications and small C-4 explosive "lock-set" charges have carefully planned an attack of a particularly sensitive computer facility in a large headquarters building of a national merchandise retailer and food store. The team will attack during a normal business hours and intends to rely on surreptitious entry to destroy data on the computer hard drives using a small powerful suit case size electro-magnetic pulse (EMP) capacitor-type device. The fundamental rule is surreptitious entry. Initial conditions include time of attack, method of entry, adversary motivation and objective, equipment and other factors.

Figure 12:
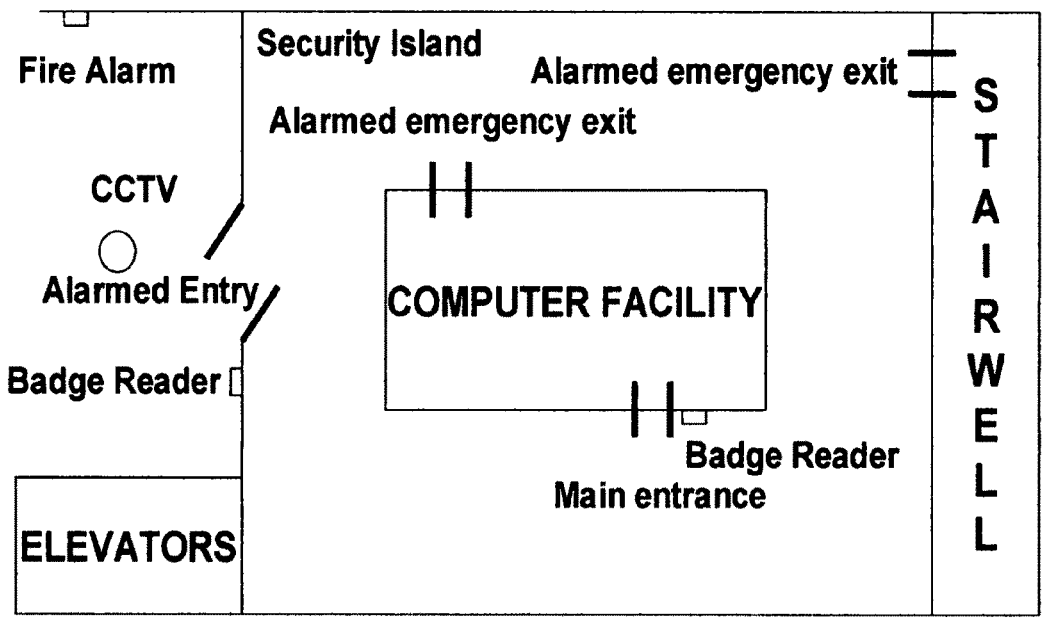
FIG. 12. presents a schematic diagram of the sensitive computer facility in the building that is the target of the adversary attack.

FIG. 12., represents a schematic diagram of the sensitive computer facility in the building that is the target of the adversary attack.

Schematic diagrams for each critical node of a building showing the location of surveillance equipment, alarms, doorways, elevators, stairwells, are digitized and archived in the CriTQ knowledgebase. As part of the active software platform, clients validate and change if necessary schematic layouts, provide details about construction, provide average guard force response times, type of response (if applicable) and other data that can be used to calculate earliest point of detection, the adversary delay time provided by different security and construction barriers, length of time for response and quality of response.

Phase 1. Step 4. Scenarios are developed which identify and structure the precise events and their sequence that must occur for a given event to take place in the real world. In this example, the precise sequence of events used by the adversaries to surreptitiously enter the building, destroy data in the computer facility and escape consists of a sequence of seven actions as set forth in Table 10., below. This is known as an event sequence. The analogous derivation of event sequences using the CSM Method is an object of the present invention.

TABLE 10

An event sequence for the surreptitious entry and destruction of a computer data facility by an adversary group

| | |
|---|---|
| 1. The team is escorted into the building by an employee who has been lead to believe that the four men are visiting a senior company official with offices on the sixth floor of the building. They are given visitor badges. | → Check in time is 10 minutes. Detection highly unlikely. |
| 2. Upon entering the elevator the adversaries disable their escort and any others on the elevator and proceed directly to the computer area on the fourth floor. | → Average time for elevator to traverse four floors is 1.8 minutes. Detection is highly unlikely. |
| 2. Adversaries trigger nearby fire alarm and proceed to computer area. | → Takes less than one minute. Detection of adversaries or intent remains highly unlikely. |
| 4. Adversaries break through the glass encasing the entryway to the security island and proceed to the emergency exit of the computer facility. | → First potential detection of adversaries by CCTV in the computer facility lobby area. Response clock begins. Time to break glass and enter area is less than 30 seconds. |
| 5. Adversaries use a charge of C-4 explosive to penetrate the steel class A fire door. | → Explosive charges placed and detonated. Time to penetrate door is approximately one minute. |
| 6. Adversaries deploy and detonate the EMP devices. | → Thirty seconds to deploy and remotely detonate EMP capacitor-type device. |
| 7. Adversaries shed gear and proceed to escape through stairwell mixing with other employees evacuating the building. | → Less than 30 seconds. Detection and capture is highly unlikely. |

Multi-disciplinary teams reverse engineer a range of potential scenarios to determine the exact sequence of events that must occur for the adversary to "beat the system." A plurality of scenarios for each generic critical node of a building are structured, digitized and archived in the CriTQ knowledgebase.

Special attention is paid to earliest possible detection, security and construction barrier delay times, response times and the quality of responses. The goal is early detection, sufficient barrier delay time, and effective security interdiction of the adversary force before an attack can be successfully completed. If prevention fails and response is still necessary, the BuildingTQ software application assists the client by identifying mitigating actions as further described below.

Event sequences support an embedded algorithm known as the Estimate of Event Sequence Interruption (EESI™). As depicted in FIG. 13. the EESI algorithm states that interdiction (I) of the adversary is a function of detection time ($dn_t$), delay time ($dy_t$), response time ($r_t$) and response quality ($r_q$) or: I f ($dn_t$) ($dy_t$) ($r_t$) ($r_q$). The Estimate of Event Sequence Interruption (EESI) algorithm is an object of the present invention.

In our sample scenario described above, the running of the EESI algorithm indicates that the adversary is likely to successfully destroy data in the computer facility and escape based on the following:

For the sample scenario, the total elapsed time is 15.3 minutes.

12.8 minutes elapses before first possible detection of the adversaries.

This leaves response force with less than 3 minutes to prevent the attack during the chaotic period of a potential fire and building evacuation.

Since average response time to an alarm at the computer facility during normal periods is 4.2 minutes, prevention of the attack and capture of the adversaries is highly unlikely.

Based on a range of scenarios bounded by fundamental rules for each critical node of a building, win or lose values are calculated. EESI calculations produce a numerical value known as a Threat Quotient (TQ) for each critical node. Using the results of EESI calculations another algorithm, known as the Event Probability Algorithm (EPA), is applied to prioritize the relative risk of different scenarios where the probability of an attack occurring (PO) is a function of the vulnerability of the critical node (v) and the consequences that would result if that critical node were successfully attacked (c) or: PO f (v) (c). The Event Probability Algorithm (EPA) is an object of the present invention.

Based on EESI calculations and TQ scores, ways to prevent or mitigate the consequences of an attack are considered. In our sample scenario for example, more rigorous visitor control procedures would result in the earlier detection of the adversaries and the interruption of the event sequence. In similar fashion, a concrete wall in lieu of a glass enclosure leading to the computer facility would provide additional barrier delay time slowing the adversaries down long enough for security forces to respond and interrupt the event sequence. By taking mitigating actions, the relative risk of a critical node can be reduced. An algorithm known as the Adjusted Threat Quotient (ATQ) is applied where the vulnerability of a critical node (v) and the consequences if it were successfully attacked (c) become a function of the mitigating actions taken to prevent or limit the consequences of the attack depicted as m or: (v) (c) f m. The application of the ATQ algorithm to account for m results in an adjusted threat quotient for the critical node. The Adjusted Threat Quotient (ATQ) algorithm is an object of the present invention.

Another critical risk management concern for commercial buildings involves natural phenomenon such as weather and geologic events. For natural phenomenon, BuildingTQ applies what is known as the Weather and Geological Events (WGE) algorithm. WGE states that for natural events the vulnerability of a critical node (v) is a function of the probability of the event occurring (based on frequency, trends analysis and modeling projections) PO and the consequences (c) should a critical node be subjected to a natural event or (v) f PO (c) as depicted by FIG. 14. Natural events addressed by BuildingTQ include fire, earthquakes, hurricanes, tornadoes, floods, tsunamis, windstorms, heavy snowfalls, ice storms, etc. The Weather and Geological Events (WGE) algorithm is an object of the present invention.

Threat quotient (TQ) scores for different weather and geologic events are generated. TQ scores are weighted based on frequency, trends analysis and modeling projections and the consequences should a critical node be subjected to a natural event. Like man-made events, weather and geologic events can then be subjected to the WGE algorithm. If, for example, a hospital has significant back up power capability at above flood grade for a major hurricane hitting the region this becomes a significant mitigator. By taking mitigating actions, the relative risk of a critical node can be reduced. The Adjusted Threat Quotient (ATQ) is applied where the vulnerability of a critical node (v) and the consequences if it were subject to a natural event (c) become a function of the mitigating actions taken to prevent or limit the consequences of the event depicted as m or: (v) (c) f m. The application of the ATQ algorithm to account for m results in an adjusted threat quotient for the critical node.

Phase 1. Step 5. For risk applications scenarios are structured along a time continuum that begins with earliest possible detection of an adverse event moving sequentially through deterrence, prevention, response, immediate mitigation of consequences, and long term recovery. As part of this process, structured responses to the following question are developed for each hypothetical risk scenario: what information had it been known before the adverse situation happened could have been used to have prevented it from happening in the first place? The method in which the indicators of benefit and the warnings of adverse events are derived is an object of the present invention. These become the warnings of impending adverse events and the attention of focused data collection strategies designed to produce actionable intelligence that can be used to interrupt event sequences as early as possible to prevent adverse situations.

To address mitigation m in the ATQ algorithm, structured responses to the following question are developed for each hypothetical risk scenario: what information had it been known before the adverse situation occurred could have been used to mitigate its consequences? The method in which the consequences of adverse events are derived using the CSM Method is an object of the present invention.

Figure 15:
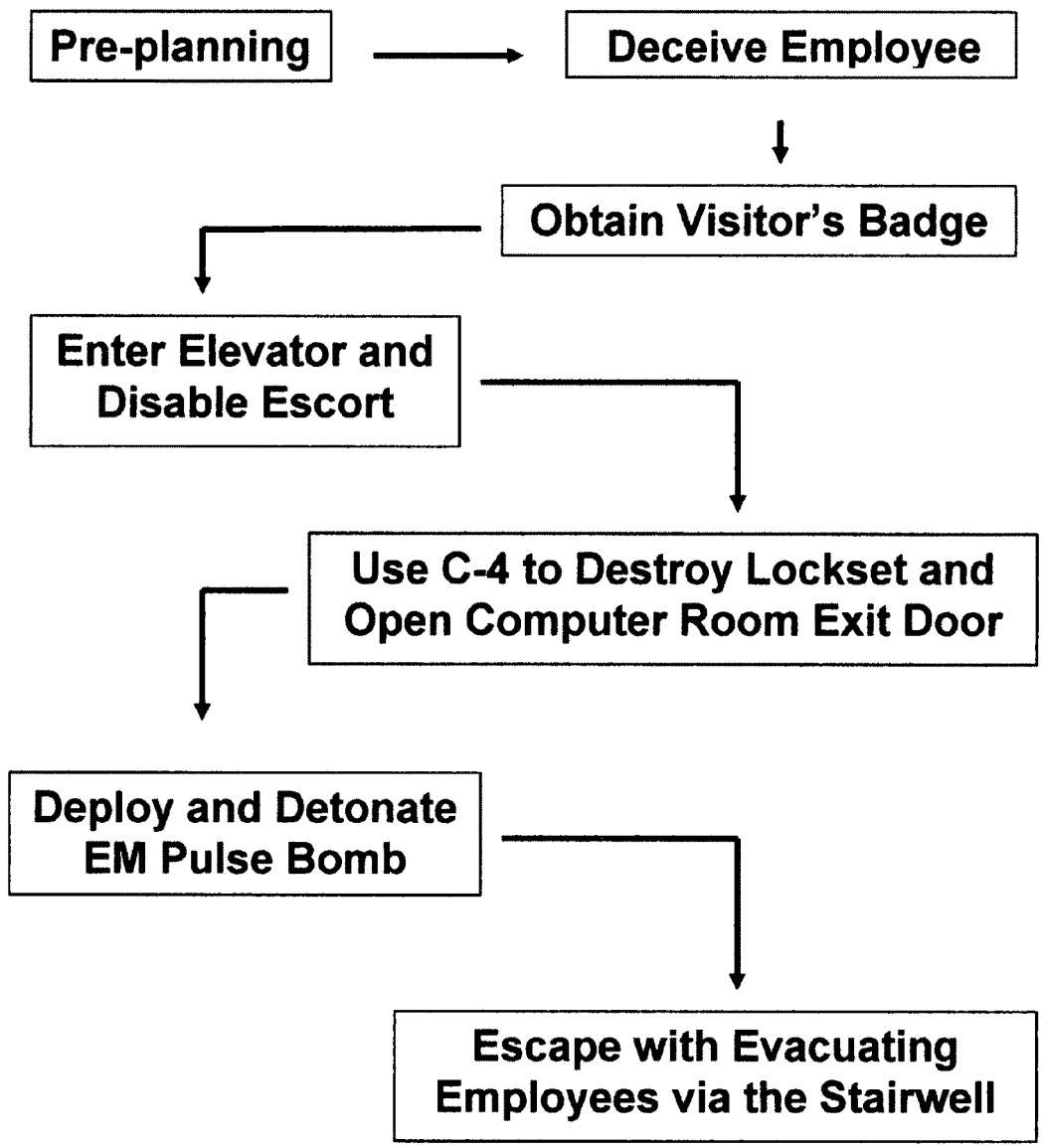
FIG. 15. presents a computer visualization of a risk event sequence for the surreptitious entry and destruction of computer data facility.
Figure 16:
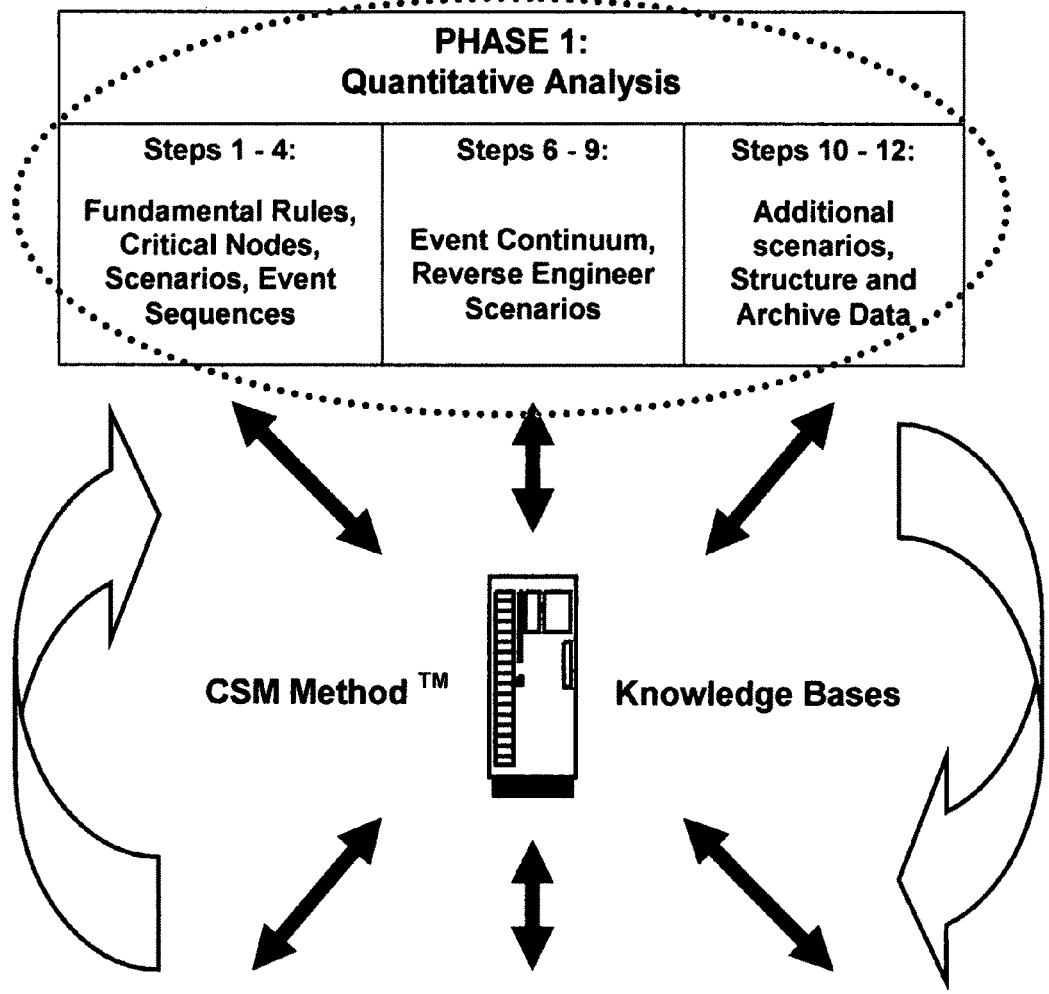
FIG. 16. illustrates that the automation of the CSM Method focuses on the systematic implementation of the tenets of a priori optionality and Phase 1. of the CSM Method.
Figure 17:
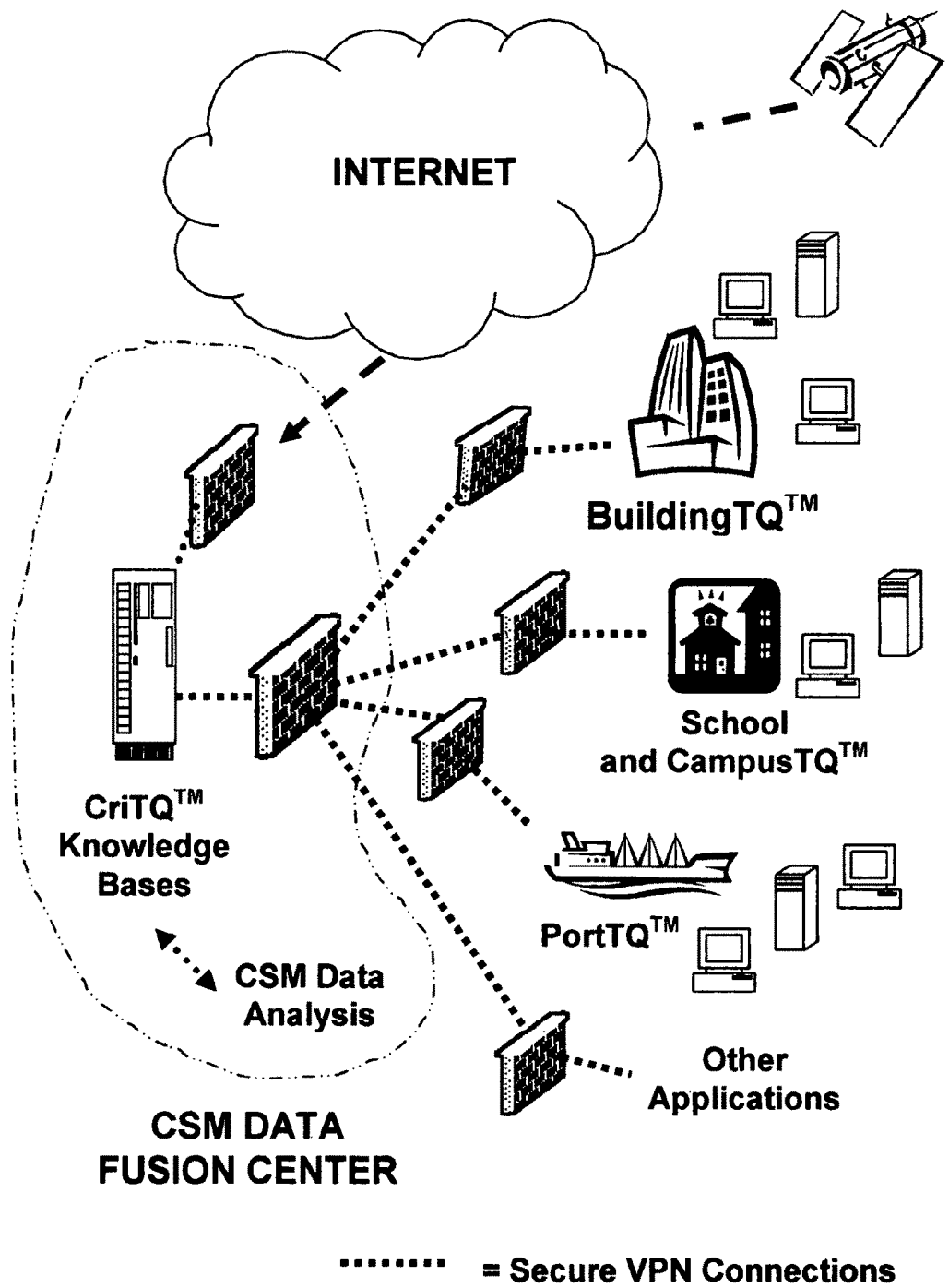
FIG. 17. illustrates that the supporting CSM Method CriTQ architecture is securely connected over a virtual private network (VPN).

FIG. 15. represents a computer visualization of the event sequence analyzed at Table 11., below.

Each risk event sequence is then systematically evaluated against a threat continuum beginning with deterrence and moving through detection, prevention, response and mitigation. For each specific event sequence, responses to the following five questions are systematically structured for repeatability and archived as part of the CSM knowledgebase.

1. What specific actions would deter an adversary from committing the act?
2. What specific actions would facilitate the earliest possible detection of the adversary?
3. What specific information had it been known before the event occurred could have been used to prevent it from happening in the first place? (These specific factors are of great significance because they represent the warnings of an impending attack.)
4. If the adversary is successful in reaching the critical node, i.e., target of the attack, what would be the most effective methods of response?
5. If the adversary is successful in reaching the critical node, i.e., target of the attack, what would are the most effective methods of mitigating the consequences, i.e., extended order effects of a successful attack?

The systematic evaluation of event sequences against benefit and threat continua is an object of the present invention.

Table 11., below, represents a computer visualization of the product—a structured analogous evaluation of an event sequence against the CSM Method threat continuum.

TABLE 11

A computer visualization of a structured evaluation of an event sequence against the CSM Method threat continuum

```
                Deception
                   of
                Employee
              ↗          ↘
                          Enter
                        elevator       Use C-4                                Escape with
                          and         to destroy      Deploy and                other
Pre-planning            disable  →    lockset and  →  detonate        →      evacuating
                         escort       open door       EM Pulse bomb           employees
              ↘          ↗                                                 via the stairwell
                 Obtain
                visitors
                badgers
```

| Deter | Detect | Prevent | Respond | Mitigate |
|---|---|---|---|---|
| Targeted employee awareness programs re: visitor control and other adversary deception tactics | Targeted employee awareness programs re: visitor control and other adversary deception tactics including a "hot-line" for reporting unusual incidents | Unauthorized attempts to circumvent visitor control procedures; investigate all reports | Immediate notification of all security, local, state and federal authorities of a successful attack on computer data facility | Determine how access control system was circumvented and make necessary modifications |
| Strong access control procedures by visitor validation prior to entry; maintain and hold visitor identification | Visitor validation by host; use of two forms of photo identification one of which is an authorized government issued picture ID, e.g., state driver's license | Attempts to use false credentials; investigate all reports | Building shut down with access allowed only by positive identification including security and first responders | Implement business continuity plan (BCM) for an attack; re-route all communications to back up location; if no data back-up work with authorities to preserve as much data as possible; shut down computer data facility access points to absolutely preclude any unauthorized or accidental access to damaged system ; recover available data |
| Proactive monitoring "casing" activities especially those related to physical security and access controls | Establish "hot-line" for reporting suspicious activities with monetary rewards for providing information leading to the arrest and successful conviction of perpetrators | "Hot-line" or other information indicating a possible attack on the computer data facility or related critical nodes; investigate all such reports | Raise security alert level and implement emergency security plans | Work with corporate management, security, all levels of law enforcement and other first responders to prepare a coordinated press release; prepare for press conference |
| Maintain close liaison with local, state and federal authorities re: possible threats | Improve physical security and surveillance of computer data facility; CCTV directly at each entranceway; lockset protection against explosives; use of "Lexan" or other unbreakable see through barrier protection at computer data security island | Earlier detection of adversary force Increased barrier delay time to slow adversary down long enough for an effective security interdiction Determination of "false alarms" for fire | Seal off computer data facility as a potential crime scene and physical danger area; determine type of devices (EMP devices may also be Improvised Destructive Devices intended to kill those who attempt to move them). | Determine adequacy of detection, barrier delay and procedures for detecting false alarms to fire incidents |
| Searches at all ingress points for contraband to include all visitors and random searches of employees | Effective searches will include explosives nitrogen "sniffers", metal detection, radiography of all packages, briefcases, back packs, etc. for contraband | Identification and confiscation of contraband; investigate | Investigate how perpetrators defeated security search procedures | Investigate and upgrade search protocols |
| Communications protocols with local, state and federal authorities to report suspicious sales or purchases of weapons and explosives | Reporting of suspicious sales or purchases of weapons and explosives | Reports of suspicious sales or purchases of weapons and explosives; investigate | Contact law enforcement to inform them of event; request an investigation to assure that no information of suspicious sales or purchases of weapons and explosives may not | Investigate what information, if any, could have been used to detect the perpetrators before they could have successfully completed their attack; upgrade procedures |

TABLE 11-continued

A computer visualization of a structured evaluation of an event sequence against the CSM Method threat continuum Pre-planning → (Deception of Employee / Obtain visitors badgers) → Enter elevator and disable escort → Use C-4 to destroy lockset and open door → Deploy and detonate EM Pulse bomb → Escape with other evacuating employees via the stairwell

| Deter | Detect | Prevent | Respond | Mitigate |
|---|---|---|---|---|
| Targeted security force, employee and local, state federal awareness programs to recognize, report and investigate "casing" or other suspicious activity | Targeted security force, employee and local, state federal awareness programs and reporting protocols | Proactive security, employee and law enforcement recognition, reporting and investigation of "casing" or other suspicious activity; | have been reported; if not reported-investigate Determine if there were signs of "casing" that went unrecognized and include this information as part of a formal after action review (AAR) | If there were unrecognized signs of casing, e.g., hacking, unauthorized access to the building/computer systems, records, etc.; upgrade procedures |
| Active security and law enforcement monitoring of the warnings of adversary pre-planning including unusual purchases of equipment and materials, e.g., high voltage capacitors. | Communications protocols for reporting on warnings of adversary pre-planning | Other reports of possible adversary pre-planning including unusual purchases of equipment and materials, e.g., high voltage capacitors; investigate | When rendered safe, "reverse engineer" weapons; to include a "forensic shopping list" for all components to aid investigation | If means and methods of device construction are different from data previously archived in CSM knowledgebase, update the information |
| Emergency preparedness plans that include post evacuation assembly of all evacuated occupants | Effective implementation of emergency plans through formalized testing programs including post evacuation assembly of all evacuated occupants | Credentials checks to identify unauthorized individuals attempting to escape using evacuation as a "cover" | Conduct credentials checks to identify unauthorized individuals attempting to escape using evacuation as a "cover" | If emergency evacuation procedures do not include "control and assembly" provisions make necessary upgrades to plans, procedures and testing programs |

Based on the analysis of the risk scenario event sequence against the threat continuum, a series of structured questions are developed. The questions fall into five general categories, namely, deterrence, detection, prevention, response and mitigation. This method of analogously deriving and structuring these questions is an object of the present invention. The questionnaires that result are imbedded as a part of the BuildingTQ software logic and used by clients to obtain Threat Quotients (TQ) for each critical node of building operation.

For example, in this case the critical nodes of building operation are the main lobby of the building a primary ingress/egress point and the computer data facility. Table 12., below, provides an example of ipsitive, i.e., "yes" or "no", question sets analogously derived from Table 11., above, showing how the resulting data is systematically derived and structured for repeatability prior to being archived in the CSM Method knowledgebase.

TABLE 12

A BuildingTQ example of an ipsitive question set derived from a scenario-threat event risk continuum analysis

DETERRENCE

1. Does your building security program include a targeted employee awareness program on the importance of visitor control?
2. Does the program address adversary deception tactics to surreptitiously gain access to your building?
3. Does security validate visitor meetings by contacting the host of the visit prior to allowing visitor access to your building?
4. Does your visitor badging process require that visitor's to your building provide two forms of photo ID?
5. Is one form of identification required to be a government issued ID such as a driver's license?
6. Do your procedures call for a badge exchange, i.e., a visitor's badge issued in exchange for a government issued ID and held by security for pick-up at the end of the visit?
7. Has your security force been trained in the proactive monitoring of possible "casing" activities by adversaries, especially those related to physical security and access controls?

TABLE 12-continued

A BuildingTQ example of an ipsitive question set derived
from a scenario-threat event risk continuum analysis 8. Have your employees been trained in the proactive monitoring of possible "casing" or other suspicious activities by adversaries?
9. Have you coordinated the need for proactive monitoring of possible "casing" activities by adversaries, with local, state and federal law enforcement authorities?
10. Do your building managers and the security office maintain close liaison with local, state and federal authorities regarding possible threats to your building?
11. Do you have communications protocols in place with local, state and federal authorities to report suspicious sales or purchases of weapons and explosives that may? Affect the security of your building?
12. Do your security procedures include searches at all ingress points for contraband including weapons, explosives and other contraband?
13. Are specialized metal, explosives and x-ray equipment used?
14. Do you have a listing of suspicious or unusual activities that may indicate your building is being "case?"
15. Does law enforcement monitoring these warnings of possible adversary pre-planning activities including unusual purchases of equipment and materials that could be used to build Improvised Destructive Devices?
16. Are all evacuees, including visitors, accounted for following an evacuation?

DETECTION

1. Do you have a targeted employee awareness programs that include the importance of visitor control and adversary deception tactics?
2. Do you have an employee "hot-line" for reporting unusual or suspicious activities?
3. Do you offer monetary rewards for employees and others who provide information leading to the arrest and successful prosecution of perpetrators?
4. Do each of the critical nodes of your building include a survey by security engineers using the EESI algorithm, i.e., interdiction (I) of the adversary is a function of detection time ($dn_t$), delay time ($dy_t$), response time ($r_t$) and response quality ($r_q$) or: I $f$ ($dn_t$) ($di_{nt}$) ($r_t$) ($r_q$)
5. Do you consistently conduct thorough searches of all visitors who enter your building?
6. Do you conduct searches of employees?
7. Do employees who are exempt from searches have background checks?
8. Are briefcases, backpacks, packages, purses and other hand carried items subject to search?
9. Are there specific protocols in place to assure that suspicious sales and illicit purchases or theft of weapons and explosives occurring in your region are reported to you by local authorities?
10. When you receive such reports, do you impose special security precautions?
11. Do federal, state and local law enforcement in your geographic region maintain a specific list of pre-planning activities that an adversary must undertake to attack your building?
12. Do federal, state and local law enforcement proactively use this list to identify and investigate potential attacks against your building?
13. Are there specific written communications protocols with federal, state and local law enforcement to report suspicious activities that may include "casing" to building security management?
13. Are there specific written communications protocols with other first responders including medical, fire and other personnel?
14. Do you have a formalized program of testing and training of your building's emergency response plan?

PREVENTION

1. Are all unauthorized attempts to circumvent visitor control procedures immediately pursued and investigated?
2. Are all attempts to use false credentials immediately pursued and investigated?
3. Are employee and building management and staff credentials tamper-resistant?
4. Are all continuously badges accounted for?
5. Do you have a published "hot-line" number for employees and others to report suspicious activities?
6. Have you computed an EESI analysis for your data computing facility I $f$ ($dn_t$) ($dy_t$) ($r_t$) ($r_q$)?
7. Have you computed an EESI analysis for all other critical nodes of your building's operations I $f$ ($dn_t$) ($dy_t$) ($r_t$) ($r_q$)?
8. Do you have procedures or technical means for determining false fire alarms?
9. Do you have security response procedures in place in the event you discover weapons, explosives or other contraband during searches?
10. Do you immediately pursue and investigate all reports of suspicious sales, purchases, loss or theft of weapons and explosives?
11. Does your security office and local law enforcement have a list of pre-planning and other suspicious activities that an adversary would have to undertake in order to plan a surreptitious assault on your building?
12. Does your security office make proactive use of the list?
13. Does your regional law enforcement make proactive use of the list?
14. Does federal law enforcement make proactive use of the list?
15. Do your security personnel have basic training in the management of IDD events?
16. Does local law enforcement have a bomb squad ready to respond to your request for assistance?
17. Are there procedures in place with law enforcement, military medical and other first responders in the event of an attack on your building?
18. Does your security office, local, state and federal law enforcement have knowledge of the construction and the materials required to build an improvised destructive device including an electro-magnetic pulse bomb or and Improvised Destructive Device?

TABLE 12-continued

A BuildingTQ example of an ipsitive question set derived
from a scenario-threat event risk continuum analysis 19. Do they maintain a watch list for such items?
20. Do your regional law enforcement authorities report suspicious purchases, sales, losses or thefts of the materials necessary to construct an EMP?
21. Do your regional law enforcement authorities report suspicious purchases, sales, losses or thefts of the materials necessary to construct an IDD?
22. In the event of a building evacuation or lock down, does your emergency plan include procedures for assembly and the positive identification of all personnel?
23. When an evacuation involves a suspected false alarm or other potential illegal activity, do your security procedures change?

RESPONSE

1. Do you have written investigative procedures requiring the immediate investigation of potential or actual breaches of building security?
2. Do you have formal written policies and procedures for immediately contacting local, state and federal law enforcement, as appropriate, of any attack on your building?
3. Do you have an automatic emergency notification call list?
4. Do you have an automated emergency notification call system?
5. Do you have back-up communications capability in the event of loss of primary communications systems and the power that supports them?
6. Do you have written building lock down procedures?
7. Do you have a building wide emergency notification system?
8. Do you have a system of varying security alert levels?
9. Does each successive security level have added security conditions and procedures that must be followed for specific types of incidents that could impact each critical node of your building's operation?
10. In the event of an attack on your data computing center do you have written procedures to Seal off computer data facility as a potential crime scene and physical danger area?
11. Do you have written procedures to determine the type of devices (EMP devices may also have secondary Improvised Destructive Devices intended to kill those who attempt to move them)?
12. Do you have written "render-safe" procedures for devices or suspicious objects or packages left unattended in your building?
13. Do you have written policies in effect that require the investigation to determine how perpetrators circumvented security procedures and equipment?
14. Do these policies require that deficiencies discovered during these investigations are corrected?
15. Do you contact law enforcement to request an investigation?
16. Do you request assurances that no information of suspicious sales, purchases, thefts or losses of weapons and explosives have been reported
17. If you learn that information was not provided to you do you request an investigation as to why not?
18. In the aftermath of an attack on your computer data facility, do you determine if there were signs of "casing" that went unrecognized?
19. Do you have a formal system for conducting after action reviews following security and safety incidents involving each critical node of your building's operations?
20. Is this information included as part of a formal after action review (AAR)?
21. Do these procedures require positive identification using tamper resistant photo ID?
22. When rendered safe are the devices left behind in the computer data facility "reverse engineered" to include a "forensic shopping list" for all components to aid in the investigation?
23. Are security forces trained to recognize the configurations of different types of improvised weapons?
24. Do you have emergency procedures in place that require, in the event of a building evacuation, that all personnel including visitors are accounted for?

MITIGATION

1. In the aftermath of an attack on your computer data facility do you determine how the access control system was circumvented and make necessary modifications?
2. Are there written procedures requiring that this be done?
3. Do you have a business continuity plan in the event that your computer data facility is attacked and data destroyed?
4. Does your BCM plan Implement business continuity plan require re-routing of all communications to a back up location?
5. If you have no data back-up facility do you have plans to work with authorities to preserve as much data as possible?
6. Do lock down your computer data facility access points to absolutely preclude any unauthorized or accidental access to damaged system?
7. Do you have a data recovery plan?
8. In the aftermath of the event, do you work with corporate management, security, all levels of law enforcement and other first responders to prepare a coordinated press release and prepare for a press conference?
9. Are there written procedures requiring that this be done in the event the building is attacked?
10. In the aftermath of the attack, do you determine the adequacy of detection, barrier delay and response times?
11. Are there written procedures requiring that this be done?
12. Is the CSM knowledgebase updated to reflect new data, if any?
13. Do you have procedures for detecting false alarms to fire and security systems?

TABLE 12-continued

A BuildingTQ example of an ipsitive question set derived
from a scenario-threat event risk continuum analysis 14. Do you investigate why search procedures failed?
15. Do you upgrade search protocols accordingly?
16. Do you have written procedures requiring that this be done?
17. Do you investigate what information, if any, could have been used to detect the perpetrators before they could have successfully completed their attack?
18. Do you upgrade procedures accordingly?
19. Are there written requirements that numbers 3. and 4., above, must be conducted?
20. In the aftermath of the attack on the computer data facility, do you investigate_if there were unrecognized signs of casing, e.g., hacking, unauthorized access to the building/computer systems, records, etc.
21. Do you upgrade security policies, procedures and equipment to "close holes" in your security systems?
22. Are there written requirements that numbers 6. and 7., above, must be conducted?
23. If the adversary means and methods of device construction are different from data previously archived in CSM knowledgebase do you update the data to include new information?
24. Do your emergency evacuation procedures include "control and assembly" provisions?
25. Do they include positive identification of all personnel including visitors?
26. Is positive ID assured using photo tamper-resistant ID?
27. Are evacuation and control and assembly procedures tested?
28. Are evacuation plans and procedures upgraded accordingly?
29. Do you have written requirements that evacuation drills be conducted?
30. Has it been more than twelve months since the last evacuation test at your building?

The use of ipsitive questions allows the BuildingTQ software to provide scores based on a "yes" or "no" answer to the question set. Clearly a "yes" response receives a lower TQ value (less risk) than a "no" answer.

Phase 1. Step 6. (Benefit applications only). Benefit applications use the same systematic approach to structure data as risk scenarios do. In the same fashion, benefit scenarios are structured along a time continuum, but one that begins with earliest possible recognition of an opportunity moving sequentially through strategy development to take advantage of the opportunity, specific actions to capture the opportunity and short and long-term sustainment of benefit. Structured responses to the following two questions for each hypothetical benefit scenario are developed: a) what information had it been known before the opportunity was first recognized could have been used to recognize and act on it sooner? and; b) what information had it been known beforehand could have been used to increase and sustain the benefits of the opportunity longer? As with risk scenarios, this data represents the indicators of impending opportunities and sustainment and the subject of data collection strategies designed to search out and identify opportunities as early as possible and sustain optimum event sequences, i.e., those of greatest benefit in the short and long term. In this case, benefit (B) is a function of the probability of an event (good or bad) happening (PO) times the consequences that result (c) or: B f PO (c). This is known as the Opportunity Benefit Algorithm (OPA). The Opportunity Benefit Algorithm (OPA) is an object of the present invention.

Phase 1. Step 7. Each scenario is reverse engineered to isolate how potential initial conditions would affect the manner in which people exercise the fundamental rule sets that in combination serve to propagate system's behaviors that, in turn, affect the critical nodes of a system's operation. How potential initial conditions affect the manner in which people exercise fundamental rule sets is an object of the present invention.

In our Building TQ example of an adversary attack on the computer data facility, the fundamental rule is represented by the nature of the attack—in this case surreptitious entry. As discussed previously, a priori optionality, tells us that there are three and only three ways a building can be attacked: 1) armed assault; 2) surreptitious entry, and; 3) improvised chemical, biological or nuclear devices including explosives, "dirty bombs", EMP devises, "bio bombs", fire bombs, etc. Reverse engineering our BuildingTQ scenario we quickly see the difference between a fundamental rule and initial conditions. In this example, initial conditions would be things such as time of day, the results of adversary casing of the building with special emphasis on things like the effectiveness of the access control system, detection capabilities, construction features, the consequences that will result from a successful attack and other factors.

Take as an example the initial condition that the attack on the computer data facility occurred during a normal business day? Ask yourself the question, how did a daytime attack during normal business hours affect the way people behave to propagate a system's behavior? In the BuildingTQ example the answer is clear. A daytime attack was critical to the successful escape of the adversaries by creating the circumstances necessary for a mass evacuation of the building. The adversary's means and methods depended upon being able to mingle with large numbers of people evacuating the building in order to make good their escape. A fire alarm late at night or on a weekend would not result in a mass evacuation because the building would be occupied with too small a population of people to provide the necessary "cover" for a successful escape.

Another initial condition is the effectiveness of the building's access control system. Ask yourself the question how did the performance of the access control system propagate a system's behavior? In the Building TQ example the answer is clear. A weak easily circumvented access control system created a huge "hole" in the security system that could be easily exploited by the adversary. Even though the building had been infiltrated by an adversary force, the access control and security system continued to operate on a business as usual basis because there was no detection. Ask yourself how the adversary's means and methods would have to change in our BuildingTQ scenario had they been confronted with a strong access control system. The incident would likely have been prevented.

Isolating initial conditions from fundamental rules is essential for the systematic generation of new scenario event paths that can then be subjected to EESI and a threat continuum analysis. The analogous, systematic and repeatable methods used under the CSM Method to isolate initial conditions from fundamental rules are an object of the present invention. The systematic generation of a plurality of new scenario event paths that can be subjected to EESI and a threat continuum analysis is an object of the present invention.

Phase 1. Step 8. Based on the results of reverse engineering scenarios involving critical nodes of systems operation, storyboards are developed to produce simulations of risk or benefit situations that can affect the system. These simulations are designed to reflect complex interdependencies among different critical nodes and their effects on outcomes. They identify the critical decision points within each hypothetical simulation, i.e., those points where decisions must be made to avoid the uncontrolled evolution or devolution of a system. The use of CSM Method derived simulations that reflect complex interdependencies between and among critical nodes of systems operation is an object of the present invention. The identification of CSM Method derived critical decision points is an object of the present invention.

In our BuildingTQ example, a story board is developed based on the event sequence scenario for the adversary attack against the computer data facility. The application of the of EESI algorithm and a threat event continuum analysis allows us to easily isolate critical decisions that would have prevented the event or otherwise diminished the extended order effects of a successful adversary attack on the computer data facility. Isolating critical decisions that would have prevented an adverse event or otherwise diminished the extended order effects of a successful adversary attack is an object of the present invention. A few examples of critical decision points in our Building TQ scenario include:

The initial employee decision to "validate" the adversary team as "legitimate" visitors to the building even though he had no confirmation of a meeting by the host.

The decision by access control personnel not to require positive identification of the "visitors."

The decision by access control personnel not to call the alleged host of the meeting to confirm the legitimacy of the visit.

Decisions to ignore or avoid quantitative analysis showing the true capability of the security system in terms of early detection, barrier delay time, time for security response and the quality of the security response.

Decisions to avoid or ignore a broader range of potential scenarios that could impact the computer data facility (and likely other critical nodes of building operation).

Phase 1. Step 9. Each critical decision point in a simulation is reverse engineered carefully considering the risk and/or benefit continuum, the outcomes and extended order effects of different decision options, and the identification of warnings and/or indicators of risk and benefit situations. Out of the range of possible decisions, the optimum decision sets in a simulation that lead to the most desirable outcome(s) are identified. The derivation of optimum decision sets using the CSM Method is an object of the present invention.

In our BuildingTQ example, an unknown group approaching an employee to help them gain access to the building for an unconfirmed meeting is a warning signal of a possible attack. During this step, the critical "what if" question is addressed: suppose the initial employee decision had been different? Say the employee remembered from the company's new hire orientation program that it was important to assure that only legitimate visitors with positive identification be allowed to enter the building. The employee would likely have done one of two things; 1) recognize the approach by strangers as suspicious and report it to security, or 2) if properly trained to do so, play along with the adversaries and clandestinely work with security to identify and capture the suspects.

Clearly, either of these two actions would have served to prevent the attack on the data computing facility as it was originally planned. But if the employee decided to "play along" with the adversaries and clandestinely coordinate his actions with security, the perpetrators would not only have been prevented from attacking the computer data facility as planned, but also removed as a potential future threat. In this case, decision number two is the clearly the preferred option. The question then becomes, do current employee security orientations include such things as describing suspicious behaviors? What to do? How to do it? And, so on. Different decisions are mapped showing their extended order effects. Storyboards are expanded around different decision sets and outcomes, i.e., extended order effects, systematically structured in decision fault tree formats for repeatability and archived in the CSM knowledgebase. Suspicious approaches to employees by strangers could be a warning signal of an impending attack and is archived in the knowledgebase. The derivation and structuring of the extended order effects of a range of possible decisions using the CSM Method is an object of the present invention.

Phase 1. Step 10. The fundamental rule sets, associated initial conditions, the sequence of events associated with different scenarios, arrays of potential outcomes for each scenario involving a critical node of operation and the warnings and/or indicators or risk or benefit situations for $t_1$ are structured, catalogued and archived in a supporting knowledgebase. In our BuildingTQ example additional scenarios involving critical nodes and combinations of critical nodes are systematically examined in Phase 1. Steps 1.-9. with all data structured for repeatability in the CSM knowledgebase as described previously. Scenarios developed in this step include complex interdependencies between critical nodes. For example, in our BuildingTQ computer data facility, computer operations are also highly dependent on other critical nodes and infrastructures including back-up power, effective fire suppression systems, cabling and communications systems, etc.

Phase 1. Step 11. The process is repeated for hypothetical scenarios involving the same and other critical nodes at $t_2$, $t_3$, $t_4$ and so on by adjusting the combinations and values assigned to initial conditions to create an array of event paths with different potential outcomes for each of the critical nodes of system operation that are bounded by the fundamental rule sets deduced during Step 1. of the process. Outcomes are derived for each scenario based on the relative affect of one or a combination of initial conditions and the manner in which associated fundamental rule sets are exercised to propagate a systems behavior observed at $t_2$, $t_3$, $t_4$, and so on. The production of a plurality of CSM Method analogously derived futures driven scenarios is an object of the present invention.

Using our BuildingTQ example, this step creates a data library of different scenarios based on a range of possible attacks involving the computer data facility and the fundamental rule of surreptitious entry. New scenarios at $t_2$, $t_3$, $t_4$ and so on are systematically created by changing initial conditions as described in Phase 1. Step 10. are structured using the Phase 1. CSM Method business process to generate a range of different scenarios involving the fundamental rule of surreptitious entry. The data library possible attack scenarios is archived in the CSM Method knowledgebase.

Phase 1. Step 12. The fundamental rule sets, associated initial conditions, the sequence of events associated with different scenarios, arrays of potential outcomes for each scenario involving a critical node of operation and the warnings and/or indicators of risk or benefit situations for $t_2$, $t_3$, $t_4$, $t_5$ and so on are structured for repeatability, catalogued and archived in the supporting CriTQ knowledgebase.

Using our BuildingTQ example, Phase 1. Steps 1.-12. are repeated for different critical nodes of building operations using the remaining two fundamental rules of armed assault and improvised destructive devices (IDD's) including chemical, biological and biological weapons. This creates an extensive data library of structured, repeatable data that is archived for use and analysis in the CSM CriTQ knowledgebase. The development of analogously derived futures driven scenario event libraries based on the CSM Method and the six tenets of a priori optionality is an object of the present invention.

Automating Phase 1. of the CSM Method Business Process: Building TQ as One of Many Possible Applications Data gathered and structured in Phase 1. Steps 1.-12. is archived in the CSM CriTQ knowledgebase, is analyzed using an intelligent system that applies values to ipsitive question sets on a scale of 1 to 10 with 1 being the lowest threat quotient or TQ (smallest level of risk) and 10 being the highest TQ (highest level of risk). The intelligent system weights assigned values based on numerous factors including the type of building, its function, number of critical nodes, demographic data for the city and region in which the building is located and other factors further described below. The methods of deriving threat quotient (TQ) scores and values is an object of the present invention.

At the core of each CSM Method business process application is a tailored software logic architecture. Software logic architectures are unique to the subject area involved. For purposes of demonstration and explanation this claim uses an existing risk management application for buildings known as BuildingTQ. The BuildingTQ CSM Method business process application is used here as only one of many representative examples of how Phase 1. of the CSM Method can be automated. Tailored CSM Method software logic architectures that are designed to address the range of risk management applications is an object of the present invention.

In structuring the software logic architecture for Building TQ eight distinct steps are involved that build on Phase 1. Steps 1.-12. of the CSM Method business process. Each of the eight steps for structuring the software logic architecture for the Building TQ application is consistent with the six tenets of a priori optionality. Each step is described below.

The BuildingTQ Software Logic Architecture

Step 1. involves the creation of a "building type" taxonomy that allows for the identification of generic types of buildings and facilities. For example, a representative list of different building types includes:
1. School and college campuses
2. Banks
3. Hospitals
4. Multi-story commercial office buildings
5. Multi-story apartments and condominiums
6. Commercial retail buildings
7. Manufacturing facilities
8. Water and sewage treatment facilities
9. Hospitality industry including hotels, malls, theme parks, etc.
10. Casinos
11. Computer data centers
12. Emergency response centers
13. Stadiums
14. Convention centers
15. Warehouses
16. Others Step 2. involves the identification of generic critical nodes for each generic class of building and facility. For example, a representative list of the critical nodes generic to all building types includes:
1. HVAC Systems
2. SCADA rooms, control and sensor systems
3. Mass gathering areas
4. Parking facilities including above ground and subterranean
5. Ingress/egress points including roof, utility tunnels, main entrances and exits, loading docks, and all other doorways
6. Communications systems including cabling runs
7. Blast physics stress locations
8. Water (intake and distribution)
9. Sanitation and sewer systems
10. Power supplies and distribution systems including wiring
11. Perimeter security including physical barriers and buffer zones
12. All human transit systems, e.g., elevators, escalators, stairwells
13. Security systems including alarm systems and guard force response capabilities
14. Safety systems especially those relating to fire prevention and management
15. Others Step 3. involves the prioritization of the relative importance of generic critical nodes based on specific building/facility type. Numerical weighting factors are applied to the generic critical nodes of different types of buildings and facilities. For example, university, college and K-12 school campuses are unique from other building configurations based on the purpose of their use. Table 13., below, illustrates how the CSM Method business process analysis and weighting model is used to prioritize examples of the different critical nodes of a college campus and building safety. Numerical weighting values are the result of the multidisciplinary inputs of subject matter experts, computer modeling, and data gathered during Phase 1. of the CSM Method business process and other specific threat data. The prioritization of the importance of critical nodes using the Event Probability Algorithm (EPA) is an object of the present invention. The CSM Method business process analysis and weighting model is an object of the present invention.

TABLE 13

How the CSM Method business process analysis and weighting model is used to prioritize examples of the different critical nodes of college campus and building safety

| Critical Node | Weight* | Rationale |
| --- | --- | --- |
| 1. Secure Control Automated Data Acquisition (SCADA) system | SCADA equipped structures 8.0 TQ Non-SCADA equipped structures 1.0 TQ | In many modern school buildings SCADA may play an important role in controlling HVAC, communications, security, safety surveillance and alarm systems and other critical nodes of building operations. |
| 2. HVAC systems | Roof based air intakes 8.0 TQ Ground-based air intakes | HVAC systems and attendant air intakes, whether roof or ground based, are highly susceptible to the |

TABLE 13-continued

How the CSM Method business process analysis and weighting model is used to prioritize examples of the different critical nodes of college campus and building safety

| Critical Node | Weight* | Rationale |
|---|---|---|
| | 9.0 TQ | introduction and distribution of deadly chemical gasses and biological agents; improperly maintained HVAC systems can also pose serious health risks. |
| 3. Security Systems | 9.5 TQ | Security systems represent the first line of defense for college campus and building security and are essential for deterrence, early detection, prevention and effective response to both man-made events and natural phenomenon. |
| 4. Parking facilities | 9.5 TQ | In-building or subterranean parking areas are particularly susceptible to the use of an Improvised Destructive Device (IDD). The detonation of an IDD (s) can cause catastrophic structural failure if properly placed. Secondary fires fueled by gasoline can burn plastics and other materials from vehicles to emit toxic gases. Open parking lots located close to buildings can also be the target of a serious threat posed by a car bomb. |
| 5. Mass gathering areas | 9.0 TQ | Students massed in large numbers can represent a highly attractive target for mass killings by malevolent actors; large scale evacuations may become problematical in the event of an emergency. |
| 6. Blast physics stress locations | New construction TQ 7.5 Old construction TQ 8.5 | The construction of modern buildings makes them less susceptible to complete structural failure using IDD's. The use of larger "truck bombs" similar to the Murrah Federal Building bombing, however, must be addressed by effective perimeter security including barriers and buffer zones that prevent unauthorized "close-in" truck access. |
| 7. Ingress and egress points | Campus access 7.0 TQ Unauthorized building ingress/egress 9.0 TQ | By nature, centers of learning are considered open access areas. Unauthorized access to campus buildings, however, represents a much greater threat to the security and safety of students. |
| 8. Communications systems | 9.5 TQ | In the event of emergency, it is imperative to have effective means of communicating quickly to large populations of students, law enforcement, public safety personnel and the families of students. |
| 9. Water intake and distribution systems | 7.0 TQ | Water supplies may be vulnerable to the introduction of poisonous or toxic materials; widespread contamination is a function of water usage and the resultant dispersion of poisonous or toxic substances introduced into the water supply system at key locations. |
| 10.-14. Remaining Critical Nodes | Value | Rationale |

*Based on a scale of 1 to 10 with 1 being least important and 10 being most important Step 4. Build a taxonomy that rates the importance of each critical node of operation (CNO) by generic building/facility type in terms of probability of occurrence (based on past trends, future modeling) and potential consequences relative to natural phenomenon using a scale of 1 to 10 with 1 being the lowest consequence to 10 being the highest threat quotient (TQ) based on today's standard building practice. This becomes the BuildingTQ initial TQ default rating for each CNO. The derivation of default TQ starting values for different types of buildings, facilities and other infrastructure systems using the CSM Method is an object of the present invention.

As described previously, for natural phenomenon (v) f PO (c). Table 14., below, applies TQ values to a large commercial bank building geographically located in Omaha, Nebr. In this example, we are assessing the risk associated with the heating, ventilation and air conditioning (HVAC) system, a critical node of the building's operations. For example, the Omaha region is known for its frequency of damaging tornadoes. On large commercial buildings HVAC systems are frequently located of roof areas making them unusually susceptible to the type of high wind conditions that can be generated by tornadoes. Because tornadoes are a relatively common weather phenomenon affecting the region, a probability of occurrence (PO) value of 9 on a scale of 1 to 10 is applied. We also know that HVAC systems affect all building operations and are one of the systems most critical to the safe operation of a modern commercial office building. A tornado holds the potential of completely disabling the bank's HVAC system and thus a consequence value of 9 is assigned. The resulting threat quotient (TQ) results from multiplying the probability of occurrence (PO) value of 9 times the consequence (c) value of 9 to produce a TQ of 81%.

Earthquakes in the Omaha region, on the other hand, are a relatively rare geological phenomenon. For this reason a low PO value of 2 is assigned. However, in the unlikely event of a major earthquake, there is good reason to conclude that major commercial office buildings would sustain major damage including the destruction of their HVAC systems. Thus a high (c) value of 9 is assigned. The PO value of 2 times the (c) value of 9 results in a TQ of 18%. The process is repeated for the range of natural phenomenon that could affect a modern commercial bank building located in Omaha, Nebr.

As illustrated by Table 15., above, the existing TQ value for a tornado occurring (PO) and causing devastating damage to the building's HVAC systems initially stands at 81%—a high TQ value. But stronger "bolt-down" systems for roof based HVAC units make them much more wind resistant and provide a mitigating (m) value of 21%. The existing TQ value of 81% is reduced (−) by 21% to establish a new ATQ of 61% closer to the average expected for a building of this type located in the Omaha region.

Step 6. creates the taxonomy for rating the importance of CNO's by generic building/facility type in terms of vulnerability and potential consequences relative to attack types, i.e., BuildingTQ fundamental rules, using a scale of 1 to 10 with 1 being the lowest consequence to 10 being the highest threat quotient (TQ) based on today's standard building and security practice. This becomes the BuildingTQ initial TQ default rating for that building type. As described previously, for threat events the probability of a risk event occurring (PO)

TABLE 14

The CSM Method BuildingTQ Model for applying TQ values for natural phenomenon

| Building Type | Natural Disaster | Location | Critical Node | Probability of Occurrence | Consequence | TQ |
|---|---|---|---|---|---|---|
| Bank | Tornado | Omaha | HVAC Systems | 9 | 9 | 81% |
|  | Earthquake |  |  | 2 | 9 | 18% |
|  | Flooding |  |  | 2 | 5 | 10% |
|  | High Winds |  |  | 6 | 9 | 54% |
|  | Lightning |  |  | 7 | 9 | 63% |
|  | Hurricane |  |  | 2 | 9 | 18% |
|  | Tsunamis |  |  | 2 | 9 | 18% |
|  | Snowfall |  |  | 9 | 6 | 54% |
|  | Fire |  |  | 8 | 9 | 72% |

Step 5. involves the identification and rating of the significance of mitigating actions (m) by generic building/facility type and critical node that will reduce the potential consequences relative to natural phenomenon using a scale of 100 percentage points.

As described previously, for natural phenomenon consequence (c) minus mitigating actions (m) equals Adjusted TQ or (c)−(m)=ATQ. Table 15., below, applies mitigating values for natural phenomenon for the same bank building located in Omaha, Nebr., to produce an ATQ.

is a function of the vulnerability of the CNO (v) times the consequences that would result from a successful attack (c) or: PO f (v) (c).

Table 16., below, applies TQ values for the HVAC systems against armed assault, surreptitious entry and the use of an improvised destructive device for the same bank building located in Omaha, Nebr. As noted above, these values become the BuildingTQ initial TQ default rating for a modern bank building geographically located in the Omaha, Nebr. region.

TABLE 15

The CSM Method BuildingTQ model for applying ATQ values for natural phenomenon

| Building Type | Natural Disaster | Location | Critical Node | Current TQ | Mitigating Action | % Value | ATQ |
|---|---|---|---|---|---|---|---|
| Bank | Tornado | Omaha | HVAC Systems | 81% | Stronger Boltdown | 20% | 61% |
|  | Earthquake |  |  | 18% | WB Earthquake Resistance | 60% | 1% |
|  | Flooding |  |  | 10% | Pumping System for below grade | 40% | 1% |
|  | High Winds |  |  | 54% | Stronger Boltdown | 20% | 34% |
|  | Lightning |  |  | 63% | Increased Grounding | 40% | 23% |
|  | Hurricane |  |  | 18% | WB Hurricane Resistance | 40% | 1% |
|  | Tsunamis |  |  | 18% | WB Tsunami Resistance | 20% | 1% |
|  | Snowfall |  |  | 54% | Increased Roof Load Construction | 25% | 29% |
|  | Fire |  |  | 72% | Primary and Secondary Fire Safety Design & Evacuation Plan | 60% | 12% |

TABLE 16

The CSM Method BuildingTQ Model for applying TQ values for risk events

| Building Type | Attack Type | Location | Critical Node | Vulnerability | Consequence | TQ |
|---|---|---|---|---|---|---|
| Bank | Armed Assault | Omaha | HVAC Systems | 8 | 9 | 72% |
| | Surreptitious Entry | | | 6 | 9 | 54% |
| | Improvised Device | | | 8 | 9 | 72% |

As Table 16. illustrates, the results of the Phase 1. CSM Method business process show that under certain scenarios, attacks that include HVAC systems can substantially increase the risks of a bank to successful attack. Consequently, a relatively high TQ value of 8 is assigned to the bank in Omaha. The use of HVAC systems to aid surreptitious entry, while still a significant concern, is assigned a lower TQ value of 6. The use of an improvised destructive device, especially a biological or chemical weapon is assigned a TQ value of 8. Multiplying the assigned vulnerability value (v) times the consequence (c) value produces a TQ value. For example, the vulnerability of the bank's HVAC system (v) to attack using an improvised destructive device 8, when multiplied by the consequences of a successful attack against the HVAC system (c) result in a TQ score of 72% on a scale of 1 to 100 percentage points.

Step 7. Build a taxonomy that rates by CNO's and generic building/facility type, mitigating actions (m) that will interdict attacks and reduce the consequences of attempted attack types on a scale of 1 to 100 percentage points. Weight the elements of detection, delay, response and quality of response to reflect the greater value of anticipation and prevention versus reaction and response. For example, the vulnerability of the CNO (v) times the consequences of a successful attack (c) minus mitigating actions (m) weighted in favor of interdiction where early detection time $(dn_t)$ is assigned a 40% weighting factor (on a scale of 1 to 100 percentage points); delay time $(dy_t)$ is assigned 25%; response time $(r_t)$ is assigned 20% and quality of response (rq) is assigned 15% or: (v)(c)−(m) where m=$[(dn_t) (40\%)] [(dy_t) (25\%)] [(r_t) (20\%)] [(r_q) (15\%)]$.

Table 17., below, applies mitigating values and associated weights for armed assault, surreptitious entry and improvised destructive devices for the same bank building located in Omaha, Nebr.

As Table 17. illustrates, initial default TQ scores for armed assault, surreptitious entry and the use of an improvised destructive device for specific building types are adjusted based on mitigating factors that are weighted in favor of anticipation and prevention in order to interdict the adversary before a successful attack can be perpetrated. In the BuildingTQ example involving the bank in Omaha, an initial TQ value of 72% was assigned to the risk posed by an improvised destructive device being used against the HVAC CNO of the bank building. However, with the introduction of perimeter protection for HVAC air intakes, the use of chem.-bio sensors and drop down baffles to immediately halt further convection flow of contaminated air into the building is given a very significant mitigating value of 50%. This is because the underlying mitigation weighting scale gives more relative value to mitigating factors that provide for early detection and increased delay time that, in turn, would lead to the successful interdiction of the event before it happens and before consequences can result. Use of weighting factors to give more relative value to mitigating factors that provide for early detection and increased delay time that, in turn, lead to successful interdiction before events is an object of the present invention.

Step 8. Create the taxonomy for natural phenomenon and provide the heuristic rationale for natural phenomenon and malevolent attack questionnaires.

For Natural Phenomenon $v f PO(c)$ $(c)-(m)=ATQ$

For Malevolent Attacks $PO f(v)(c)$ $I f(dn_t)(dy_t)(r_t)(r_q)$ $(v)(c) f m$

TABLE 17

CSM Method BuildingTQ model for applying ATQ values for risk events

| Building Type | Attack Type | Location | Critical Node | Current TQ | Mitigating Actions | % Value* | ATQ |
|---|---|---|---|---|---|---|---|
| Bank | Armed Assault | Omaha | HVAC Systems | 72% | Perimeter protection of intakes; chem-bio sensors/baffle | 50% | 22% |
| | Surreptitious Entry | | | 54% | Alarm man-size ducts | 35% | 19% |
| | Improvised Destructive Device | | | 72% | Blast resistant design and construction; explosives searches | 35% | 37% |

*(v)(c) − (m) where m = $(dn_t)$ (40%) $(dy_t)$ (25%) $(r_t)$ (20%) $(r_q)$ (15%)

Phase 1. Steps 4. and 5. of the CSM Method business process creates the taxonomy and provides the heuristic rationale and a sample questionnaire for a surreptitious entry malevolent attack. The CSM Method taxonomy and heuristic rationale for natural phenomenon and malevolent attack questionnaires is an object of the present invention.

The CSM Method™, CriTQ™ and the BuildingTQ™ Automated Software System

The CSM Method business process uses a three-phased, multi-step process for analyzing and improving performance within complex systems. The CSM Method uses a science-based process to help clients better understand their complex environments.

Data gathered in all phases of the process is captured in an intelligent knowledgebase. This powerful platform incorporates semantic search and data retrieval capabilities and the ability to graphically display data. This enables users to easily model the behavior of their system—for example, to see the impact of changes to a compensation plan on sales, or to see how the failure of a critical radio network in Albany would impact airport operations in New York City.

The focus of CSM method software systems is on the automation Phase 1: Quantitative Analysis of the CSM Method business process in order to serve as the foundation for the implementation of Phases 2. and 3. of the process. Structured Phase 1. data archived in the CSM Method knowledgebase is integrated with and used to support the Phase 2: Qualitative Analysis and Phase 3: Subsequent CSM interventions Phase 3. of the CSM business process.

Phase 1: Quantitative Analysis

The growing complexity of today's world environment mandates a new approach to threat analysis. The CSM Method supports products and services in targeted markets. We are developing a series of products based on the CSM Method. These products are marketed as the CriTQ™ product family. The CriTQ architecture consists of three parts, securely connected over a virtual private network (VPN).

1. The centralized CriTQ knowledge engine, i.e., CSM Method knowledgebase. This server stores all common data, including satellite imagery, geospatial data, current threats, regulatory information libraries, vulnerabilities and risks, warnings and indicators of impending events, and "best practices" for risk mitigation This data is refreshed on a continuing basis from open Internet sources using automated search and retrieval tools. The CriTQ engine is housed in a manner to provide effective continuity of operation support.

2. An application-specific server located on the customer's premises (or optionally hosted at another secure location). This server stores the individual user's proprietary data (user information, building plans, risk mitigation strategies, etc), to prevent unauthorized access.

3. A solution-specific interface application, built to run under a standard web browser (Internet Explorer, Firefox, etc). This application provides users a real-time interface into both servers, seamlessly blending common data and proprietary data in response to user requests.

BuildingTQ™

Modern buildings are made up of a mix of interdependent components. HVAC systems rely on utility power and commercial water, include complex distribution systems, and employ SCADA (Supervisory Control and Data Acquisition) applications to automate control processes. Traditional risk assessment products look at each of these components individually. In contrast, BuildingTQ uses a system-wide approach to threat assessment, analyzing how threats to one critical component will impact other components and the building as a whole.

BuildingTQ is a comprehensive vulnerability assessment and risk management tool targeted at owners and managers of commercial properties. BuildingTQ enables users to identify and resolve critical vulnerabilities arising from multi-hazard threats. This includes both natural threats (e.g. fire, hurricanes, and earthquakes) and man-made threats (terrorist actions, criminal activities). It is based on a business process model known as the CSM Method.

The results of this assessment—what we call the Threat-Quotient™—is displayed in graphical format using a combination of geospatial data and 3-D building diagrams. BuildingTQ also suggests possible strategies for mitigating risks based on "best practices" in our knowledgebase. As mitigation strategies are selected (or new ones are defined by the user), changes to the ThreatQuotient (TQ) are displayed in real time. This enables users to model their actions to determine the most effective solution based on their individual business, security and safety model.

Competing approaches rely on historical threat data, i.e., the law of large numbers, which by definition do not reflect real time changes in the threat environment. In contrast, BuildingTQ's threat data maintained in the CriTQ knowledge engine is continuously refreshed as it scans the environment for the warnings of impending attacks based on data provided using the CSM Method business process.

As depicted in Tables 18. and 19., the CriTQ knowledgebase continuously scans the internet and other sources for open source data identified by the CSM Method business process. The data mining of open sources for data on CSM Method derived indicators and warnings is an object of the present invention.

The BuildingTQ Automated System Requirements Specification
TABLE 18
Continuous scan of open source data
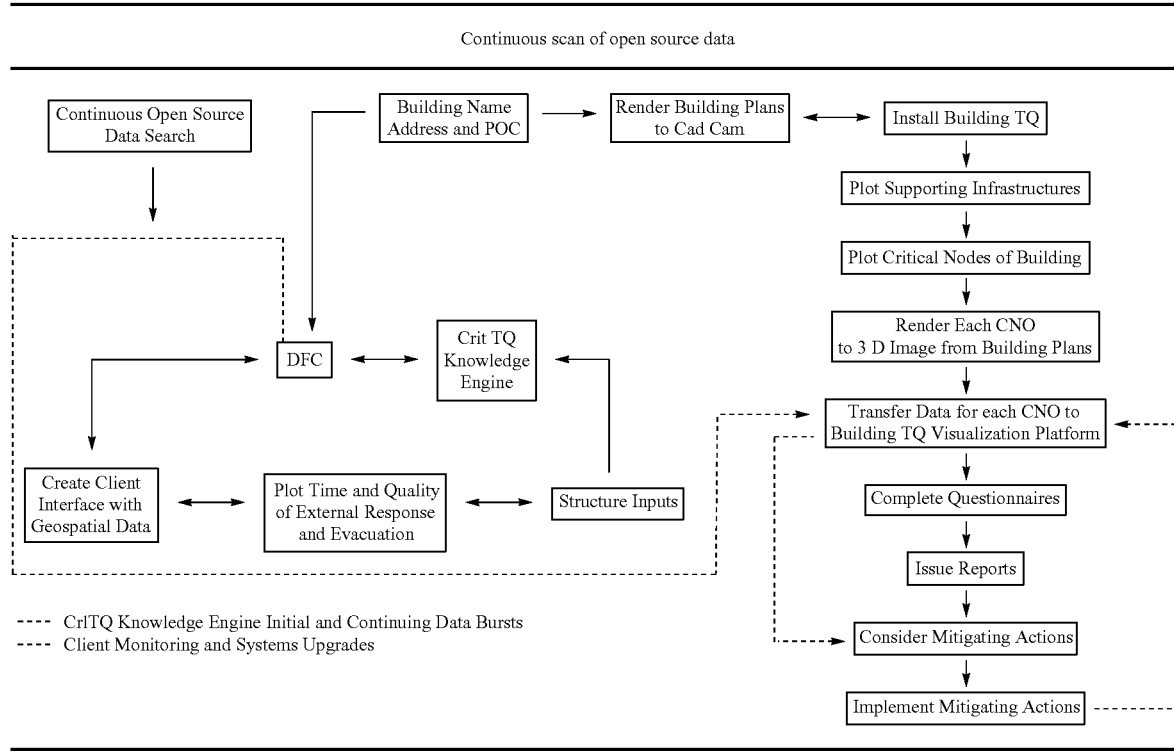
TABLE 19
The CriTQ knowledge engine uses search technology to continuously scans the internet and other sources for open source data identified by the CSM Method business process
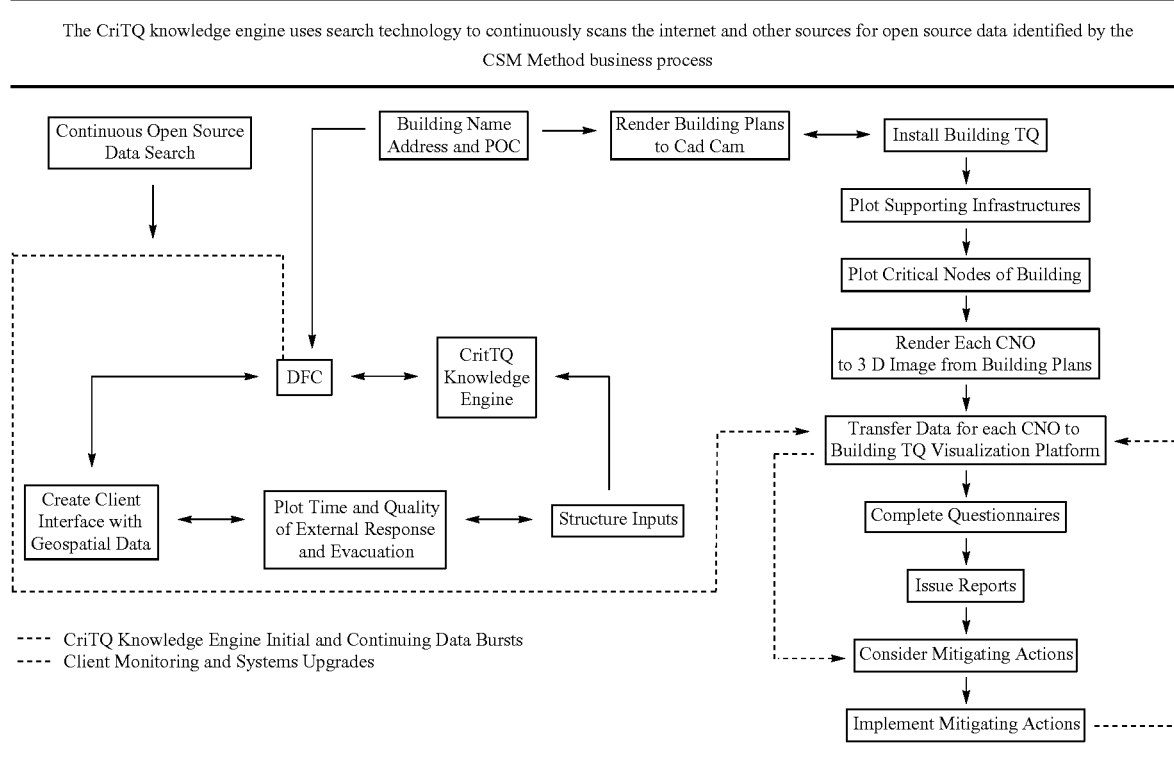

TABLE 20

Examples of CSM Method open source data gathering

Open source data includes data harvested from open sources such as:

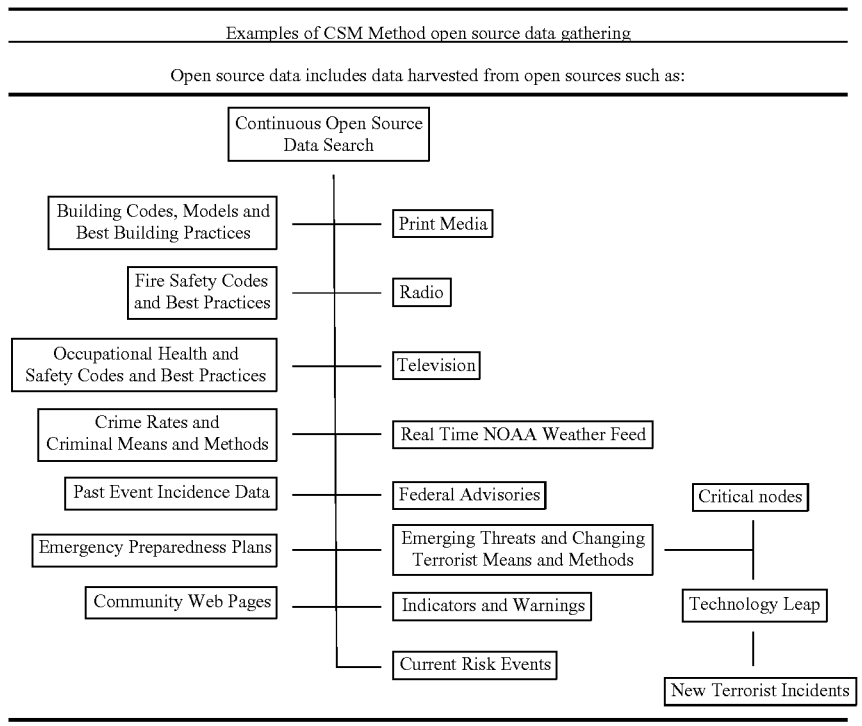

The software logic system then asks the client to input data regarding the name and address of the building.

TABLE 21

Client inputs data regarding the name and address of their building

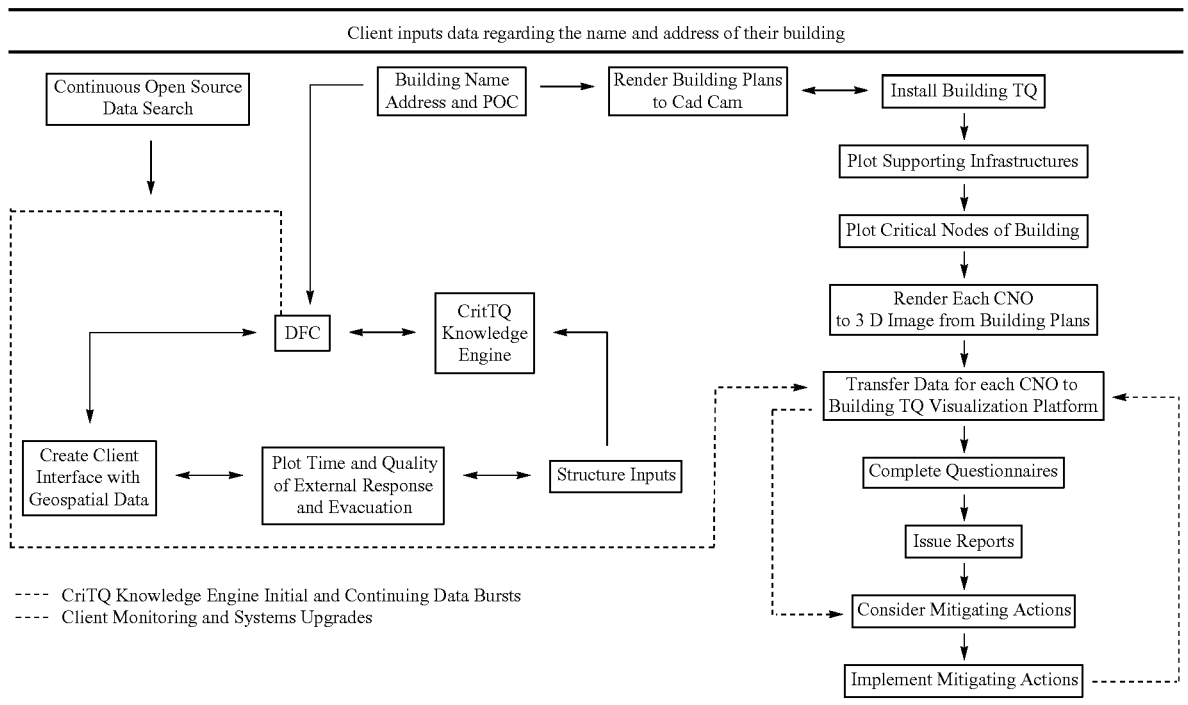

The software logic system validates client identity then directs the data to personnel at the data fusion center (DFC) over the secure VPN network.

TABLE 22

Data regarding the location is directed to the DFC

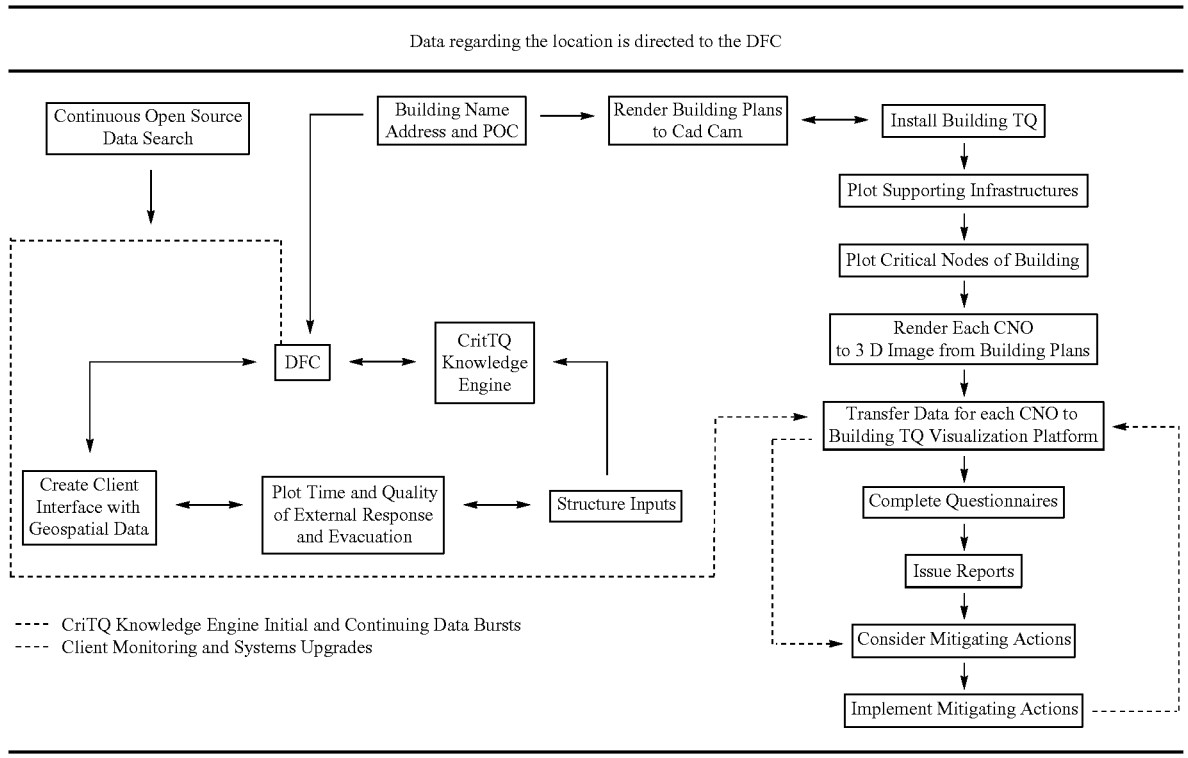

Figure 18:
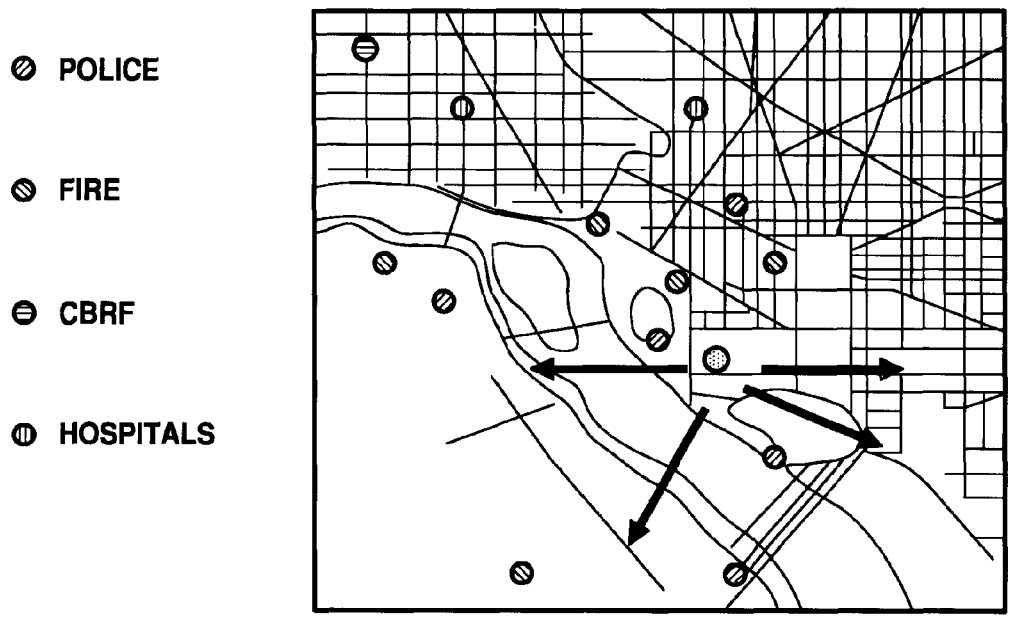
FIG. 18. illustrates a geographical plot of the time and quality of external response and evacuation routes.

---- CriTQ Knowledge Engine Initial and Continuing Data Bursts
---- Client Monitoring and Systems Upgrades Upon receipt of locator data from the client, personnel at the DFC register the new client and establish a geospatial interface. As depicted FIG. 18, below, the time and quality (in this instance the type) of response and evacuation routes are geospatially plotted. For example, in the plot in FIG. 18, the earliest Police responce to the client is 8 minutes, the earliest Fire response to the client is 11 minutes.

Data developed as a result of the CSM Method Phase 1. business process is structured and input to the CriTQ knowledgebase where it is integrated with other data.

TABLE 23

Client registration at the DFC

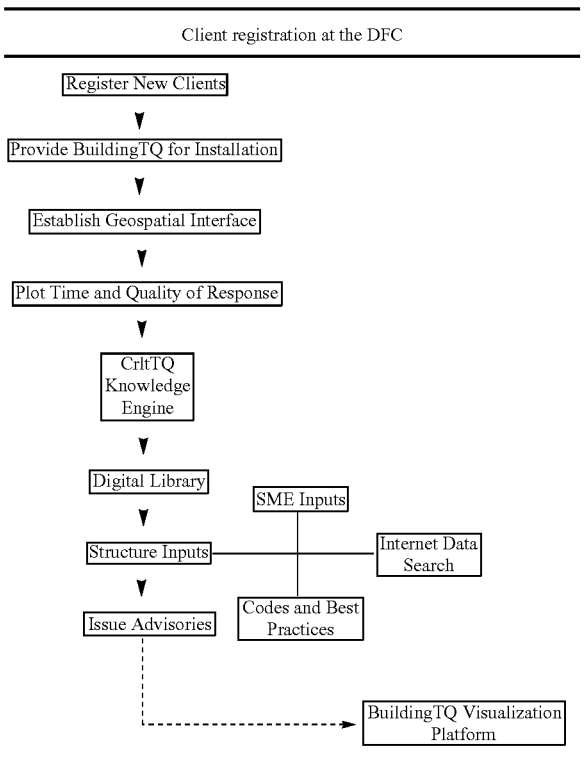

Data input to the CriTQ knowledgebase is developed and structured consistent with Phase 1. of the CSM Method business process and input to the CriTQ knowledge engine. This data includes:

1. The development and reverse engineering of a range of scenarios for each critical node of building operation consistent with Phase 1. of the CSM Method business process.

2. Catalogue adversary means and methods for each scenario consistent with Phase 1. of the CSM Method business process.

3. Identify the warnings of possible attack by individual and combinations of critical nodes consistent with Phase 1. of the CSM Method business process.

4. Develop exact event sequences for each scenario and apply EESI algorithm to create BuildingTQ threat quotients consistent with Phase 1. of the CSM Method business process.

5. Create ipsitive conditional logic questionnaires for each critical node of building operation that address safety, security and continuity of building operations consistent with Phase 1. of the CSM Method business process.

6. Develop and structure consequences of each scenario by critical node consistent with Phase 1. of the CSM Method business process.

7. Identify and structure generic mitigation methods for each scenario by critical node consistent with Phase 1. of the CSM Method business process.

8. Create a data library of structured generic scenarios for each critical node consistent with Phase 1. of the CSM Method business process.

9. Conduct and structure generic cross-systems analysis of all critical nodes to catalogue systems interdependencies in order to derive Whole BuildingTQ values consistent with Phase 1. of the CSM Method business process.

10. Develop best decision templates for each scenario and combinations of scenarios consistent with Phase 1. of the CSM Method business process.

11. Issue threat advisories to clients based on continuous monitoring of open source data including the warnings of possible attack and weather or geologic phenomenon. The warnings of possible attack are systematically derived consistent with Phase 1. of the CSM Method business process.

12. Generate data libraries of international, national, state and municipal building codes and building construction best practices using "word clustering" and semantic driver capabilities.

Data for items 1. through 12., above, is input to the CriTQ knowledge engine as depicted by Table 24, below.

TABLE 24

Structured CSM Method data is input to the CriTQ knowledge engine

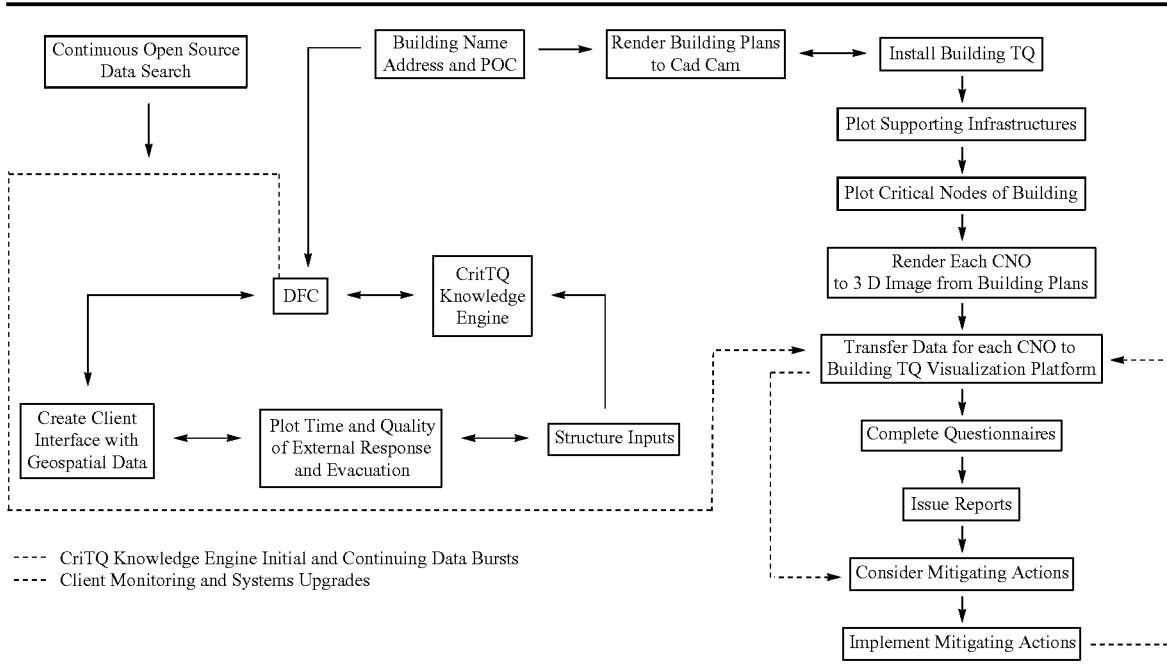

Data necessary to produce matrices of building codes, models, scenarios, adversary means and methods, warning signals and consequences and mitigating actions by critical node is indexed. All data pertaining to scenarios, adversary means and methods, warning signals and consequences and mitigating actions by critical node are derived consistent with Phase 1. of the CSM Method business process. Data indexes are created to speed access and pre-format data as depicted in Table 25, below.

TABLE 25

Data indexes are created to speed access and pre-format data

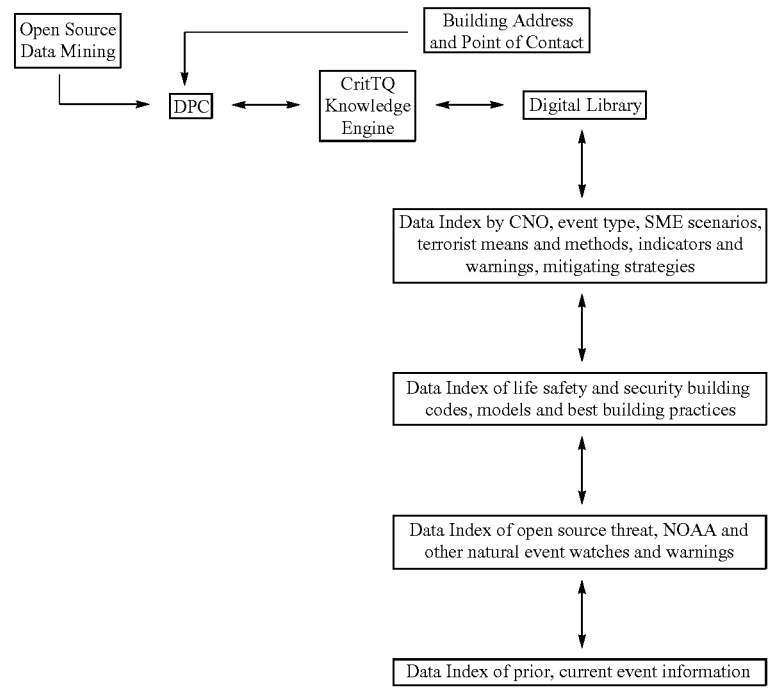

Figure 19:
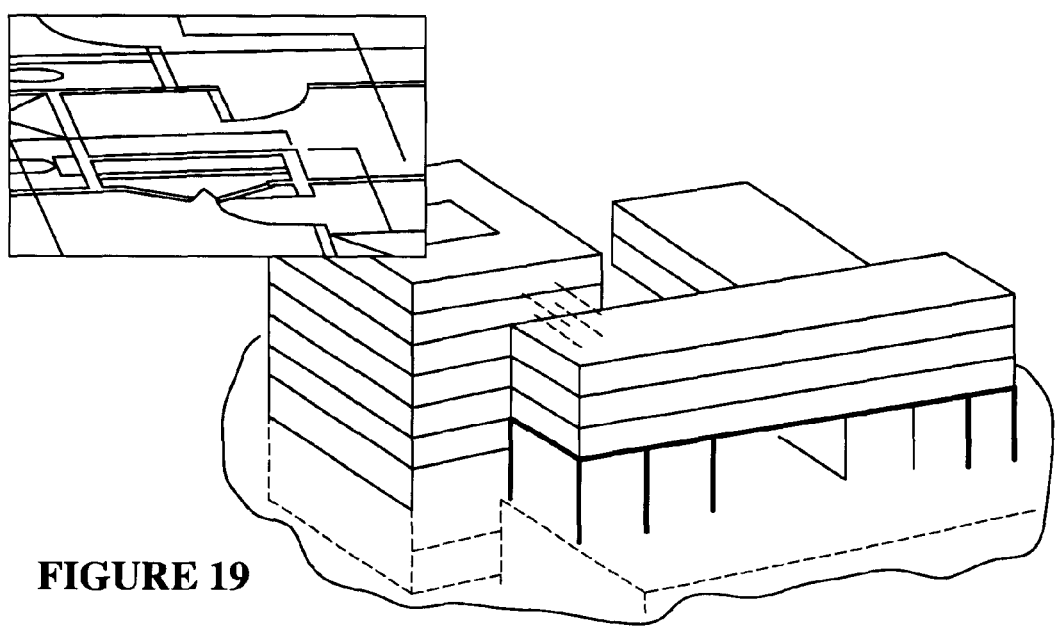
FIG. 19. illustrates Cad-cam or dedux renderings of building plans.

Building plans are then rendered to cad cam or dedux renderings for computer visualization as depicted in Table 26, below and FIG. 19.

own network behind their system's firewall. This is done to assure that data specific to the building remains the sole proprietary property of the client.

TABLE 26

Building plans are rendered into cad-cam or dedux form

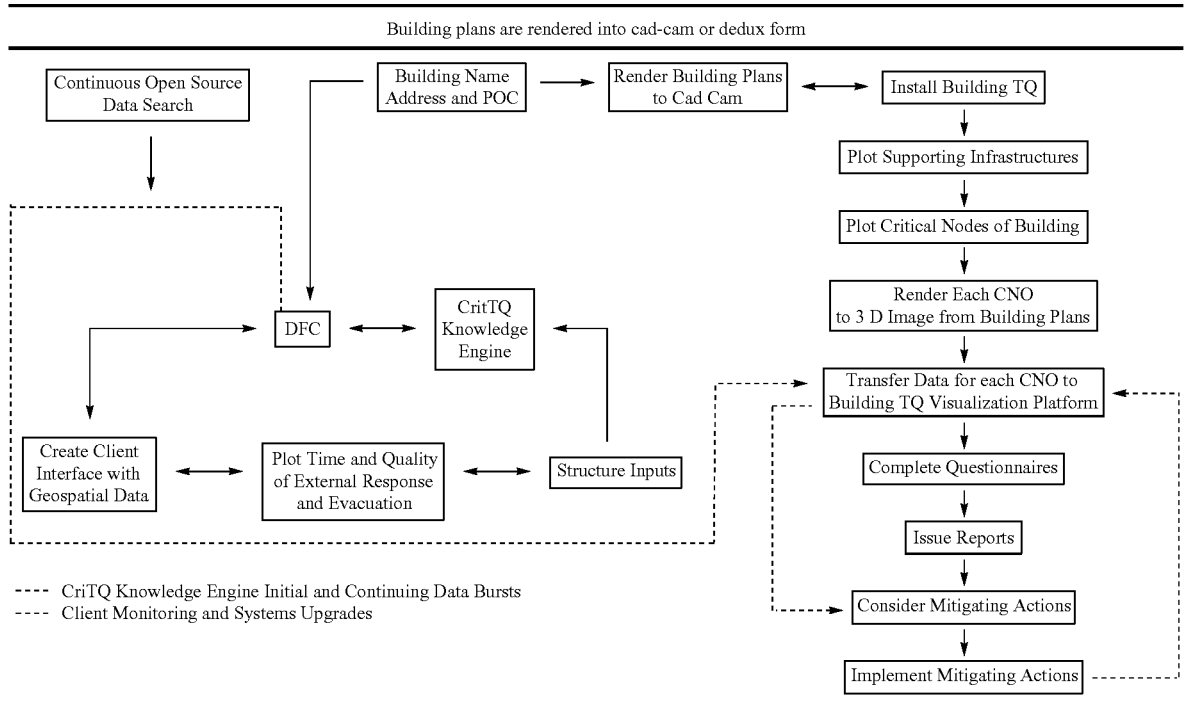

As depicted in Table 27, below, the data fusion center then provides the client with the "customized" BuildingTQ software over the secure network for installation on the client's

TABLE 27

The BuildingTQ software is installed at the client's location

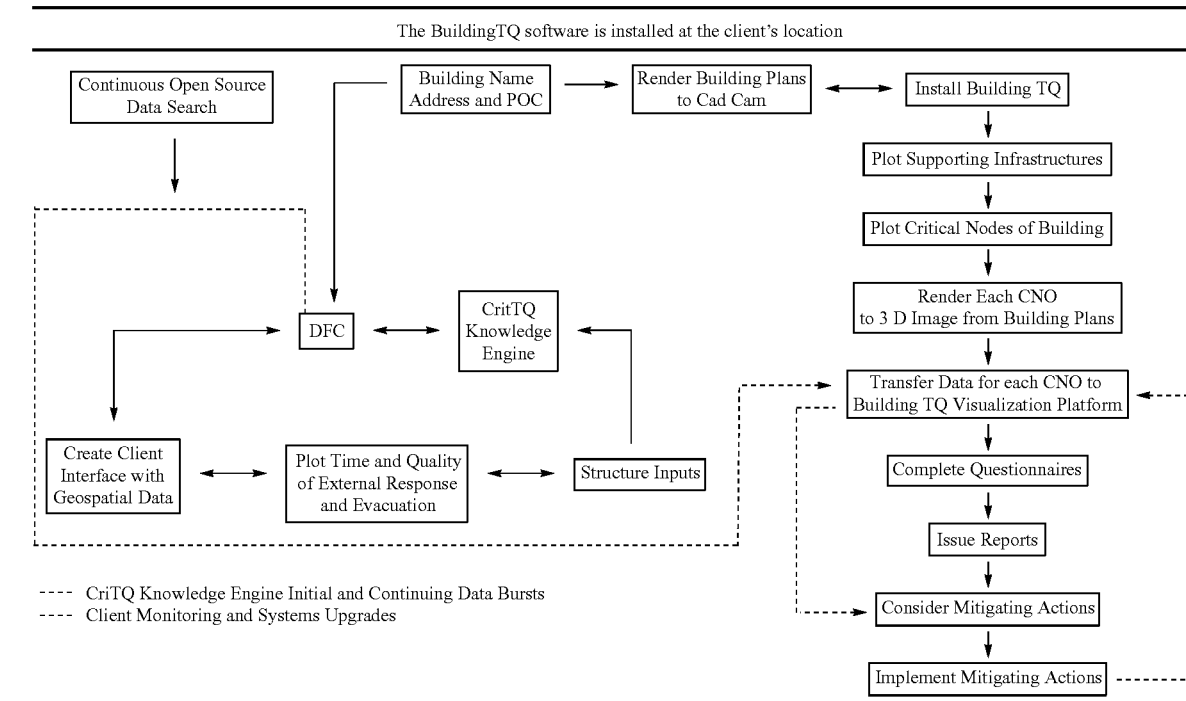

Figure 20:
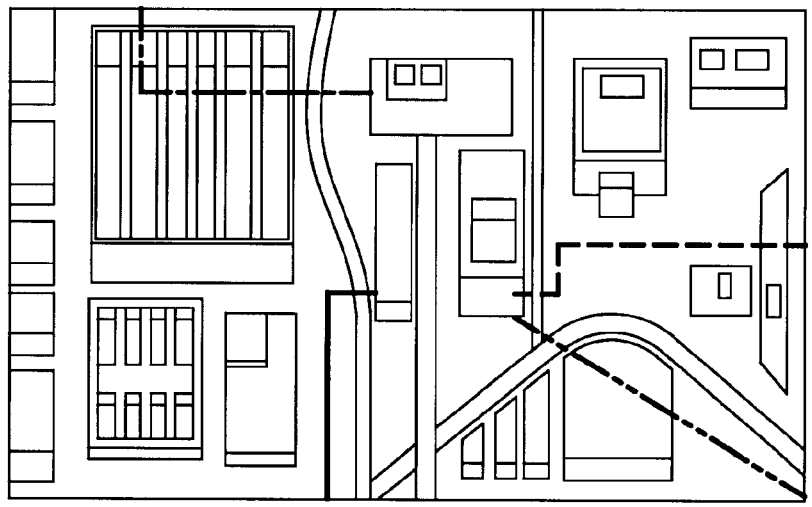
FIG. 20. illustrates a geographical plot of a building's supportive infrastructures.
Figure 21:
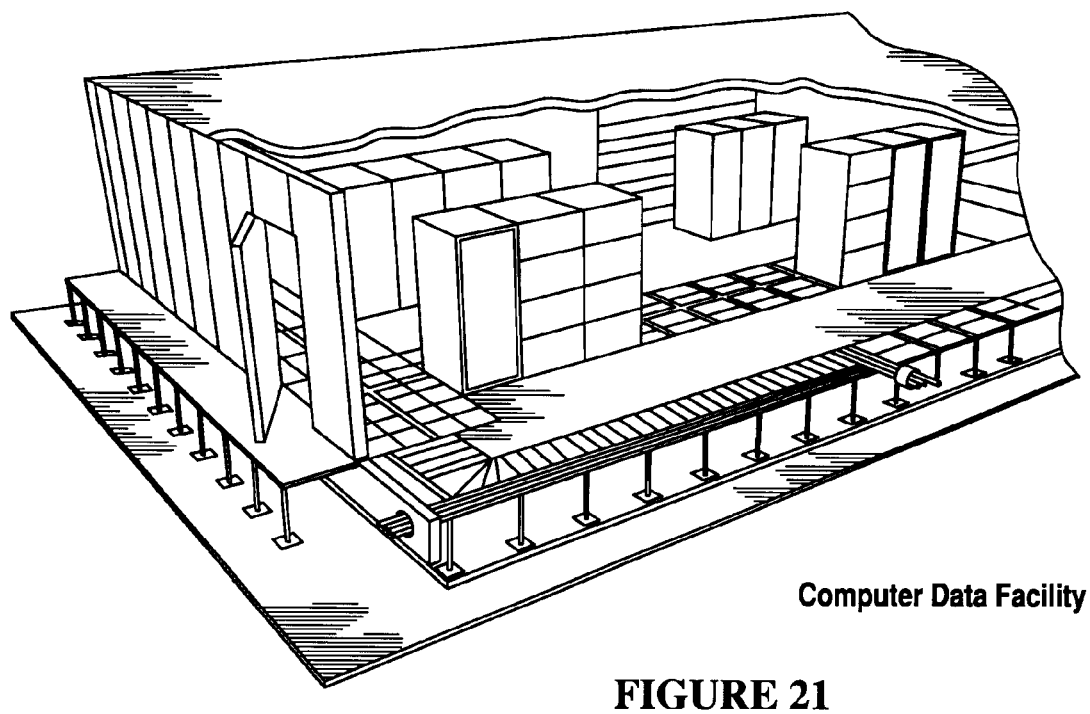
FIG. 21. illustrates an example of a critical mode rendered as a 3-D image.

As depicted in Table 28, below, and FIG. 20, the building's supporting infrastructures including external power supplies, sewer and water lines and communications are geospatially plotted. The critical nodes of building operation as derived by the Phase 1. CSM Method are plotted on a computer visualized platform. An example of this visualization is provided at FIGS. 11. A. and B. Each critical node of the building is rendered in building plan format as appearing in the example of a data computer data facility at FIG. 12. As depicted in FIG. 20, each critical node is also rendered as a three dimensional image.

and 11. B.) and to augment the BuildingTQ software installed on their system. From this point forward all data flow becomes unidirectional from the DFC to the client in what are called "data bursts" as represented by the red dotted line appealing in Table 29, below. With a fully operational BuildingTQ platform, clients complete ipsitive questionnaires developed during Phase 1. An example of a CSM Method analogously derived questionnaire was presented earlier at Table 12. The BuildingTQ software computes the structured

TABLE 28

Critical aspects of the building's operations are plotted and visualized

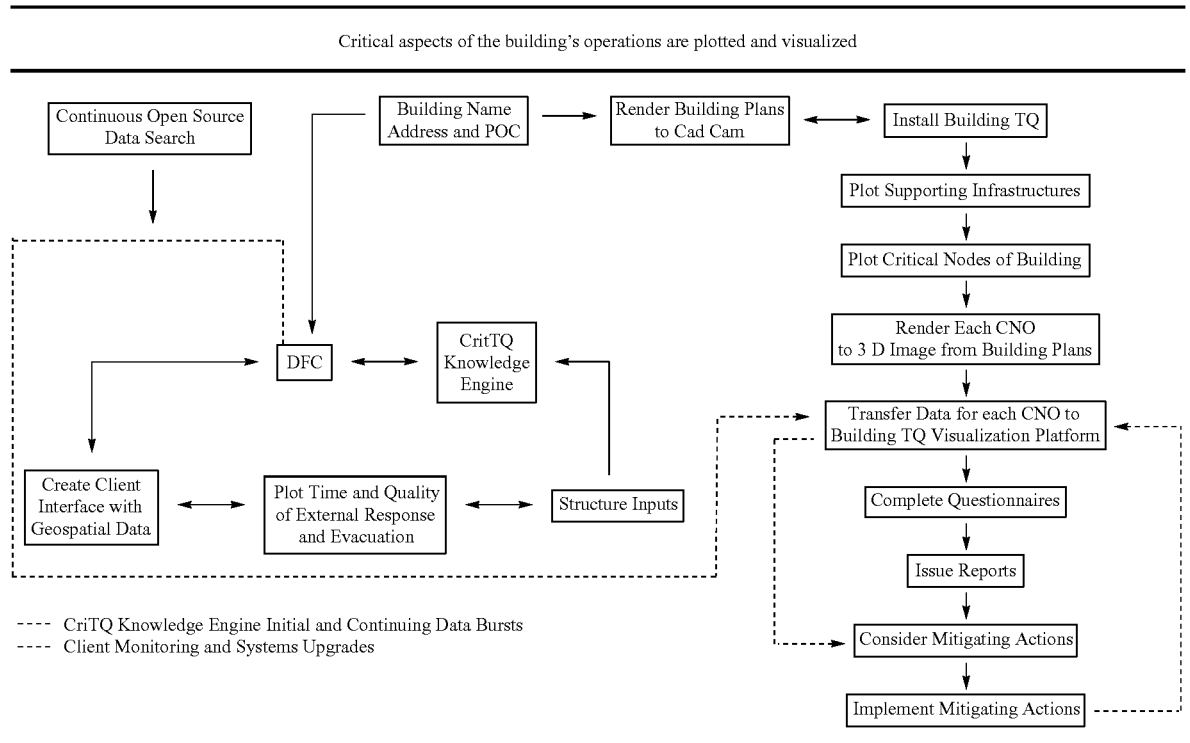

Figure 11:
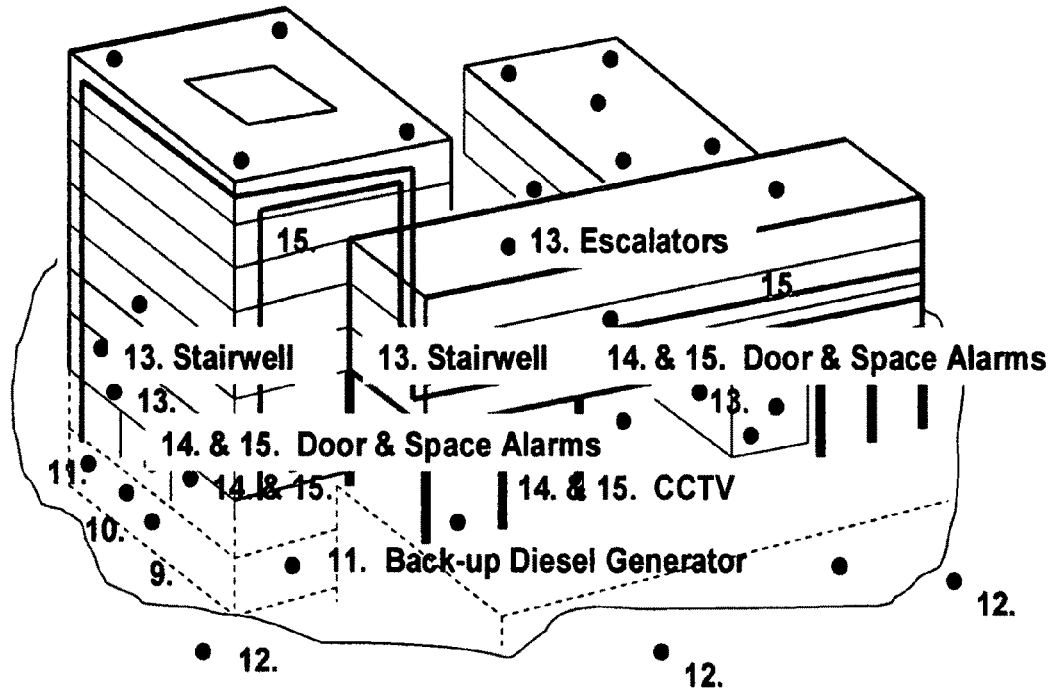
FIG. 11. A. presents a notional example of a BuildingTQ computer visualization of critical nodes 1. through 7. of building operations.

As depicted in Table 29, below, structured data is directed via the secure network from the CriTQ knowledgebase to the clients Building TQ visualization platform (See FIGS. 11. A. and 11. B.) data consistent with the CSM Method business process using the algorithms, numerical values, weighting factors using data archived in the CriTQ knowledgebase.

TABLE 29

Visualization, questionnaires, reports and mitigation

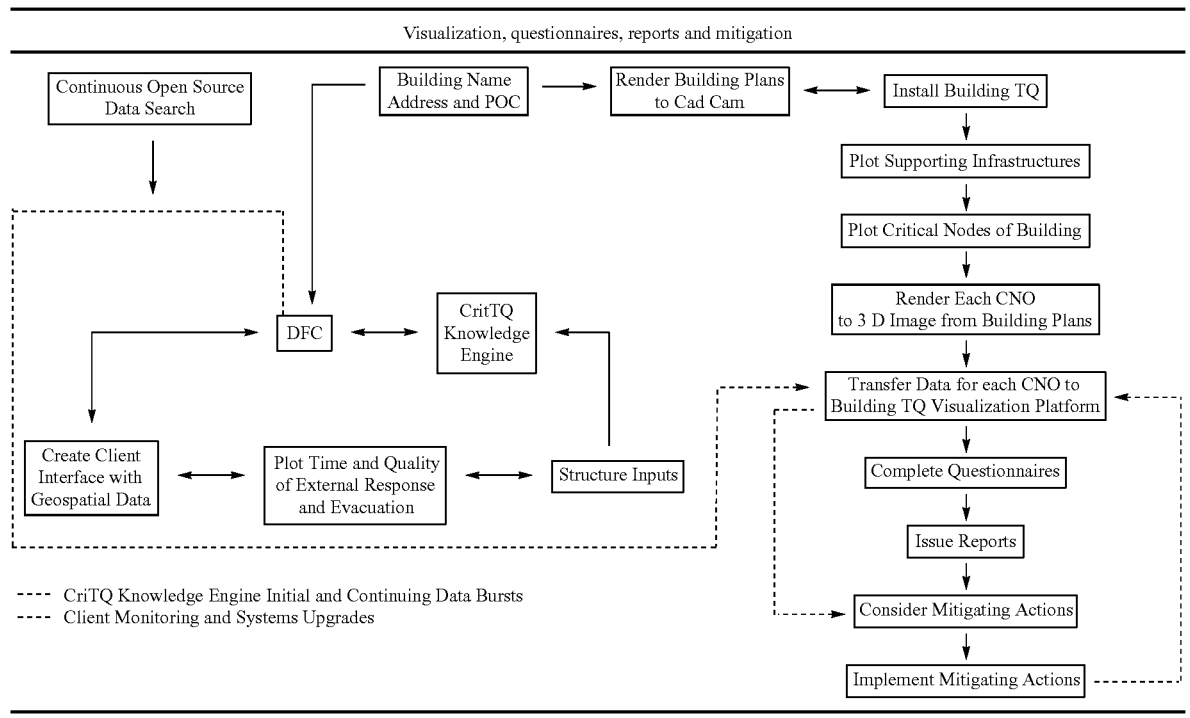

Phase 1. (Quantitative Analysis) Serves as the Foundation for Phase 2. (Integrating Quantitative Reality with Human Social Process) and Phase 3. (Subsequent Interventions) of the CSM Method Business Process Phase 1. of the CSM Method serves as the foundation for Phases 2. and 3. of the process.

Scientific evidence shows that no body of knowledge or method exists for integrating quantitative reality with human social process in the context of managing complex events and situations. This is highly significant because the failure of human beings to act on quantitative reality can have disastrous consequences. For example, the scientific community has known for many years that the accumulation of green house gases in the atmosphere is resulting in a rapid unnatural warming of the earth. For many years, scientists have been modeling the devastating consequences of the melting of the polar ice caps and subsequent rises in sea level. Although the scientific evidence of global warming because of the emission of green house gases was overwhelming, the problem is largely ignored in favor of the continued industrialization of the underdeveloped countries including Indonesia, India and China and the global economy.

The purpose of the CSM Method Phase 2. process is to provide a science based method, i.e., analogous process, to bridge the gap between quantitative reality and human social process in the management of complex systems, events and situation. Phase 2. of the CSM Method business process serves as the catalyst for human attention and action in the more timely and effective management of otherwise intractable challenges. The CSM Method as a scientifically derived tool for integrating quantitative reality with human social process in the context of the more effective management of complex events and situations is an object of the present invention.

Data derived and structured during Phase 1. using the CSM Method is the basis upon which Phase 2. and Phase 3. of the CSM process is implemented. Use of Phase 1. data helps assure the consistent application of the six tenets of a priori optionality throughout all phases of the CSM Method. For example, Phase 1. data is used to:

1. Develop Phase 2. simulations used during immersions based on Phase 1. data.
2. Identify the critical decision points (CDP's) in simulations.
3. Determine the qualitative human social consequences of simulated events based on Phase 1. quantitative data.
4. Portray the range of potential outcomes, i.e., extended order effects, for CDP's in simulations based on Phase 1. data.
5. Compare and contrast Phase 1. data against the actions taken by decision makers as they attempt to manage simulations during an immersion.
6. Reassess on a continuing basis the fundamental rules upon which complex systems are characterized and the optimum risk/benefit decision options.

Why the CSM Method Business Process is Different from Current Methods to Assess Risk and Take Advantage of Opportunity Table 30. compares the CSM Method with other risk assessment tools currently in use. The chart serves to illustrate only a sampling of the differences between the CSM Method and a small number of tools currently in use that are used as risk assessment tools. Of course, one fundamental difference between the CSM Method and all other risk and benefit management tools is that it is based on the tenets of a priori optionality—a whole new way of understanding, systematically analyzing and presenting solutions for managing complex systems. The use of a priori optionality to undergird the CSM Method is an object of the present invention. Another fundamental and overarching difference is the analogous means by which the indicators of benefit and the warnings of adverse events are systematically derived and monitored by data mining. The analogous means by which the indicators of benefit and the warnings of adverse events are systematically derived and data mined is an object of the present invention. A third fundamental and overarching difference is that the CSM Method business process produces a CriTQ knowledgebase that learns over time and contains best decision templates that can be used in the actual management of real world events. CSM Method knowledgebase that learn over time and contain best decision templates for use in the management of real world events is an object of the present invention.

TABLE 30

A sampling of the differences between the CSM Method and other risk assessment tools

| | CSM | Carver + Shock | Operational Risk Management (ORM) | Table Top Exercises (TTE's) | Probabilistic Risk Assessment (PRA) | RAMCAP |
|---|---|---|---|---|---|---|
| Human in the loop and simulations | ✓ | X | X | ✓ | X | X |
| Reverse engineering of science-based scenarios | ✓ | X | X | X | ✓ | X |
| Scientific analysis of extended order effects of decisions | ✓ | X | X | X | X | X |
| Structured use of Multidisciplinary SME's and Red Teams | ✓ | X | X | X | X | X |
| Six-sigma Standard | ✓ | ✓ | ✓ | X | ✓ | ✓ |
| Analogously derived scenarios and simulations | ✓ | X | X | X | ✓ | X |
| Systematic focus on anticipate and prevent and, as opposed to react and respond | ✓ | X | X | X | ✓ | X |
| Focuses on decision makers at all levels vertically and horizontally across the system | ✓ | X | X | X | X | X |
| Critical infrastructure systems seen as complex and adaptive | ✓ | X | X | X | X | X |
| Systematic analysis of actual terrorist means and methods | ✓ | X | X | X | X | X |
| Identification of vital systems of system interdependencies | ✓ | X | X | X | X | X |
| Systematic isolation of triggers to produce "actionable" intelligence | ✓ | X | X | X | X | X |
| Systems analysis across entire threat continuum including deterrence, detection, prevention, response, short and long term consequences | ✓ | X | X | X | X | X |
| Consensus decisions on priorities and actions before events happen | ✓ | X | X | X | X | X |
| Best decision templates to guide actual operational responses | ✓ | X | X | X | X | X |
| Knowledge base of repeatable information to support emergency planning, education, testing and actual operational responses | ✓ | X | X | X | X | X |

What is desired to be claimed:

1. A method of assessing and managing behavior of a complex adaptive system, comprising the steps of:

inputting a first plurality of data defining parameters of said complex adaptive system;

defining a plurality of fundamental events which determine behavior of said complex adaptive system;

modifying at each of a plurality of times at least ones of said first plurality of data to define a plurality of initial conditions;

testing each of said first plurality of data to determine a first subset of said first plurality of data which are most relevant to said plurality of fundamental events for each of said plurality of initial conditions in order to develop a plurality of scenarios of behavior of said complex adaptive system;

measuring an effect of each one of said plurality of initial conditions of each respective one of said developed plurality of scenarios on said first subset of data to provide status information which is capable of being tested to indicate likelihood of an event occurring in said complex adaptive system.

2. The method of claim 1 further including the steps of;
testing each of said scenarios to determine for each scenario precise events which must occur to cause said complex adaptive system to exhibit said scenario; and determining for each tested scenario critical decision points.

3. The method of claim 2 further including the steps of:
modifying said first plurality of data to simulate predetermined events occurring in said complex adaptive system;
determining the effects from said simulated events on said critical decision points; and
forming decision fault trees from said determined effects.

4. The method of claim 3 further including forming decision maps and computer models to manage said predetermined events.

5. The method according to claim 1 including the further step of applying to said status information a first algorithm providing an estimate of an event sequence interruption.

6. The method according to claim 5 wherein values obtained from said applying of said first algorithm provide an event quotient for each of said first subset of data.

7. The method according to claim wherein said event quotient further includes a functional relationship based on an algorithm related to occurrence of natural events and an effect of said natural events on said first subset of data.

8. The method according to claim 5 further including the step of modifying said first plurality of data as a function of a result of said application of said first algorithm.

9. The method of claim 1 wherein said first subset of data are critical nodes of the complex adaptive system.

10. A method of increasing the likelihood of behavior of a complex adaptive system, comprising the steps:
defining fundamental elements which control the functioning of the complex adaptive system;
assigning a plurality of sets of initial values at a respective plurality of times to a plurality of features of the complex adaptive system;
determining which ones of said plurality of features of the complex adaptive system are most directly related to said fundamental elements for each of said plurality of sets of initial conditions in order to develop a plurality of scenarios of behavior of said complex adaptive system;
measuring an effect of each one of said plurality of sets of initial conditions of each respective one of said developed plurality of scenarios on said ones of said plurality of features most directly related to said fundamental elements to generate sets of data functionally related to the likelihood of a particular occurrence in said complex adaptive system.

11. The method of claim 10 further including the steps of;
testing each of said scenarios to determine for each scenario precise events which must occur to cause said complex adaptive system to exhibit said scenario; and
determining for each tested scenario critical decision points.

12. The method according to claim 11 further including the step of modifying said plurality of features as a function of a result of said application of said first algorithm.

13. The method of claim 11 further including the steps of:
modifying said plurality of features to simulate predetermined events occurring in said complex adaptive system;
determining the effects from said simulated events on said critical decision points;
and forming decision fault trees from said determined effects.

14. The method of claim 13 further including forming decision maps and computer models to manage said predetermined events.

15. The method according to claim 10 including the further step of applying to said set of data a first algorithm providing an estimate of an event sequence interruption.

16. The method according to claim 15 wherein values obtained from said applying of said first algorithm provide an event quotient for each of said ones of said plurality of features most directly related to said fundamental elements.

17. The method according to claim 16 wherein said event quotient further includes a functional relationship based on an algorithm related to occurrence of natural events and an effect of said natural events on said ones of said plurality of features most directly related to said fundamental elements.

18. A computer program product for use with a digital computer for assessing and managing behavior of a complex adaptive system, said computer program product including a computer usable medium having a plurality of computer readable program code means embodied in said medium, comprising;
a first computer readable program code means containing a first plurality of data defining parameters of said complex adaptive system and a plurality of defined relationships which control the functions of the complex adaptive system;
a second computer readable program code means causing a modification at each of a plurality of times at least ones of said first plurality of data to define a plurality of initial conditions;
a third computer readable program code means for testing each of said plurality of data to determine a first subset of said first plurality of data which are most relevant to said plurality of defined relationships for each of said plurality of initial conditions in order to develop a plurality of scenarios of behavior of said complex adaptive system;
a fourth computer readable program code means for determining an effect of each one of said plurality of initial conditions of each respective one of said developed plurality of scenarios on said first subset of data to provide status information which is capable of being tested to indicate likelihood of an event occurring in said complex adaptive system.

19. The computer program product according to claim 18 including a fifth computer readable code means for testing each of said scenarios to determine for each scenario precise events which must occur to cause said complex adaptive system to exhibit said scenario; and determining for each tested scenario critical decision points.

20. The computer program product according to claim 19 including a sixth computer readable code means for applying to said status information a first algorithm providing an estimate of an event sequence interruption.

* * * * *

UNITED STATES PATENT AND TRADEMARK OFFICE
CERTIFICATE OF CORRECTION

| | | |
|---|---|---|
| PATENT NO. | : 8,103,601 B2 | Page 1 of 1 |
| APPLICATION NO. | : 11/808580 | |
| DATED | : January 24, 2012 | |
| INVENTOR(S) | : John Harris Hnatio | |

It is certified that error appears in the above-identified patent and that said Letters Patent is hereby corrected as shown below:

Column 79 – Line 27, insert --6-- after "claim"

Signed and Sealed this
Thirteenth Day of March, 2012

David J. Kappos
*Director of the United States Patent and Trademark Office*